United States Patent
Oh et al.

(10) Patent No.: US 11,838,918 B2
(45) Date of Patent: Dec. 5, 2023

(54) METHOD AND APPARATUS FOR DETERMINING DOWNLINK FEEDBACK INFORMATION IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Hoondong Noh, Gyeonggi-do (KR); Hyoungju Ji, Gyeonggi-do (KR)

(73) Assignee: Samsung Electronics Co., Ltd

( * ) Notice: Subject to any disclaimer, the term of this patent is extended or adjusted under 35 U.S.C. 154(b) by 174 days.

(21) Appl. No.: 17/370,398

(22) Filed: Jul. 8, 2021

(65) Prior Publication Data

US 2022/0022173 A1 Jan. 20, 2022

(30) Foreign Application Priority Data

Jul. 14, 2020 (KR) .................. 10-2020-0087079

(51) Int. Cl.
*H04W 72/23* (2023.01)
*H04L 1/1607* (2023.01)

(52) U.S. Cl.
CPC .......... *H04W 72/23* (2023.01); *H04L 1/1607* (2013.01)

(58) Field of Classification Search
CPC ... H04L 1/1607; H04L 1/1812; H04L 1/1822; H04L 1/1854; H04L 1/1887; H04L 5/0055; H04W 72/1268; H04W 72/23
See application file for complete search history.

(56) References Cited

U.S. PATENT DOCUMENTS

| | | | |
|---|---|---|---|
| 10,484,146 B2 * | 11/2019 | Sun | H04L 1/1614 |
| 10,999,017 B2 * | 5/2021 | Sun | H04L 1/1896 |
| 11,075,718 B2 * | 7/2021 | Zhang | H04L 1/1893 |
| 11,102,762 B2 * | 8/2021 | Baldemair | H04L 1/1812 |
| 11,212,042 B2 * | 12/2021 | Bang | H04L 1/1614 |
| 11,224,056 B2 * | 1/2022 | Chakraborty | H04L 1/1614 |
| 11,310,821 B2 * | 4/2022 | Kim | H04W 16/14 |
| 11,337,182 B2 * | 5/2022 | Lei | H04L 1/1819 |
| 11,395,270 B2 * | 7/2022 | Sarkis | H04L 1/1896 |
| 11,425,699 B2 * | 8/2022 | Meng | H04W 72/0446 |
| 11,595,973 B2 * | 2/2023 | Wang | H04L 5/0055 |

(Continued)

FOREIGN PATENT DOCUMENTS

| | | | | |
|---|---|---|---|---|
| CN | 110447191 A | * | 11/2019 | ............... H04L 1/00 |
| CN | 110830180 A | * | 2/2020 | ........... H04L 1/1607 |

(Continued)

*Primary Examiner* — Eric Nowlin
(74) *Attorney, Agent, or Firm* — The Farrell Law Firm, P.C.

(57) ABSTRACT

A communication scheme and a system thereof are provided for converging IoT technology and a 5G communication system for supporting a high data transmission rate beyond that of a 4G system. The disclosure can be applied to intelligent services based on the 5G communication technology and the IoT-related technology. Further, the disclosure provides a method of determining DL feedback information in a wireless communication system. The method includes receiving, from a BS, first information configuring a CBG based UL transmission; transmitting, to the BS, UL data including one or more CBGs, based on the first information; and receiving, from the BS, second information indicating an ACK or a NACK according to a reception result of the BS for the UL data.

8 Claims, 16 Drawing Sheets

(56) References Cited

U.S. PATENT DOCUMENTS

| | | | |
|---|---|---|---|
| 2018/0278379 A1* | 9/2018 | Sun | H04L 1/0061 |
| 2019/0335447 A1* | 10/2019 | Sarkis | H04L 1/1861 |
| 2019/0349965 A1* | 11/2019 | Chakraborty | H04W 16/14 |
| 2020/0014499 A1* | 1/2020 | Sun | H04L 1/1614 |
| 2020/0084761 A1* | 3/2020 | Baldemair | H04L 1/0026 |
| 2020/0162203 A1* | 5/2020 | Bang | H04L 1/1822 |
| 2020/0259599 A1* | 8/2020 | Zhang | H04L 1/1864 |
| 2020/0367265 A1* | 11/2020 | Wang | H04W 72/23 |
| 2020/0374043 A1* | 11/2020 | Lei | H04L 5/0055 |
| 2020/0374910 A1* | 11/2020 | Kim | H04L 27/0006 |
| 2021/0007149 A1* | 1/2021 | Li | H04L 27/0006 |
| 2021/0029693 A1* | 1/2021 | Meng | H04L 5/0055 |
| 2021/0050947 A1* | 2/2021 | Tsai | H04W 72/23 |
| 2021/0120537 A1* | 4/2021 | Lei | H04L 1/1887 |
| 2021/0242980 A1* | 8/2021 | Zhang | H04L 1/1887 |
| 2022/0052790 A1* | 2/2022 | Lei | H04L 1/1607 |
| 2022/0070910 A1* | 3/2022 | Li | H04L 1/1812 |
| 2022/0104259 A1* | 3/2022 | Li | H04W 74/0816 |
| 2022/0174735 A1* | 6/2022 | Li | H04W 74/0816 |
| 2022/0183053 A1* | 6/2022 | Li | H04W 74/006 |
| 2022/0209898 A1* | 6/2022 | Karaki | H04W 72/23 |
| 2022/0330297 A1* | 10/2022 | Lei | H04L 5/0055 |
| 2022/0368475 A1* | 11/2022 | Lei | H04L 1/1864 |

FOREIGN PATENT DOCUMENTS

| | | | | |
|---|---|---|---|---|
| CN | 112005509 A | * | 11/2020 | H04B 7/0482 |
| CN | 112005515 A | * | 11/2020 | H04L 1/1614 |
| CN | 112088509 A | * | 12/2020 | H04L 1/0083 |
| CN | 110830180 B | * | 2/2021 | H04L 1/1607 |
| CN | 112889234 A | * | 6/2021 | H04L 1/0018 |
| CN | 112929138 A | * | 6/2021 | |
| CN | 113273112 A | * | 8/2021 | H04L 1/0047 |
| CN | 112005509 B | * | 8/2023 | H04B 7/0482 |
| EP | 3668234 A1 | * | 6/2020 | H04L 5/00 |
| EP | 3766201 A1 | * | 1/2021 | H04L 1/1614 |
| EP | 3836450 A1 | * | 6/2021 | H04L 1/1607 |
| EP | 3681070 B1 | * | 3/2022 | H04L 1/1614 |
| EP | 3766201 B1 | * | 4/2022 | H04L 1/1614 |
| EP | 4027558 A1 | * | 7/2022 | H04L 1/1614 |
| EP | 3868046 B1 | * | 1/2023 | H04L 1/0047 |
| EP | 3695559 B1 | * | 2/2023 | H04L 1/1671 |
| JP | 2020512750 A | * | 4/2020 | |
| KR | 20190127882 A | * | 11/2019 | |
| KR | 20200057482 A | * | 5/2020 | |
| KR | 20210035901 A | * | 4/2021 | |
| KR | 20200091861 A | * | 7/2021 | |
| WO | WO-2018175050 A1 | * | 9/2018 | H04L 1/00 |
| WO | WO-2018186791 A1 | * | 10/2018 | H04L 1/0026 |
| WO | WO-2019210044 A1 | * | 10/2019 | H04B 7/0482 |
| WO | WO-2019217575 A1 | * | 11/2019 | H04L 1/0083 |
| WO | WO-2019240887 A1 | * | 12/2019 | H04L 1/1614 |
| WO | WO-2020029773 A1 | * | 2/2020 | H04L 1/0018 |
| WO | WO-2020030710 A1 | * | 2/2020 | H04L 1/0018 |
| WO | WO-2020101430 A1 | * | 5/2020 | H04L 1/0047 |
| WO | WO-2020230008 A1 | * | 11/2020 | H04L 1/08 |

* cited by examiner

METHOD AND APPARATUS FOR DETERMINING DOWNLINK FEEDBACK INFORMATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2020-0087079, which was filed in the Korean Intellectual Property Office on Jul. 14, 2020, the entire disclosure of which is incorporated herein by reference.

BACKGROUND

1. Field

The disclosure relates generally to a method and an apparatus for determining downlink (DL) feedback information in a wireless communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system, which may also be called a "beyond 4G network" or a "post long term evolution (LTE) system".

A 5G communication system is to be implemented in higher frequency (millimeter-wave (mmWave)) bands, e.g., 60 GHz bands, in order to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In the 5G system, hybrid frequency shift keying (FSK) and quadrature amplitude modulation (QAM) (FQAM) and sliding window superposition coding (SWSC) have been developed for an advanced coding modulation (ACM), and filter bank multi carrier (FBMC), non-orthogonal multiple access (NOMA), and sparse code multiple access (SCMA) have been developed as advanced access technologies.

The Internet is now evolving into the Internet of things (IoT), where distributed entities, i.e., things, exchange and process information without human intervention. The Internet of everything (IoE), which is a combination of the IoT technology and the big data processing technology through connection with a cloud server, has also emerged. As technology elements, such as "sensing technology," "wired/wireless communication and network infrastructure," "service interface technology," and "security technology" are needed for IoT implementation, a sensor network, a machine-to-machine (M2M) communication, machine type communication (MTC), etc., are being researched. An IoT environment may provide intelligent Internet technology services by collecting and analyzing data generated among connected things. IoT may be applied to a variety of fields including smart homes, smart buildings, smart cities, smart cars, connected cars, smart grids, health care, smart appliances, and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of a convergence of 5G technology with IoT technology.

According to the development of the mobile communication system described above, in which various services can be provided, wireless communication networks have become complex and diversified, and thus, there is a need for a method of efficiently allocating data channels for DL (DL) and uplink (UL) signaling.

SUMMARY

The disclosure is made to address the above-described problems, and provide at least the advantages described below.

An aspect of the disclosure is to provide a method and an apparatus for determining DL feedback information in a wireless communication system.

Another aspect of the disclosure is to provide a method and an apparatus for determining DL feedback information according to a network identifier used for a DL control channel for transmitting DL feedback information in a wireless communication system.

In accordance with an aspect of the disclosure, a method performed by a terminal in a communication system is provided. The method includes receiving, from a base station (BS), first information configuring a code block group (CBG) based uplink (UL) transmission; transmitting, to the base station, UL data including one or more CBGs, based on the first information; and receiving, from the base station, second information indicating a positive-acknowledgement (ACK) or a negative-acknowledgement (NACK) according to a reception result of the BS for the UL data.

In accordance with another aspect of the disclosure, a method performed by a base station in a communication system is provided. The method includes transmitting, to a terminal, first information configuring a code block group (CBG) based uplink (UL) transmission; receiving, from the terminal, UL data including one or more CBGs, based on the first information; and transmitting, to the terminal, second information indicating a positive-acknowledgement (ACK) or a negative-acknowledgement (NACK) according to a reception result for the UL data.

In accordance with another aspect of the disclosure, a terminal in a communication system is provided. The terminal includes a transceiver; and a controller configured to receive, from a base station (BS), first information configuring a code block group (CBG) based uplink (UL) transmission, transmit, to the BS, UL data including one or more CBGs, based on the first information, and receive, from the BS, second information indicating a positive-acknowledgement (ACK) or a negative-acknowledgement (NACK) according to a reception result of the BS for the UL data.

In accordance with another aspect of the disclosure, a base station in a communication system is provided. The base station includes a transceiver; and a controller configured to transmit, to a terminal, first information configuring a code block group (CBG) based uplink (UL) transmission, receive, from the terminal, UL data including one or more CBGs, based on the first information, and transmit, to the terminal, second information indicating a positive-acknowledgement (ACK) or a negative-acknowledgement (NACK) according to a reception result for the UL data.

BRIEF DESCRIPTION OF THE DRAWINGS

The above and other aspects, features, and advantages of the disclosure will become more apparent from the following description taken in conjunction with the accompanying drawings, in which.

DETAILED DESCRIPTION

Figure 1:
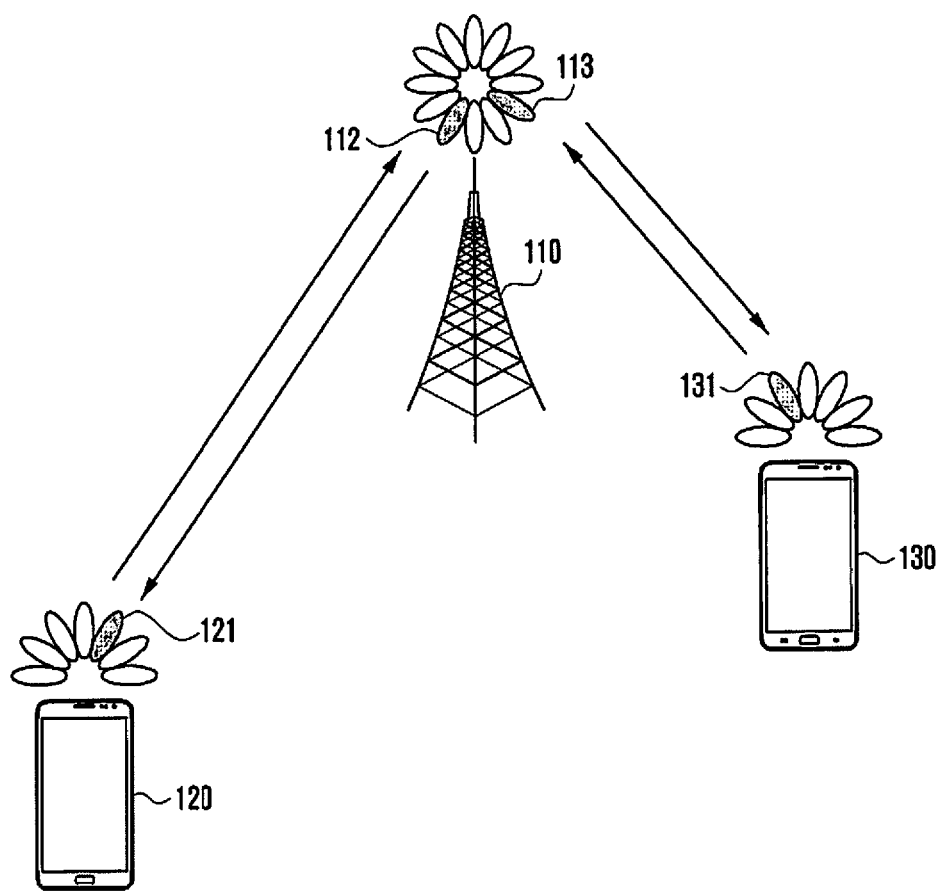
FIG. 1 illustrates a wireless communication system according to an embodiment.

Hereinafter, various embodiments of the disclosure will be described in detail with reference to the accompanying drawings. Advantages and features of the disclosure and ways to achieve them will be apparent by making reference to embodiments as described below in detail in conjunction with the accompanying drawings. However, the disclosure is not limited to the embodiments set forth below, and may be implemented in various different forms.

In the disclosure, descriptions related to technical contents that are well-known in the art and not directly associated with the disclosure will be omitted. Such an omission of unnecessary descriptions is intended to prevent obscuring of main concepts of the disclosure. Further, the terms which will be described below are terms defined in consideration of the functions in the disclosure, and may be different according to users, intentions of the users, or customs. Therefore, the definitions of the terms should be made based on the content throughout the specification.

In the accompanying drawings, some elements may be exaggerated, omitted, or schematically illustrated. Further, the size of each element does not completely reflect the actual size. In the drawings, identical or corresponding elements may be provided with identical reference numerals.

Hereinafter, a BS is an entity for allocating resources of a UE, and may be at least one of a gNode B, an eNode B, a Node B (or an xNode B (x being a letter including g and e), a radio access unit, a BS controller, a satellite, an aircraft, or a node on a network. A UE may include a mobile station (MS), a vehicle, a satellite, an aircraft, a cellular phone, a smart phone, a computer, and/or a multimedia system capable of performing a communication function.

Herein, a DL refers to a wireless transmission path from a BS to a UE, and a UL refers to a wireless transmission path from a UE to a BS. In addition, there may be a sidelink (SL), which corresponds to a wireless transmission path from a UE to another UE.

Hereinafter, an LTE, LTE-advanced (A), or 5G system may be described by way of example, but the embodiments may be applied to other communication systems having similar technical backgrounds or channel forms. For example, 5G-Advance, new radio (NR)-Advance, or $6^{th}$-generation mobile communication technology (6G) developed after the 5G mobile communication technology (or NR) may be included therein. The disclosure can also be applied to other communication systems through some modifications without departing from the scope of the disclosure on the basis of determination by those skilled in the art.

Each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s).

In some alternative implementations, the functions noted in the blocks may occur out of the illustrated order. For example, two blocks shown in succession may in fact be executed substantially concurrently or the blocks may sometimes be executed in the reverse order, depending upon the functionality involved.

Herein, the term "unit" may refer to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". The elements and "units" or may be implemented to reproduce one or more central processing units (CPUs) within a device or a security multimedia card. Further, a "unit" may include one or more processors.

A wireless communication system has developed into a broadband wireless communication system that provides a high-speed and high-quality packet data service according to communication standards such as high-speed packet access (HSPA) of the $3^{rd}$ generation partnership project (3GPP), LTE or evolved universal terrestrial radio access (E-UTRA), LTE-A, high rate packet data (HRPD) of 3GPP2, ultra mobile broadband (UMB), and 802.16e of the Institute of Electrical and Electronics Engineers (IEEE), etc., beyond the initially provided voice-based service.

An LTE system, which is a representative example of a broadband wireless communication system, employs an orthogonal frequency division multiplexing (OFDM) scheme for a DL, and employs a single carrier frequency division multiple access (SC-FDMA) scheme for a UL. In multiple access schemes as described above, time-frequency resources for carrying data or control information are allocated and operated in a manner to prevent overlapping of the resources, i.e., to establish the orthogonality, between users, in order to identify data or control information of each user.

A post-LTE communication system, e.g., a 5G communication system, should be able to freely reflect various requirements of a user and a service provider, and thus, support services that satisfy the various requirements. Services considered for the 5G communication system include enhanced mobile broadband (eMBB), massive MTC (mMTC), and ultra reliable low latency communication (URLLC).

eMBB is expected to provide an improved data transmission rate, surpassing the data transmission speed supported by conventional LTE, LTE-A, or LTE-Pro. For example, in the 5G communication system, the eMBB should provide a peak DL data rate of 20 Gbps and a peak UL data rate of 10 Gbps from the viewpoint of one BS. Further, the 5G communication system should provide the peak data rate and also an increased user-perceived data rate. In order to satisfy such requirements, improvement of various transmission/reception technologies, including a further improved MIMO transmission technology, is needed.

Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

In order to support an application service such as IoT, mMTC is considered for use in the 5G communication system. The mMTC should support access of a multitude of terminals within a cell, improve coverage of a terminal, increase a battery lifetime, and reduce the costs of the terminal in order to efficiently provide IoT.

IoT is often attached to various sensors and devices to provide communication, and thus, should support a large number of terminals (for example, 1,000,000 terminals/km2).

Since a UE supporting mMTC is highly likely to be located in a shade area, such as a basement, which a cell cannot cover due to service characteristics, the mMTC may require wider coverage than other services provided by the 5G communication system. The UE supporting the mMTC should be produced at low cost, and since it is difficult to frequently change a battery thereof, so that a very long battery lifetime, e.g., 10 to 15 years, may be required.

URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. Services supporting the URLLC should satisfy a radio access delay time (air interface latency) shorter than 0.5 milliseconds and also have a requirement of a packet error rate equal to or smaller than $10^{-5}$. Accordingly, for services supporting the URLLC, the 5G system should provide a transmission time interval (TTI) smaller than that of other systems and also have a design requirement of allocating a wide array of resources in a frequency band in order to guarantee reliability of a communication link.

Three services of 5G, namely, eMBB, URLLC, and mMTC, may be multiplexed and transmitted in one system. In order to meet the different requirements of the respective services, different transmission/reception schemes and transmission/reception parameters may be used for the services. Of course, 5G is not limited to the above-described three services.

FIG. 1 illustrates a wireless communication system according to an embodiment. Specifically, FIG. 1 illustrates a BS 110, a UE. 120, and a UE 130 as nodes using a radio channel in a wireless communication system. Although FIG. 1 illustrates only one BS by way of example, it may further include another BS, which is the same as or similar to the BS 110.

Referring to FIG. 1, the BS 110 is a network infrastructure element that provides radio access to the UEs 120 and 130. The BS 110 has coverage defined by a predetermined geographical area based on an arrival distance to which a radio signal can be transmitted. The BS 110 may also be referred to as an access point (AP), an evolved NodeB (eNB), a gNodeB (gNB), a 5G node, a wireless point, a transmission/reception point (TRP), or another term having a technical meaning equivalent thereto.

Each of the UE 120 and the UE 130 may be a device that can be used by a user, and may communicate with the BS 110 through radio channels. Depending on circumstances, at least one of the UE 120 and the UE 130 may be operated without any involvement by the user. That is, at least one of the UEs 120 and 130 may be a device that performs MTC, and may not be carried by the user. Each of the UE 120 and the UE 130 may be referred to as a mobile station, a subscriber station, a remote terminal, a wireless terminal, a user device, or another term having a technical meaning equivalent thereto.

A wireless communication environment may include wireless communication in an unlicensed band and a licensed band. The BS 110, the UE 120, and the UE 130 may transmit and receive wireless signals in an unlicensed band (e.g., a band of 5 GHz to 7.125 GHz or a band of ~71 GHz). In the unlicensed band, a cellular communication system and another communication system (e.g., a wireless local area network (WLAN)) may coexist. The BS 110, the UE 120, and the UE 130 may perform a channel access procedure for the unlicensed band in order to guarantee fairness between two communication systems, i.e., to prevent a situation in which a channel is exclusively used by only one system. As an example of the channel access procedure for the unlicensed band, the BS 110, the UE 120, and the UE 130 may perform listen-before-talk (LBT).

The BS 110, the UE 120, and the UE 130 may transmit and receive wireless signals in mmWave bands (e.g., 28 GHz, 30 GHz, 38 GHz, and 60 GHz).

In order to increase a channel gain, the BS 110, the UE 120, and the UE 130 may perform beamforming. The beamforming may include transmission beamforming and/or reception beamforming. That is, the BS 110, the UE 120, and the UE 130 may assign directivity to a transmission signal or a reception signal. The BS 110 and the UEs 120 and 130 may select serving beams through a beam search procedure or a beam management procedure. After the serving beams are selected, communication may be performed through resources having a quasi co-located (QCL) relationship with resources through which the serving beams are transmitted.

The BS 110 may select a beam 112 or 113 in a specific direction. Further, the BS 110 may communicate with the UE through the beam 112 or 113 in the specific direction. For example, the BS 110 may receive a signal from the UE 120 or transmit a signal to the UE 120 through the beam 112. The UE 120 may receive a signal from the BS 110 or transmit a signal to the BS 110 through a beam 121. Further, the BS 110 may receive a signal from the UE 130 or transmit a signal to the UE 130 through the beam 113. The UE 130 may receive a signal from the BS 110 or transmit a signal to the BS 110 through a beam 131.

Figure 2:
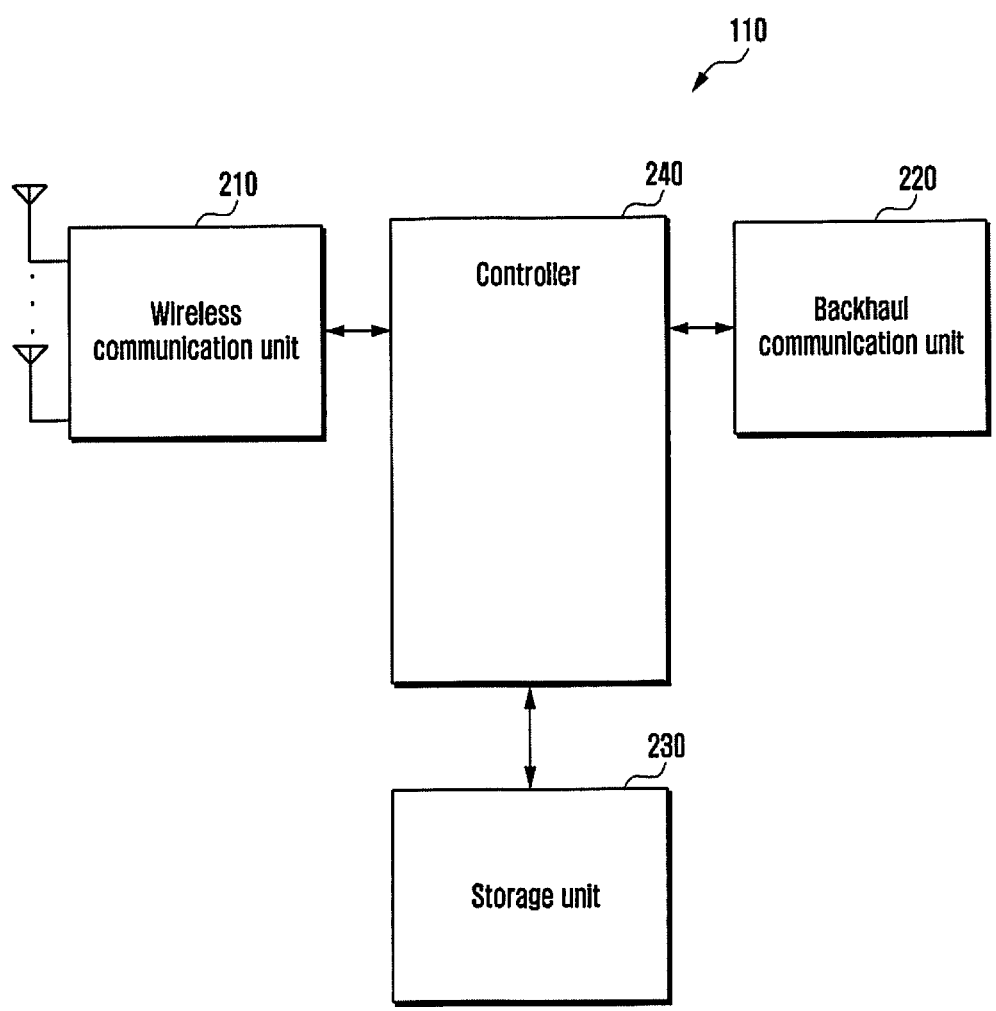
FIG. 2 illustrates a base station (BS) in a wireless communication system according to an embodiment.

FIG. 2 illustrates a BS in a wireless communication system according to an embodiment. For example, the configuration illustrated in FIG. 2 may be that of the BS 110 in FIG. 1.

Referring to FIG. 2, the BS includes a wireless communication unit 210, a backhaul communication unit 220, a storage unit 230, and a controller 240.

The wireless communication unit (or a transceiver) 210 may perform functions for transmitting and receiving a signal through a wireless channel. The wireless communication unit 210 may perform a function of conversion between a baseband signal and a bitstream according to the physical layer standard of the system. In signal transmission, the wireless communication unit 210 may generate complex symbols by encoding and modulating a transmission bitstream. In signal reception, the wireless communication unit 210 may reconstruct the transmission bitstream by decoding and demodulating the received baseband signal.

The wireless communication unit 210 up-converts a baseband signal into a radio frequency (RF) band signal, transmits the same through an antenna, and down-converts an RF band signal received through an antenna into a baseband signal. The wireless communication unit 210 may include a transmission filter, a reception filter, an amplifier, a mixer, an oscillator, a digital-to-analog convertor (DAC), an analog-to-digital convertor (ADC), etc. Further, the wireless communication unit 210 may include a plurality of RF chains corresponding to a plurality of transmission/reception paths. In addition, the wireless communication unit 210 may include at least one antenna array including a plurality of antenna elements.

On the hardware side, the communication unit 210 may include a digital unit and an analog unit, and the analog unit may include a plurality of subunits according to operation power, operation frequency, etc. The digital unit may be implemented by at least one processor (e.g., a digital signal processor (DSP)).

The wireless communication unit 210 may transmit and receive a signal as described above. Accordingly, all or part of the wireless communication unit 210 may be referred to as a "transmitter", a "receiver", or a "transceiver". In the following description, transmission and reception performed through a wireless channel may be used to include the processing performed by the wireless communication unit 210. The wireless communication unit 210 may include at least one transceiver.

The backhaul communication unit 220 may provide an interface for communicating with other nodes within the network. That is, the backhaul communication unit 220 may convert a bitstream, which the BS transmits to another node, e.g., another access node, another BS, a higher node, a core network, etc., into a physical signal and convert a physical signal received from another node to a bitstream.

The storage unit 230 may store data such as a basic program, an application, configuration information, etc., for the operation of the BS. The storage unit 230 may include volatile memory, nonvolatile memory, or a combination thereof. The storage unit 230 may provide the stored data according to a request of the controller 240. The storage unit 230 may include at least one memory.

The controller 240 may control the overall operation of the BS. The controller 240 may transmit and receive a signal through the wireless communication unit 210 or the backhaul communication unit 220. Further, the controller 240 may record data in the storage unit 230 and read the same. The controller 240 may perform the functions of a protocol stack according to communication standards. A protocol stack may be included in the wireless communication unit 210. The controller 240 may include at least one processor.

The controller 240 may control the BS to perform operations according to at least one of various embodiments described below. The controller 240 may perform a channel access procedure for an unlicensed band. The wireless communication unit 210 may receive signals transmitted in the unlicensed band, and the controller 240 may compare a strength of the received signal with a threshold value determined as a predefined value or a value of a function having a bandwidth as a factor and determine whether the unlicensed band is in an idle state. The controller 240 may transmit a control signal to the UE or receive a control signal from the UE through the transceiver. The controller 240 may transmit data to the UE or receive data from the UE through the wireless communication unit 210. The controller 240 may determine a transmission result of a signal transmitted to the UE based on a control signal or data signal received from the UE. The controller 240 may configure DL control information (DCI) for allocating one or more data channels to one or more cells and may transmit the DCI to the UE through the wireless communication unit 210. The controller 240 may provide configuration information required for allocating one or more data channels by DCI to the UE through higher layer signaling before transmission of the DCI. The controller 240 may transmit a data channel to the UE or receive a data channel from the UE based on configuration information and information fields included in the DCI.

The controller 240 may maintain or change a length of a contention window (CW) (hereinafter, referred to as "CW adjustment") for the channel access procedure based on a transmission result, i.e., the result of reception of the control signal or the data signal by the terminal. The controller 240 may determine a reference window in order to acquire the transmission result for the CW adjustment. The controller 240 may determine a data channel for the CW adjustment in the reference window. The controller 240 may determine a reference control channel for the CW adjustment in the reference window. If it is determined that the unlicensed band is in the idle state, the controller 240 may occupy a channel.

The controller 240 may perform control to receive UL control information (UCI) from the UE through the wireless communication unit 210 and identify whether it should retransmit a DL data channel and/or whether it should change a coding scheme through hybrid automatic repeat request-acknowledgement (HARQ-ACK) information included in the UCI and/or channel state information (CSI). The controller 240 generate DCI that requests scheduling initial transmission or retransmission of DL data or transmitting UCI, and may transmit the DCI to the UE through the wireless communication unit 210. The controller 240 may control the wireless communication unit 210 to receive UL data and/or UCI (re)transmitted according to the DCI.

Figure 3:
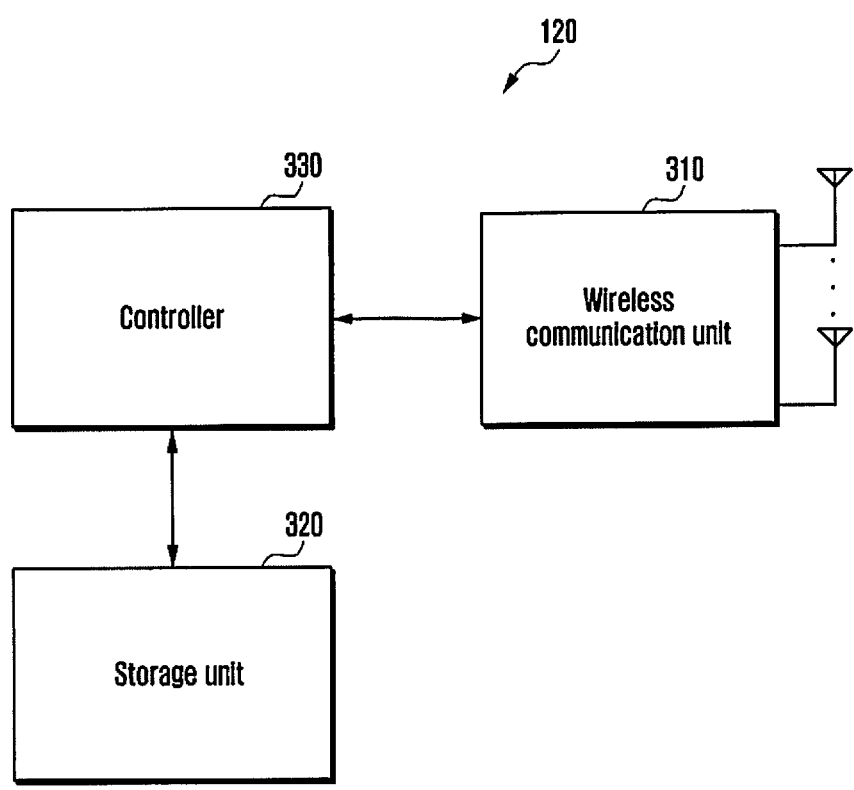
FIG. 3 illustrates a user equipment (UE) in a wireless communication system according to an embodiment.

FIG. 3 illustrates a UE in a wireless communication system according to an embodiment. For example, the configuration illustrated in FIG. 3 may be that of the UE 120 or 130 in FIG. 1.

Referring to FIG. 3, the UE includes a wireless communication unit 310, a storage unit 320, and a controller 330.

The wireless communication unit (or transceiver) 310 may perform functions for transmitting and receiving a signal through a wireless channel. The wireless communication unit 310 may perform a function of conversion between a baseband signal and a bitstream according to the physical layer standard of the system. In signal transmission, the wireless communication unit 310 may generate complex symbols by encoding and modulating a transmission bitstream. In signal reception, the wireless communication unit 310 may reconstruct the transmission bitstream by decoding and demodulating the received baseband signal. The wireless communication unit 310 may up-convert the baseband signal into an RF band signal, transmit the same through an antenna, and then down-convert an RF band signal received through an antenna into a baseband signal. The wireless communication unit 310 may include a transmission filter, a reception filter, an amplifier, a mixer, an oscillator, a DAC, an ADC, etc.

The wireless communication unit 310 may include a plurality of transmission/reception paths. Further, the wireless communication unit 310 may include at least one antenna array including a plurality of antenna elements.

On the hardware side, the wireless communication unit 310 may include a digital circuit and an analog circuit (e.g., an RF integrated circuit (RFIC)). The digital unit and the analog unit may be implemented as a single package. The wireless communication unit 310 may include a plurality of chains. In addition, the wireless communication unit 310 may include at least one antenna array including a plurality of antenna elements to perform beamforming.

The wireless communication unit 310 may transmit and receive a signal as described above. Accordingly, all or part of the wireless communication unit 310 may be referred to as a "transmitter," a "receiver," or a "transceiver".

In the following description, transmission and reception performed through a wireless channel may be used to include the processing performed by the wireless communication unit 310 described above. The wireless communication unit 310 may include at least one transceiver.

The storage unit 320 may store data such as a basic program for the operation of the UE, an application, and configuration information. The storage unit 320 may include volatile memory, nonvolatile memory, or a combination thereof. The storage unit 320 may provide the stored data according to a request of the controller 330. The storage unit 320 may include at least one memory.

The controller 330 may control the overall operation of the UE. The controller 330 may transmit and receive a signal through the wireless communication unit 310. The controller 330 may record data in the storage unit 320 and read the same. The controller 330 may perform the functions of a protocol stack required by the communication standard. The controller 330 may include at least one processor or microprocessor, or may be a part of the processor. Further, a part of the wireless communication unit 310 and/or the controller 330 may be referred to as a communication processor.

The controller 330 may control the UE to perform operations according to at least one of various embodiments described below. For example, the controller 330 may receive, from the BS, a DL signal (e.g., DL control signal or DL data) through the communication unit 310.

The controller 330 may determine a transmission result of the DL signal. The transmission result may include an acknowledgement (ACK), a negative ACK (HACK), discontinuous transmission (DTX), etc., as feedback of the transmitted DL signal. The transmission result may also be referred to using various terms, such as "DL signal reception state," "reception result," "decoding result," and "HARQ-ACK information."

The controller 330 may transmit an UL signal as a response signal of the DL signal to the BS through the communication unit 310. The UL signal may explicitly or implicitly include the result of transmission of the DL signal. The controller 330 may include HARQ-ACK information and/or the CSI in UL control signal and transmit the UCI to the BS through the wireless communication unit 310. The UCI may be transmitted along with UL data through a UL data channel or transmitted without UL data, to the BS, through the UL data channel.

The controller 330 may perform a channel access procedure for the unlicensed band. The wireless communication unit 310 may receive signals transmitted in the unlicensed band, and the controller 330 may compare a strength of the received signal with a threshold value determined as a predefined value or a value of a function having a bandwidth as a factor and determine whether the unlicensed band is in an idle state. The controller 330 may perform the access procedure for the unlicensed band in order to transmit a signal to the BS. Further, the controller 330 may determine UL transmission resources for transmitting UCI using the result of the channel access procedure and at least one piece of the DCI received from the BS and transmit the UCI to the BS through the communication unit 310.

The controller 330 may receive higher layer signaling including configuration information for receiving DCI configured to allocate one or more data channels to one or more cells from the BS through the wireless communication unit 310. The controller 330 may receive the DCI based on the configuration information and analyze fields included in the DCI. Further, the controller 330 may transmit a data channel to the BS or receive a data channel from the BS based on the configuration information and information fields included in the DCI.

Figure 4:
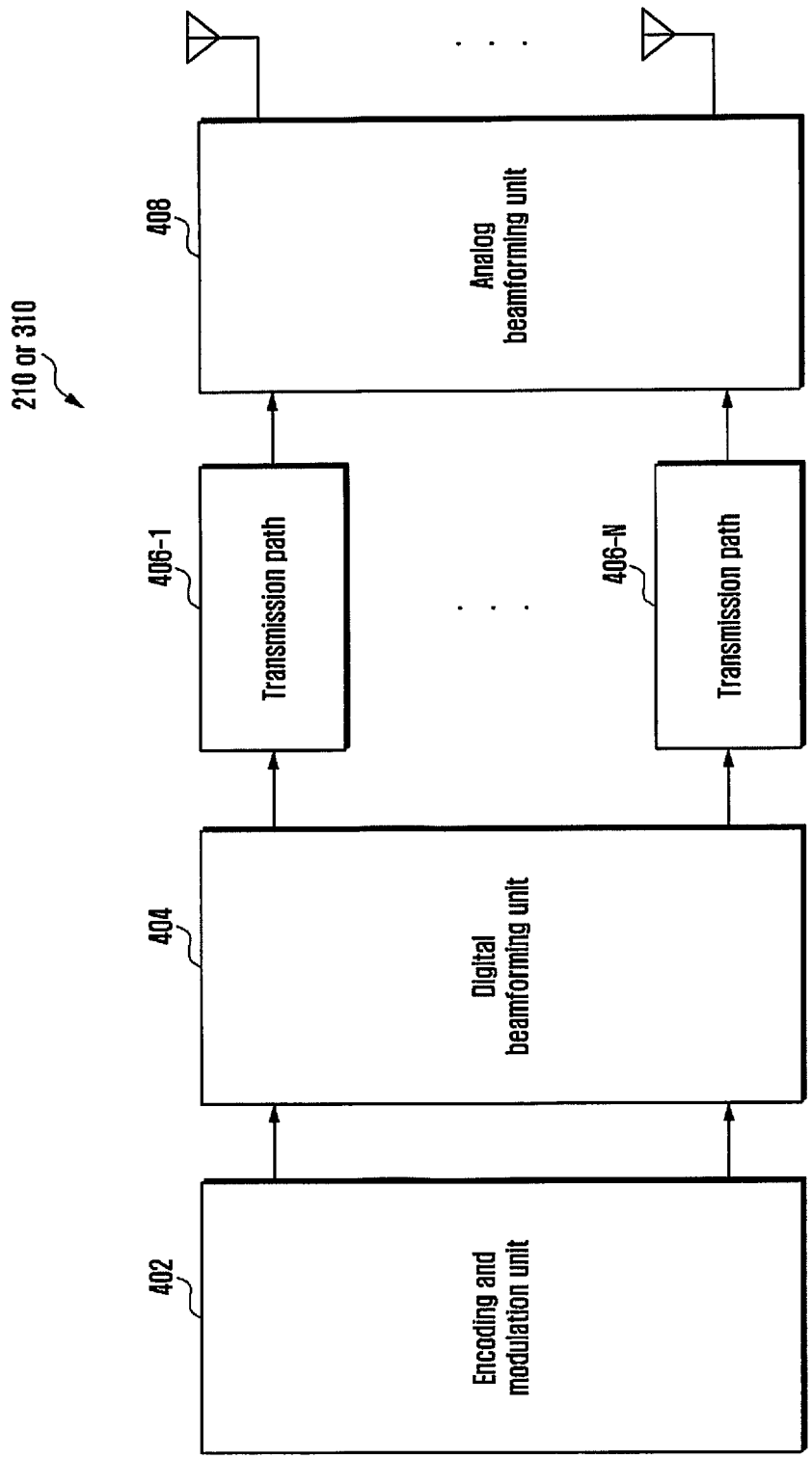
FIG. 4 illustrates a communication unit in a wireless communication system according to an embodiment.

FIG. 4 illustrates a communication unit in a wireless communication system according to an embodiment. For example, the wireless communication unit 210 of FIG. 2 or the wireless communication unit 310 of FIG. 3 may have the detailed configuration illustrated in FIG. 4.

Referring to FIG. 4, the wireless communication unit includes an encoding and modulation unit 402, a digital beamforming unit 404, a plurality of transmission paths 406-1 to 406-N, and an analog beamforming unit 408.

The encoding and modulation unit 402 may perform channel encoding. For the channel encoding, at least one of a low-density parity check (LDPC) code, a convolution code, or a polar code may be used. The encoding and modulation unit 402 may generate modulation symbols by performing constellation mapping for encoded bits.

The digital beamforming unit 404 may perform beamforming for digital signals (e.g., modulation symbols). The digital beamforming unit 404 may multiply beamforming weights by modulation symbols. The beamforming weights may be used for changing the size and phase of the signal, and may be referred to as a "precoding matrix" or a "precoder". The digital beamforming unit 404 may output digital-beamformed (i.e., precoded) modulation symbols to the plurality of transmission paths 406-1 to 406-N. According to a MIMO transmission scheme, the modulation symbols may be multiplexed, or the same modulation symbols may be provided to the plurality of transmission paths 406-1 to 406-N.

The plurality of transmission paths 406-1 to 406-N may convert the digital-beamformed digital signals into analog signals. Each of the plurality of transmission paths 406-1 to 406-N may include an inverse fast Fourier transform (IFFT) calculator, a cyclic prefix (CP) inserter, a DAC, and an up-converter. The CP inserter is for an OFDM scheme, and may be omitted when another physical layer scheme (e.g., an FBMC) is applied. The plurality of transmission paths 406-1 to 406-N may provide independent signal-processing processes for a plurality of streams generated through the digital beamforming. According to an implementation scheme, some of the elements of the plurality of transmission paths 406-1 to 406-N may be used in common.

The analog beamforming unit 408 may perform beamforming for the analog signals from the plurality of transmission paths 406-1 to 406-N and connect the same with at least one antenna array including a plurality of antenna elements. The analog beamforming unit 408 may multiply beamforming weights by the analog signals. The beamforming weights may be used to change the size and phase of the signal.

According to the structure of the connection between the plurality of transmission paths 406-1 to 406-N and the antennas, the analog beamforming unit 408 may be configured in various forms. For example, each of the plurality of transmission paths 406-1 to 406-N may be connected to one antenna array, or all of the plurality of transmission paths 406-1 to 406-N may be connected to one antenna array. As another example, the plurality of transmission paths 406-1 to 406-N may be adaptively connected to one antenna array or to two or more antenna arrays.

<Frame Structure>

Figure 5:
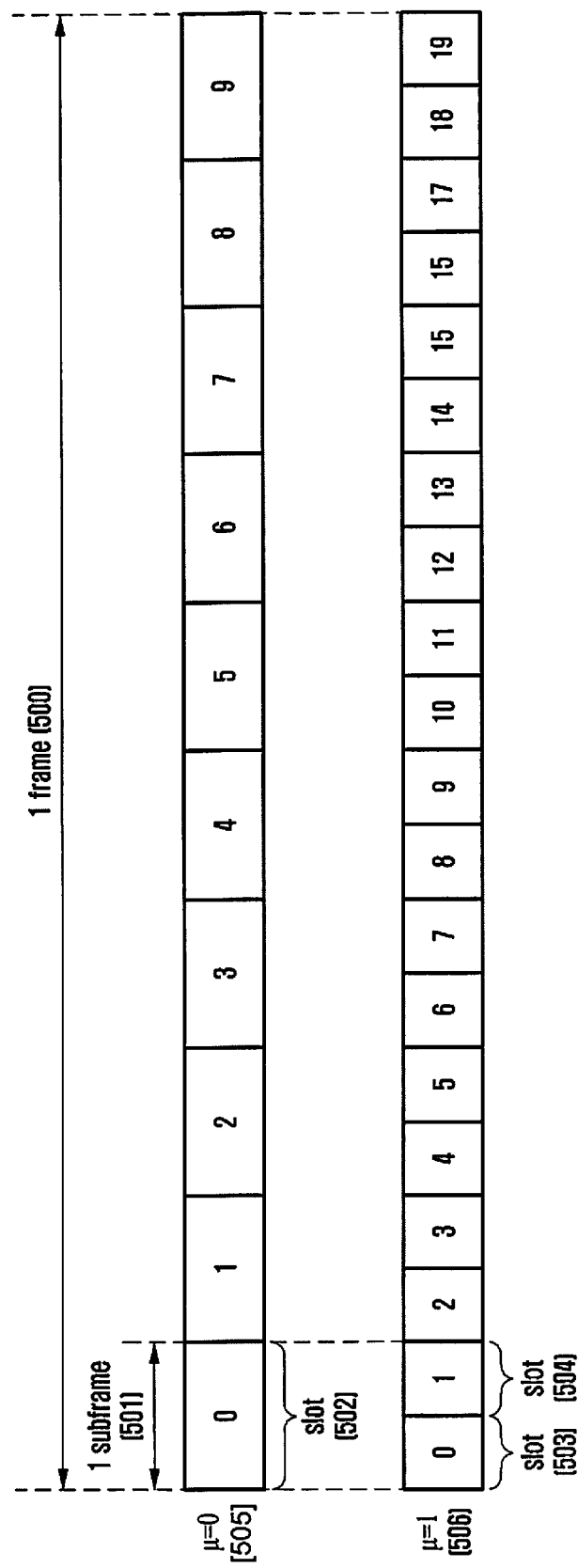
FIG. 5 illustrates a structure of a frame, a subframe, and a slot in a 5G communication system.

FIG. 5 illustrates a frame, a subframe, and a slot in a 5G communication system.

Referring to FIG. 5, a frame 500 includes a plurality of subframes, each including at least one slot. More specifically, a subframe 501 includes slot 502 in the case 505 of $\mu=0$ indicating subcarrier spacing (SCS) of 15 kHz, and slots 503 and 504 in the case 506 of $\mu=1$ indicating SCS of 30 kHz. The frame 500 may be defined as 10 ms, and the subframe 501 may be defined as 1 ms, such that frame 500 includes a total of 10 subframes of 1 ms.

One slot may be configured or defined as fourteen OFDM symbols. That is, the number $N_{symb}^{slot}$ of symbols per slot is 14. The number $N_{symb}^{subframe,\mu}$ of slots per subframe 501 may vary depending on values (numerology) of $\mu$, as described above.

Since the number of slots per subframe may vary depending on the configuration value $\mu$ for SCS, the number $N_{symb}^{frame,\mu}$ of slots per frame may also vary. The configuration value $\mu$ for SCS and $N_{symb}^{subframe,\mu}$ and $N_{symb}^{frame,\mu}$ according to $\mu$ may be defined as shown in Table 1 below. When $\mu=2$, the UE may additionally receive a configuration of a CP from the BS through higher layer signaling.

TABLE 1

| $\mu$ | $\Delta f = 2^\mu \cdot 15$[kHz] | CP | $N_{symb}^{slot}$ | $N_{slot}^{frame,\mu}$ | $N_{slot}^{subframe,\mu}$ |
| --- | --- | --- | --- | --- | --- |
| 0 | 15 | Normal | 14 | 10 | 1 |
| 1 | 30 | Normal | 14 | 20 | 2 |
| 2 | 60 | Normal, Extended | 14 | 40 | 4 |
| 3 | 120 | Normal | 14 | 80 | 8 |
| 4 | 240 | Normal | 14 | 160 | 16 |

Higher layer signaling or a higher signal may be at least one of radio resource control (RRC) signaling, packet data convergence protocol (PDCP) signaling, or a medium access control (MAC) control element (CE). Further, higher layer signaling or the higher signal may include system information, such a system information block (SIB) transmitted in common to a plurality of UEs, and may further include information (e.g., physical broadcast channel (PBCH) payload) except for a master information block (MIB) among information transmitted through a PBCH). The MIB may be indicated to be included in the higher layer signaling or the higher signal.

<Carrier Bandwidth>

Figure 6:
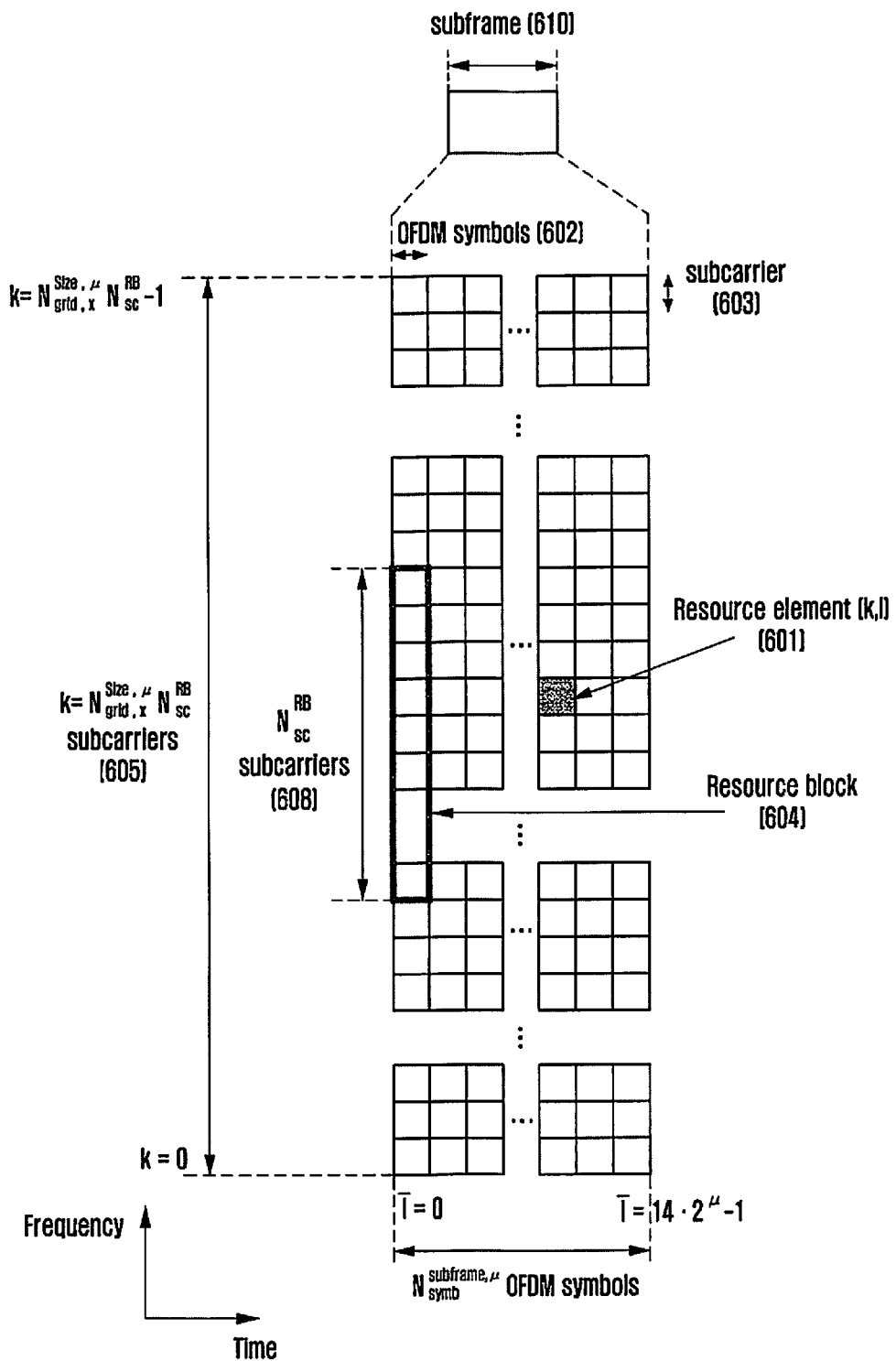
FIG. 6 illustrates a basic structure of a time-frequency domain in a 5G communication system.

FIG. 6 illustrates a basic structure of a time-frequency domain in a 5G communication system. That is, FIG. 6 illustrates the basic structure of the time-frequency domain, which is a radio resource area in which data or a control channel is transmitted in the 5G system.

Referring to FIG. 6, the horizontal axis indicates a time domain and the vertical axis indicates a frequency domain. A basic unit of resources in the time and frequency domain is a resource element (RE) 601 and may be defined as one OFDM symbol 602 in the time axis and one subcarrier 603 in the frequency axis. In the frequency domain, $N_{sc}^{RB}$ (e.g., 12) successive REs may constitute one resource block (RB) 604.

For the configuration value $\mu$ of each SCS and the carrier, one resource grid including $N_{grid,x}^{size,\mu}N_{sc}^{RB}$ subcarriers and $N_{symb}^{subframe,\mu}$ OFDM symbols may be defined to start from a common RB (CRB) $N_{grid,x}^{start,\mu}$ indicated through higher layer signaling, and there may be one resource grid for a given antenna port, SCS configuration μ, and transmission direction (e.g., DL, UL, or SL).

The BS may transfer a carrier bandwidth $N_{grid}^{size,\mu}$ of the SCS configuration μ and a start location $N_{grid,x}^{start,\mu}$ for the UL and the DL to the UE through higher layer signaling (e.g., higher layer parameters "carrierBandwidth" and "offsetToCarrier"). The carrier bandwidth $N_{grid,x}^{size,\mu}$ may be configured by the higher layer parameter "carrierBandwidth" for the SCS configuration μ, and the start location $N_{grid,x}^{start,\mu}$ is a frequency offset of a subcarrier having the lowest frequency among available resources of the carrier for Point A and may be indicated by the number of RBs. $N_{grid,x}^{size,\mu}$ and $N_{grid,x}^{start,\mu}$ may be values in units of subcarriers. The UE receiving the parameters may know the start location and the size of the carrier bandwidth through $N_{grid,x}^{size,\mu}$ and $N_{grid,x}^{start,\mu}$. An example of higher layer signaling information for transmitting $N_{grid,x}^{size,\mu}$ and $N_{grid,x}^{start,\mu}$ is described below.

Higher Layer Signaling Information Element
SCS-SpecificCarrier

```
SCS-SpecificCarrier ::= SEQUENCE {
offsetToCarrier           INTEGER (0..2199),
subcarrierSpacing         ,
carrierBandwidth          INTEGER (1..maxNrofPhysicalResourceBlocks),
...,
[[
txDirectCurrentLocation INTEGER (0..4095)    OPTIONAL  --
Need S
]]
}
```

Point A is a value that provides a common reference point for an RB grid. The UE may acquire Point A through "offsetToPointA" corresponding to a higher layer parameter in the DL of a PCell, and may acquire Point A through an absolute RF channel number (ARFCN) configured by "absoluteFrequencyPointA" corresponding to the higher layer parameter in all the remaining cases. Here, "offsetToPointA" is a frequency offset between Point A and the lowest subcarrier of an RB having the lowest frequency among RBs overlapping a synchronization signal (SS)/PBCH selected or used by the UE in an initial cell selection process of the UE, and is expressed in units of RBs.

A number or an index of the CRB increases by one from 0 in a direction in which the value increases in the frequency domain. The center of the subcarrier index of 0 of the CRB is the same as Point A for the SCS μ. The index of the CRB in the frequency domain $n_{CRB}^{\mu}$ and the RE of the SCS μ have the relation of $n_{CRB}^{\mu} = \lfloor k/N_{sc}^{RB} \rfloor$. In the relation, k is a value relatively defined from Point A. That is, k=0 corresponds to Point A.

A physical RB (PRB) of the SCS μ is defined as a number of an index from 0 to $N_{BWP,i}^{size,\mu}-1$ within a BWP. Here, i denotes a number or an index of the BWP. The relation between the PRB $n_{PRB}^{\mu}$ and the CRB $n_{CRB}^{\mu}$ within the BWP i is $n_{CRB}^{\mu} = n_{PRB}^{\mu} + N_{BWP,i}^{start,\mu}$. $N_{BWP,i}^{size,\mu}$ is the number of CRBs from CRB0 to a first RB at which the BWP i starts.
<BWP>

Figure 7:
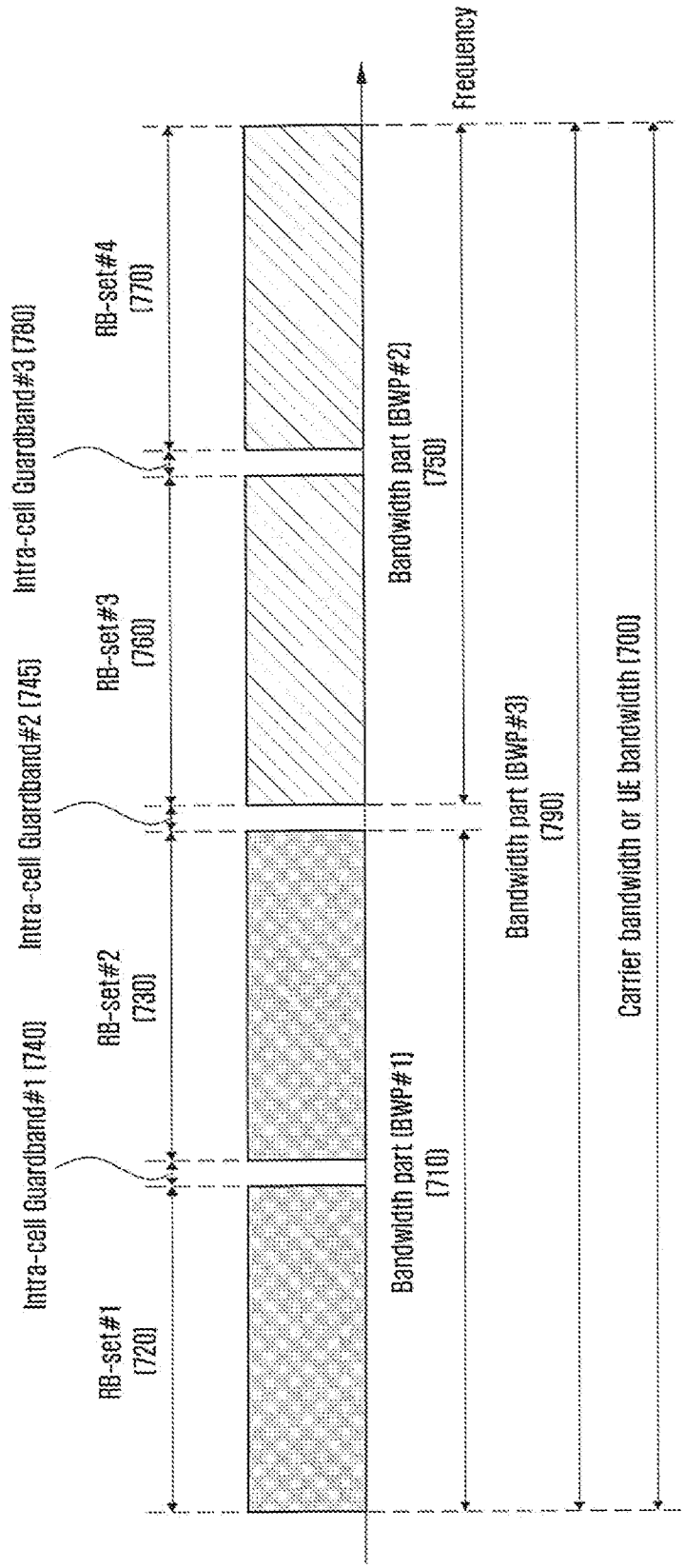
FIG. 7 illustrates a configuration of a bandwidth part (BWP) and a guard band within a cell in a 5G communication system.

FIG. 7 illustrates a configuration of a BWP and guard bands within a cell in a 5G communication system.

Referring to FIG. 7, a plurality of BWPs, BWP #1 710, BWP #2 750, and BWP #3 790, may be configured within a carrier bandwidth or a UE bandwidth 700. BWP #3 790 occupies the entire UE bandwidth 700. BWP #1 710 and BWP #2 750 occupy a lower half and an upper half of the UE bandwidth 700, respectively.

The BS may configure one or a plurality of BWPs within a UL or a DL to the UE, and one or more of higher layer parameters below may be configured to each BWP. The configuration for the BWP may be independent for the UL and the DL.

Example of Higher Layer Signaling Information Element BWP

```
BWP ::=                    SEQUENCE {
   bwp-Id                  BWP-Id,
   locationAndBandwidth    INTEGER (1..65536),
   subcarrierSpacing       ENUMERATED {n0, n1, n2, n3, n4, n5},
   cyclicPrefix            ENUMERATED { extended }
}
```

Above, "bwp-Id" denotes a BWP identifier, "locationAndBandwidth" denotes a frequency domain location of the BWP and a bandwidth, "subcarrierSpacing" denotes SCS used for the BWP, and "cyclicPrefix" denotes whether an extended CP is used or a normal CP is used within the BWP.

Other than the above parameters, various parameters related to the BWP may also be configured in the UE. The parameters may be transmitted to the UE by the BS through higher layer signaling, e.g., RRC signaling. Within a given time, the one configured BWP or at least one of plurality of configured BWPs may be activated. Indication of the activation for the configured BWP may be semi-statically transmitted to the UE through RRC signaling or dynamically transmitted through DCI used for scheduling a physical DL shared channel (PDSCH) or a physical UL shared channel (PUSCH).

The UE, before the RRC connection, may receive a configuration of an initial BWP for initial access from the BS through an MIB. More specifically, the UE may receive configuration information for a CORESET and a search space in which a physical DL control channel (PDCCH) can be transmitted through the MIB in an initial access stage. Each of the CORESET and the search space configured as the MIB may be considered as an identifier (ID) of 0. The BS may inform the UE of one or more pieces of frequency allocation information, time allocation information, and numerology for CORESET #0. The numerology may include at least one of the SCS and the CP. The CP may be at least one of a length of the CP or information corresponding to the CP length (e.g., normal or extended).

The BS may inform the UE of configuration information for a monitoring period and an occasion of CORESET #0, i.e., configuration information for search space #0 through the MIB. The UE may consider a frequency domain configured as CORESET #0 acquired from the MIB as an initial BWP for initial access. An ID of the initial BWP may be considered as 0.

The configuration for the BWP supported by 5G may be used for various purposes.

According to an embodiment, when a bandwidth supported by the UE is smaller than a system bandwidth, data transmission and reception of the UE for the system bandwidth may be supported through a configuration of the BWP. For example, the BS may configure a location of the frequency domain of the BWP in the UE in order to allow the UE to transmit and receive data at a specific frequency location within the system bandwidth.

According to an embodiment, the BS may configure a plurality of BWPs in the UE in order to support different numerologies. For example, in order to support all of the data transmission and reception using SCS of 15 kHz and SCS of 30 kHz in any UE, the BS may configure two BWPs as the SCSs of 15 kHz and 30 kHz. Different BWPs may be FDMed, and when data is transmitted/received at particular SCS, the BWP configured as the corresponding SCS may be activated.

According to an embodiment, the BS may configure BWPs having different sizes of bandwidths in the UE in order to reduce power consumption of the UE. For example, when the UE supports a very large bandwidth, e.g., 100 MHz, but transmits and receives data through the bandwidth, very high power consumption may be generated. Particularly, monitoring an unnecessary DL control channel through a large bandwidth of 100 MHz while there is no traffic is inefficient from the aspect of power consumption. In order to reduce power consumption of the UE, the BS may configure a BWP having a relatively small bandwidth, e.g., a BWP of 20 MHz in the UE. The UE may perform a monitoring operation in the BWP of 20 MHz while there is no traffic, and if data is generated, may transmit and receive data through the BWP of 100 MHz according to an instruction from the BS.

As described above, UEs, before the RRC connection, may receive configuration information for the initial BWP through the MIB in the initial access stage. More specifically, the UE may receive a configuration for a CORESET for a PDCCH from an MIB of a PBCH. A bandwidth of the CORESET configured as the MIB may be considered as an initial DL BWP, and the UE may receive a PDSCH, in which the SIB is transmitted, through the configured initial BWP. The UE may detect a PDCCH in the CORESET within the initial BWP configured as the MIB and a search space, receive remaining system information (RMSI) or SIB 1 for the initial access through the PDSCH scheduled by the PDCCH, and acquire configuration information for an UL initial BWP through SIB 1 (or RMSI). The initial BWP may be used for receiving the SIB and also other system information (OSI), paging, or random access.

When one or more BWPs are configured in the UE, the BS may instruct the UE to change the BWPs through a BWP indicator field within the DCI.

For example, in FIG. 7, when a currently activated BWP of the UE is BWP #1 710, the BS may indicate BWP #2 750 to the UE through a BWP indicator within the DCI, and the UE may change the BWP to indicated BWP #2 750 on the basis of the received BWP indicator within the DCI.

Because the DCI-based BWP change may be indicated by the DCI for scheduling the PDSCH or the PUSCH, the UE should receive or transmit the PDSCH or the PUSCH scheduled by the DCI without difficulty in the changed BWP if the UE receives a BWP change request. To this end, the standard has defined requirements for a delay time for the BWP change ($T_{BWP}$), which may be defined as shown in Table 2 below.

TABLE 2

| | NR Slot | BWP switch delay $T_{BWP}$ (slots) | |
|---|---|---|---|
| μ | length (ms) | Type 1Note 1 | Type 2Note 1 |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a UE capability. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point which is not later than slot n+$T_{BWP}$ and transmit and receive a data channel scheduled by the DCI in the changed new BWP. When the BS desires to schedule a data channel in the new BWP, the BS may determine allocation of time domain resources for the data channel in consideration of the BWP change delay time ($T_{BWP}$) of the UE. That is, when scheduling the data channel in the new BWP, the BS may schedule the data channel after the BWP change delay time ($T_{BWP}$) through a method of determining allocation of time domain resources for the data channel. Accordingly, the UE may not expect that the DCI indicating the BWP change indicates a slot offset (K0 or K2) smaller than the BWP change delay time ($T_{BWP}$).

If the UE receives DCI (e.g., DCI format 1_1 or 0_1) indicating the BWP change, the UE may perform no transmission or reception during a time interval corresponding to symbols from a third symbol of a slot for receiving the PDCCH including the DCI to a start symbol of the slot indicated by the slot offset (K0 or K2) indicated by a time domain resource allocation field within the DCI. When the UE receives DCI indicating the BWP change in slot n and a slot offset indicated by the DCI is K, the UE may perform no transmission or reception from the third symbol of slot n to a symbol before slot n+K (that is, the last symbol of slot n+K−1).

<Intra-Cell Guard-Band>

The UE may receive a configuration of a guard band within the cell for one or more cells (or carriers). The configuration of the guard band within the cell may be for each of a DL guard band and a UL guard band.

FIG. 7 illustrates an example in which a carrier bandwidth or a UE bandwidth 700 is configured as a plurality of guard bands within the cell, i.e., guard band #1 740 within the cell, guard band #2 745 within the cell, and guard band #3 780 within the cell. Within the cell or carrier, the UE may receive a configuration of each of $N_{RB-set,x}-1$ UL/DL guard bands within the cell through higher layer signaling, e.g., "Intra-CellGuardBand-r16" which can be configured as described below. Here, x=DL or UL.

Higher Layer Signaling Information Element
IntraCellGuardBand-r16

```
IntraCellGuardBand-r16 ::= SEQUENCE (SIZE (1..ffsValue)) OF GuardBand-r16
GuardBand-r16              ::= SEQUENCE {
    startCRB-r16                    INTEGER (0..ffsValue),
    nrofCRBs-r16                    INTEGER (1..ffsValue)
}
```

Above, "startCRB" denotes a start CRB index ($GB_{s,x}^{start,\mu}$) of the guard band within the cell, and "nrofCRBs" denotes a length of the guard band within the cell and may be indicated by the number (N) of CRBs or the number (N) of PRBs. The "nrofCRBs" may be a value indicating the last CRB index ($GB_{s,x}^{end,\mu}$) of the guard band within the cell. In other words, "GuardBand" may include one or more values of (startCRB, nrofCRBs), a first value of the two values (every two values) may be the lowest CRB index $GB_{s,x}^{start,\mu}$ of the guard band within the cell and a second value may be the highest CRB index $GB_{s,x}^{end,\mu}$ of the guard band within the cell. At this time, $GB_{s,x}^{end,\mu}=GB_{s,x}^{start,\mu}+N$ is also possible. The CRB index may be indicated as a PRB index. The UE may also determine the number $N_{RB-set,x}-1$ of guard bands within the cell configured by the BS based on the number of pairs of (startCRB, nrofCRBs) included in "GuardBand" or a sequence length of "GuardBand". Within the cell or the carrier, the UE may receive a configuration indicating that there is no UL/DL guard band within the cell or that the guard band is 0 through "IntraCellGuardBand-r16". For example, when "startCRB-r16" has a negative value such as −1 or has another value which is not an integer value, the UE may determine that no UL/DL guard band within the cell exist within the cell or the carrier through the configuration.

As described above, the UE receiving the configuration of the guard band within the cell may divide a resource area except for the guard bands within the cell into resource sets (e.g., RB-set) or resource areas indicating $N_{RB-set}$ RBs in the carrier or configured BWP, or may perform UL/DL transmission and reception using resources included in the resource sets. Resource areas of each resource set may be determined as described below.

A start CRB index of a first resource set (resource set index 0): $RB_{0,x}^{start,\mu}=N_{grid,x}^{start,\mu}$ A last CRB index of a last resource set (resource set index $N_{RB-set}$): $RB_{N_{RB-set},x}^{start,\mu}=N_{grid,x}^{start,\mu}+N_{grid,x}^{size,\mu}$ A start CRB index of the other resource sets: $RB_{s+1,x}^{start,\mu}=GB_{s,x}^{end,\mu}+1$ An end CRB index of the other resource sets: $RB_{s+1,x}^{end,\mu}=GB_{s,x}^{start,\mu}-1$ Here, s=0, 1, . . . , $N_{RB-set}-1$, and $N_{grid,x}^{start,\mu}$ and $N_{grid,x}^{size,\mu}$ are an available first RB and bandwidth of the carrier according to the SCS configuration μ and may be configured through higher layer signaling.

FIG. 7 illustrates an example in which a carrier bandwidth or a UE bandwidth 700 is configured as three guard bands within the cell and four resource sets ($N_{RB-set}=4$) i.e., resource set #1 720, resource set #2 730, resource set #3 760, and resource set #4 770.

The UE may perform UL/DL transmission and reception using resources included in the resource set and guard bands within the cell. For example, when UL/DL transmission and reception resources configured or scheduled by the BS are allocated within two successive resource sets, the UE may perform UL/DL transmission and reception using guard bands within the cell included between the resource sets.

If the UE does not receive a configuration of the guard bands within the cell through higher layer signaling "intra-CellGuardBandx" (x=DL or UL), the UE may determine guard bands within the cell or resource set resource areas using the guard bands within the cell which has been predefined with the BS. The guard bands within the cell may be predefined according to SCS and the size of a carrier or a BWP. Further, the guard bands within the cell may be predefined independently for the DL and the UL, and DL and UL guard bands within the cell may be the same as each other. The predefined guard bands within the cell may mean that a start CRB index $GB_{s,x}^{start,\mu}$ of the guard band within the cell, a last CRB index $GB_{s,x}^{end,\mu}$ of the guard band within the cell, a lowest CRB index $GB_{s,x}^{start,\mu}$ of the guard band with the cell, or a highest CRB index $GB_{s,x}^{end,\mu}$ of the guard band within the cell are predefined for each guard band within the cell.

An example in which the UE receives a configuration of at least one guard band among UL/DL guard bands within a specific cell or carrier is described below.

In the case of a cell performing communication through an unlicensed band, the BS may configure one or more guard bands within a bandwidth or a BWP according to the size of a channel of the unlicensed band. An unlicensed band of 5 GHz may include a plurality of channels having the size of 20 MHz and there may be a guard band between respective channels. Accordingly, when the BS and the UE desire to perform communication through a bandwidth or a BWP larger than 20 MHz, one or more guard bands may be configured within the bandwidth or the BWP.

In communication between the BS and the UE through the unlicensed band having a channel of 20 MHz, when at least one of the BWPs 710, 750, and 790 configured by the BS is larger than 20 MHz, the UE may receive a configuration of one or more guard bands within the cell and receive a configuration for a plurality of resource sets in which each BWP has the size of 20 MHz according to the configuration of the guard bands within the cell. The UE may receive a configuration of two resource sets such as resource set #1 720 and resource set #2 730 and one guard band #1 740 within the cell for BWP #1 710 of FIG. 7. The BS and the UE may perform a channel access procedure (or LBT) for each resource set and perform UL/DL transmission and reception using resource sets which succeed in channel access. When the channel access procedure is successful in both of the two successive resource sets (e.g., resource set #1 720 and resource set #2 730), resources within guard band #1 740 within the cell included between the resource sets also may be used for UL/DL transmission and reception. If the channel access procedure fails in at least one of the two successive resource sets (e.g., resource set #1 720 and resource set #2 730), resources within guard band #1 740 within the cell included between the resource sets cannot be used for UL/DL transmission and reception.

<SS/PBCH Block>

An SS/PBCH block may be a physical layer channel block including a primary SS (PSS), a secondary SS (SSS), and a PBCH, as follows.

PSS: is a signal which is a reference of DL time/frequency synchronization and provides some information of a cell ID.

SSS: is a reference of DL time/frequency synchronization and provides the remaining cell ID information, which the PSS does not provide. In addition, the SSS may serve as a reference signal (RS) for demodulation of a PBCH.

PBCH: provides system information for transmitting and receiving a data channel and a control channel by the UE. The system information may include search space-related control information indicating radio resource mapping information of a control channel, scheduling control information for a separate data channel for transmitting system information, etc.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire an MIB from the PBCH and receive a configuration of CORESET #0 (corresponding to a CORESET having a CORESET index of 0) therefrom. The UE may monitor CORESET #0 based on an assumption that the selected SS/PBCH block (SS/PBCH block succeeding in PBCH decoding) and a demodulation RS (DMRS) transmitted in CORESET #0 are QCL. The UE may acquire system information through DCI transmitted in CORESET #0. The UE may acquire configuration information related to a random access channel (RACH) required for initial access from the acquired system information. The UE may transmit a physical RACH (PRACH) to the BS in consideration of the selected SS/PBCH block index, and the BS receiving the PRACH may acquire the SS/PBCH block index selected by the UE. The BS may know which block is selected by the UE from among the SS/PBCH blocks and that CORESET #0 related thereto is monitored.

<DCI>

In the 5G system, scheduling information for UL data (or PUSCH) or DL data (or PDSCH) is transferred from the BS to the UE through DCI. The UE may monitor or detect at least one of a fallback DCI format and a non-fallback DCI format for the PUSCH or the PDSCH. The fallback DCI format may include fields predefined between the BS and the UE, and the non-fallback DCI format may include configurable fields.

The DCI may be transmitted through a PDCCH via a channel coding and modulation process. A cyclic redundancy check (CRC) is added to a payload of the DCI and is scrambled by a Radio Network Temporary Identifier (RNTI) corresponding to the identity of the UE. Depending on the purpose of the DCI, e.g., UE-specific data transmission, a power control command, or a random access response, different RNTIs may be used. That is, the RNTI is not explicitly transmitted but is included in a CRC calculation process to be transmitted. If the DCI transmitted through the PDCCH is received, the UE may check the CRC through the allocated RNTI, and may recognize that the DCI is transmitted to the UE if the CRC result is correct.

DCI for scheduling a PDSCH for system information (SI) may be scrambled by an SI-RNTI. DCI for scheduling a PDSCH for a random access response (RAR) message may be scrambled by an random access (RA)-RNTI. DCI for scheduling a PDSCH for a paging message may be scrambled by a paging (P)-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell (C)-RNTI.

DCI format 0_0 may be used for fallback DCI for scheduling a PUSCH, in which case the CRC may be scrambled by at least one of a C-RNTI, a configured scheduling (CS)-RNTI, and a modulation and coding scheme (MCS)-C-RNTI. DCI format 0_0 having the CRC scrambled by at least one of the C-RNTI, the CS)-RNTI, and the MCS-C-RNTI may include at least one of the following information:

Control information format identifier (identifier for DCI formats): indicates an identifier for identifying a DCI format For example, when a value of a one-bit identifier through which the UE receives DCI is 0, the DCI may have a UL DCI format (e.g., DCI format 0_1). When the value of the identifier is 1, the DCI may have a DL DCI format (e.g., DCI format 1_0).

Frequency domain resource assignment: includes $\lceil \log_2(N_{RB}^{UL,BWP}(N_{RB}^{UL,BWP}+1)/2) \rceil$ bits indicating RBs that are frequency domain resources allocated through resource allocation type 1. When the UE monitors DCI format 0_0 in a common search space (CSS), $N_{RB}^{UL,BWP}$ is the size of an initial UL BWP. When the UE monitors DCI format 0_0 in a unique search space, $N_{RB}^{UL,BWP}$ is the size of a currently activated UL BWP. In other words, a BWP for determining the size of a frequency domain resource assignment field may vary depending on a search space in which the fallback DCI format is transmitted.

According to an embodiment, when PUSCH hopping is performed, $N_{UL_{hop}}$ most significant bits (MSB) among $\lceil \log_2(N_{RB}^{UL,BWP}(N_{RB}^{UL,BWP}+1)/2) \rceil$ bits may be used to indicate a frequency offset. $N_{UL_{hop}}=1$ indicates that two offsets are configured by higher layer signaling and $N_{UL_{hop}}=2$ indicates that four offsets are configured through higher layer signaling. $\lceil \log_2(N_{RB}^{UL,BWP}(N_{RB}^{UL,BWP}+1)/2) \rceil - N_{UL\_hop}$ bits indicate a frequency domain resource area allocated according to resource allocation type 1 below.

According to an embodiment, when PUSCH hopping is not performed, $\lceil \log_2(N_{RB}^{UL,BWP}(N_{RB}^{UL,BWP}+1)/2) \rceil$ bits provide a frequency domain resource area allocated according to resource allocation type 1.

Time domain resource assignment: is four bits and indicates a row index of a time domain resource assignment table including a PUSCH mapping type, a PUSCH transmission slot offset, a PUSCH start symbol, and the number of PUSCH transmission symbols. The time domain resource assignment table may be configured by higher layer signaling or preconfigured between the BS and the UE.

Frequency hopping flag: is one bit and indicates enabling or disabling of PUSCH hopping.

MCS: indicates a modulation and coding scheme used for data transmission.

New data indicator (NDI): indicates HARQ initial transmission or HARQ retransmission.

Redundancy version (RV): indicates an RV of HARQ.

HARQ process number: indicates a process number of HARQ.

TPC command: indicates a power transmission control command for a scheduled PUSCH.

Padding bit: indicates a field for matching with the size (total number of bits) of another DCI format (e.g., DCI format 1_0) and is inserted as 0 as necessary.

UL/supplementary UL (SUL) indicator: is one bit and has a one bit-UL/SUL indicator when a cell has two or more ULs and the size of DCI format 1_0 before addition of the padding bit is larger than the size of DCI format 0_0 before addition of the padding bit. Otherwise, the UL/SUL indicator does not exist or is 0 bits. If the UL/SUL indicator exists, the UL/SUL indicator is located at the last bit of DCI format 0_0 after the padding bit.

ChannelAccess-CPext: is two bits and indicates a channel access type and CP extension in a cell operating in an unlicensed band. In the case of a cell operating in a licensed band, the ChannelAccess-CPext does not exist or is 0 bits.

Refer to 3GPP standardization documents for DCI formats other than DCI format 0_0.

<Time Domain Resource Allocation>

The BS may configure a table for time domain resource allocation for a DL data channel (e.g., a PDSCH) and an UL data channel (e.g., a PUSCH) through higher layer signaling (e.g., RRC signaling) or may use a table for time domain resource allocation predefined between the BS and the UE, such as Table 3.

For example, the UE may use a predefined table such as Table 3 in the case of fallback DCI, and use a table configured through higher layer signaling in the case of non-fallback DCI.

TABLE 3

| Row index | PUSCH mapping type | K2 | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

For time domain resource allocation configured through higher layer signaling, a table including a maximum of maxNrofDL-Allocations=16 entries may be configured for the PDSCH, and a table including a maximum of maxNrofUL-Allocations=16 entries may be configured for the PUSCH. Each table may include PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location (S) and a length (L) of a start symbol in which a PDSCH or a PUSCH is scheduled within the slot, a mapping type of a PDSCH or a PUSCH, etc.

When higher layer signaling is used, the BS may notify the UE of the following information elements.

PDSCH-TimeDomainResourceAllocationList Information Element

```
PDSCH-TimeDomainResourceAllocation ::= SEQUENCE {
k0                     INTEGER(0..32) OPTIONAL, -- Need S
mappingType            ENUMERATED {typeA, typeB},
StartSymbolAndLength   INTEGER (0..127)
}
```

PUSCH-TimeDomainResourceAllocation Information Element

```
PUSCH-TimeDomainResourceAllocation ::= SEQUENCE {
k2                     INTEGER(0..32) OPTIONAL, -- Need S
mappingType            ENUMERATED {typeA, typeB},
startSymbolAndLength   INTEGER (0..127)
}
```

Above, "k0" is an offset in units of slots and indicates PDCCH-to-PDSCH timing, "k2" is an offset in units of slots and indicates PDCCH-to-PUSCH timing, "mappingType" indicates a mapping type of a PDSCH or a PUSCH, and "startSymbolAndLength" indicates a start symbol and a length of a PDSCH or a PUSCH.

The BS may notify the UE of one of the entries of the time domain resource allocation table through layer 1 (L1) signaling. For example, the entry may be indicated through a "time domain resource allocation" field within the DCI. The UE may acquire time domain resource allocation for a PDSCH or a PUSCH on the basis of the field within the DCI received from the BS.

<Frequency Domain Resource Allocation>

As a method of indicating frequency domain resource allocation for a DL data channel (e.g., a PDSCH) and a UL data channel (e.g., a PUSCH), two types are supported, i.e., resource allocation type 0 and resource allocation type 1.

Resource allocation type 0 is a method of allocating resources in units of RB groups (RBGs) including P successive RBs, and the BS may notify the UE of resource allocation type 0 in the form of a bitmap. The RBG may include a set of successive virtual RBs (VRBs), and the size P of the RBG (nominal RBG size P) may be determined on the basis of a value configured as "rbg-Size" which is a higher layer parameter and a value of the size of a BWP defined in Table 4 below.

TABLE 4

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number ($N_{RBG}$) of RBGs of a BWP i having the size of $N_{BWP,i}^{size}$ is $N_{RBG}=[(N_{BWP,i}^{size}+(N_{BWP,i}^{start} \bmod p))/p]$. The size of a first RBG is $RBG_0^{size}=P-N_{BWP,i}^{start} \bmod P$.

If the size $RBG_{last}^{size}$ of a last RBG is $(N_{BWP,i}^{start}+N_{BWP,i}^{size})$mod P>0, $RBG_{last}^{size}=(N_{BWP,i}^{start}+N_{BWP,i}^{size})$ mod P. Otherwise, $RBG_{last}^{size}$ is P. The sizes of the other RBGs are P. Bits in a bitmap having the bit size of $N_{RBG}$ may correspond to respective RBGs. Indexes may be assigned to the RBGs in the order of increasing frequencies from the lowest frequency. For $N_{RBG}$ RBGs within the BWP, RBGs from RBG #0 to RBG #($N_{RBG}$–1) may be mapped to bits from the MSB to the least significant bit (LSB) in the RBG bitmap. When a specific bit value within the bitmap is 1, the UE may determine that an RBG corresponding to the corresponding bit value is allocated. When a specific bit value within the bitmap is 0, the UE may determine that an RBG corresponding to the corresponding bit value is not allocated.

Resource allocation type 1 is a method of allocating resources to start locations and lengths for successively allocated VRBs, in which case interleaving or non-interleaving may be additionally applied to the successively allocated VRBs. A resource allocation field of resource allocation type 1 may include a resource indication value (RIV), and the RIV may include a start point $RB_{start}$ of the VRB and a length $L_{RBs}$ of successively allocated RBs. $RB_{start}$ is a first PRB index at which resource allocation starts, and $L_{RBs}$ may be allocated successive PRBs or the number thereof. More specifically, the RIV within the BWP having the size of $N_{BWP}^{size}$ may be defined as follows:

If $$(L_{RBs}-1) \leq \left\lfloor \frac{N_{BWP}^{size}}{2} \right\rfloor,$$

then RIV=$(L_{RBs}-1)+RB_{start}$

Else, RIV=$N_{BWP}^{size}(N_{BWP}^{size}-L_{RBs}-1)+(N_{BWP}^{size}-1-RB_{start})$, where $L_{RBs} \geq 1$ and shall not exceed $N_{BWP}^{size}-RB_{start}$.

$N_{BWP}^{size}$ may vary depending on a search space in which a fallback DCI format (e.g., DCI format 0_0 or DCI format 1_0) is transmitted. When DCI format 0_0, which is a fallback DCI format, is transmitted in a CSS among DCI (UL grant) for configuring or scheduling UL transmission, the size of an initial BWP, $N_{BWP,0}^{size}$, or $N_{BWP}^{initial}$ may be used as $N_{BWP}^{size}$.

Similarly, when DCI format 0_1, which is a fallback DCI format, is transmitted in a CSS among DCI for configuring or scheduling DL reception, $N_{BWP}^{size}$ or $N_{BWP}^{initial}$ is the size of CORESET #0 if CORESET #0 is configured in the cell, and is the size of an initial DL BWP if CORESET #0 is not configured.

When DCI format 0_0 or DCI format 0_1, which is a fallback DCI format, is transmitted in a UE-specific search space (USS), when the size of the fallback DCI format transmitted in the USS is determined through the size of an initial UL BWP or an initial DL BWP, or when the DCI is applied to another active BWP having the size of $N_{BWP}^{active}$, the RIV corresponds to $RB_{start}=0, K, 2K, \ldots, (N_{BWP}^{initial}-1)K$ and $L_{RBs}=K, 2K, \ldots, N_{BWP}^{initial}K$, and is defined as described follows:

If $$(L'_{RBs}-1) \leq \left\lfloor \frac{N_{BWP}^{initial}}{2} \right\rfloor,$$

then RIV=$N_{BWP}^{initial}(L'_{RBs}-1)+RB'_{start}$

Else, RIV=$N_{BWP}^{initial}(N_{BWP}^{initial}-L'_{RBs}-1)+(N_{BWP}^{initial}-1-RB'_{start})$, where $$L'_{RBs} = \frac{L_{RBs}}{K}, RB'_{start} = \frac{RB_{start}}{K},$$

and $L'_{RBs}$ shall not exceed $N_{BWP}-RB'_{start}$.

If $N_{BWP}^{active} > N_{BWP}^{initial}$, K is the largest value which satisfies $K \leq \lfloor N_{BWP}^{active}/N_{BWP}^{initial} \rfloor$ in a set of $\{1, 2, 4, 8\}$. Otherwise, if $N_{BWP}^{active} \leq N_{BWP}^{initial}$, K is 1.

The BS may configure a resource allocation type in the UE through higher layer signaling. A higher layer parameter resourceAllocation may be configured as one value of resourceAllocationType0, resourceAllocationType1, or dynamicSwitch. If the UE receives a configuration of both resource allocation types 0 and 1, or when the higher layer parameter resourceAllocation is configured as dynamicSwitch, it may indicate whether an MSB of a resource allocation field within a DCI format indicating scheduling is resource allocation type 0 or resource allocation type 1, and resource allocation information may be indicated through the remaining bits, except for the MSB of the resource allocation field, based on the indicated resource allocation type, and the UE may analyze resource allocation information of the DCI on the basis thereof. If the UE receives a configuration of resource allocation type 0 or resource allocation type 1, or when the higher layer parameter resourceAllocation is configured as resourceAllocationType0 or resourceAllocationType1, a resource allocation field within a DCI format indicating scheduling may indicate resource allocation information based on the configured resource allocation type, and the UE may analyze resource allocation information of the DCI based on the configured resource allocation type.

<Coreset>

Figure 8:
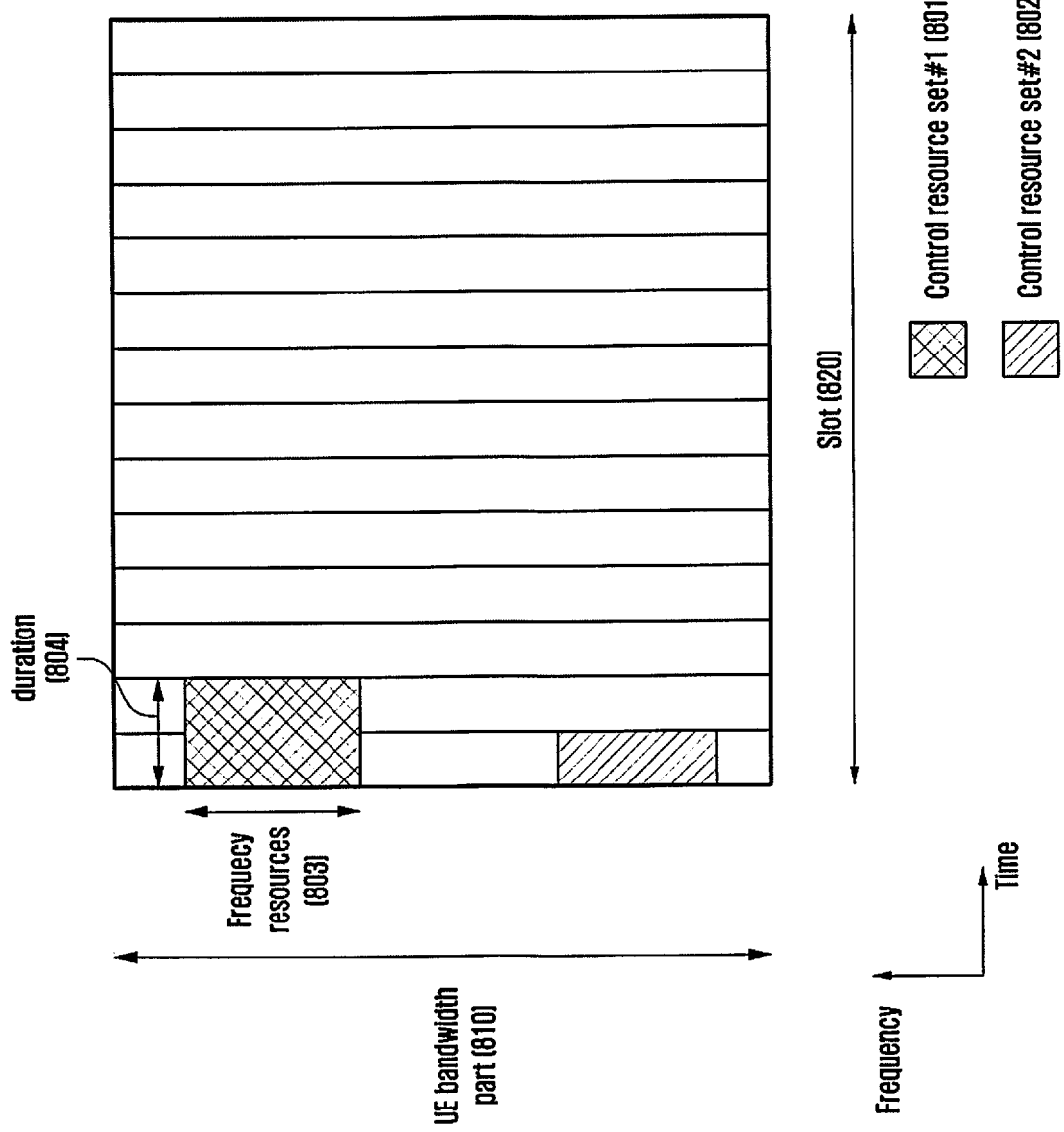
FIG. 8 illustrates a configuration of a control resource set (CORESET) of a DL control channel in a 5G communication system.

FIG. 8 illustrates a configuration of a CORESET of a DL control channel in a 5G communication system.

Referring to FIG. 8, a UE BWP 810 in a frequency domain and two CORESETs are configured, i.e., CORESET #1 801 and CORESET #2 802 within one slot 820 in a time domain. The CORESETs 801 and 802 may be configured within specific frequency resources 803 within the UE BWP 810 in the frequency domain and in one or a plurality of OFDM symbols in the time domain. The OFDM symbols may be defined as CORESET duration 804. In the example of FIG. 8, CORESET #1 801 is configured to have a CORESET length of two symbols, and CORESET #2 802 is configured to have a CORESET length of one symbol.

Each of the CORESETs may be configured through higher-layer signaling, e.g., SI, an MIB, and RRC signaling in the UE by the BS. Configuring the CORESET in the UE may include providing information such as an identity of the CORESET, a frequency location of the CORESET, a symbol length of the CORESET, etc. A higher layer signaling information element or CORESET configuration information for configuring the CORESET may include the following information.

ControlResourceSet Information Element

```
ControlResourceSet ::= SEQUENCE {
controlResourceSetId          ControlResourceSetId,
frequencyDomainResources      BIT STRING (SIZE (45)),
duration                      INTEGER (1..maxCoReSetDuration),
cce-REG-MappingType CHOICE {
interleaved SEQUENCE {
reg-BundleSize ENUMERATED {n2, n3, n6},
interleaverSize ENUMERATED {n2, n3, n6},
shiftIndex INTEGER(0..maxNrofPhysicalResourceBlocks-1)   OPTIONAL --
Need S
},
noninterleaved NULL
},
precoderGranularity ENUMERATED {sameAsREG-bundle, allContiguousRBs},
tci-StatesPDCCH-ToAddList         SEQUENCE(SIZE       (1..maxNrofTCI-
StatesPDCCH)) OF TCI-StateId OPTIONAL, -- Cond NotSIB1-initialBWP
tci-StatesPDCCH-ToReleaseList        SEQUENCE(SIZE    (1..maxNrofTCI-
StatesPDCCH)) OF TCI-StateId OPTIONAL, -- Cond NotSIB1-initialBWP
tci-PresentInDCI ENUMERATED {enabled} OPTIONAL, -- Need S
pdcch-DMRS-ScramblingID INTEGER (0..65535) OPTIONAL, -- Need S
}
```

Above, "controlResourceSetId" denotes a CORESET identity, "frequencyDomainResources" denotes frequency domain resources, "duration" denotes a time interval of the CORESET, i.e., time domain resources, "cce-REG-MappingType" denotes a CCE-to-REG mapping scheme, "reg-BundleSize" denotes the size of REG bundle, "interleaverSize" denotes the size of an interleaver, and "shiftIndex" denotes an interleaver shift.

Further, tci-StatesPDCCH is configuration information of transmission configuration indication (TCI) states, and may include one or a plurality of SS/PBCH block indexes or CSI-RS indexes having a QCL relation with a DMRS transmitted in the corresponding CORESET.

Figure 9:
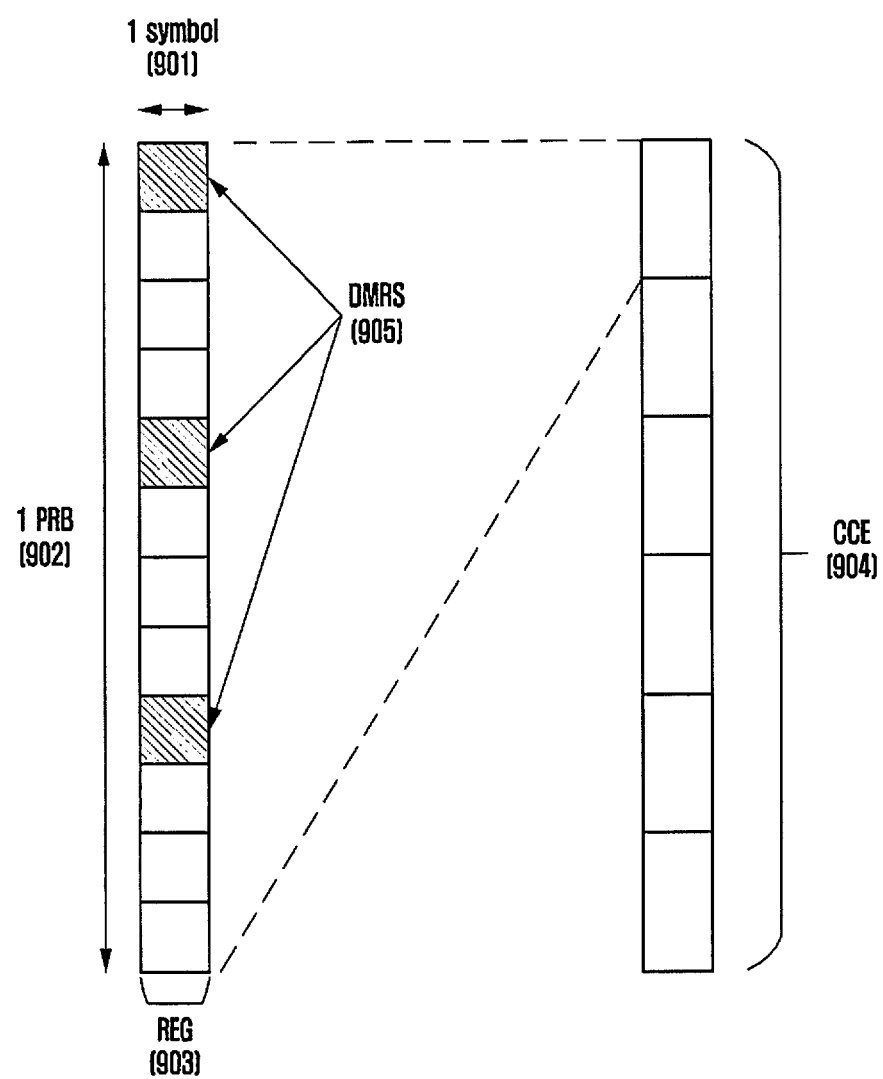
FIG. 9 illustrates a DL control channel in a 5G communication system.

FIG. 9 illustrates a DL control channel in a 5G communication system. More specifically, FIG. 9 illustrates an example of a basic unit of time and frequency resources included in a DL control channel that can be used in the 5G wireless communication system.

Referring to FIG. 9, the basic unit of time and frequency resources included in the DL control channel may be an RE Group (REG) 903, and the REG 903 may be defined by one OFDM symbol 901 in the time domain and one PRB 902, i.e., twelve subcarriers in the frequency domain. The BS may concatenate at least one REG 903 to configure an allocation unit of the DL control channel.

When a basic unit of allocation of the DL control channel in 5G is a control CE (CCE) 904, the CCE 904 may include a plurality of REGs 903. For example, the REG 903 includes twelve REs, and the CCE 904 includes six REGs 903, such that the CCE 904 includes seventy two REs.

An area in which a DL CORESET is configured may include a plurality of CCEs 904, and a specific DL control channel may be mapped to one or a plurality of CCEs 904 according to an aggregation level (AL) within the CORESET. The CCEs 904 within the CORESET may be separated by numbers, in which case the numbers of the CCEs 904 may be assigned according to a logical mapping scheme.

The basic unit of the DL control channel, i.e., the REG 903, may include all of the area of REs to which DCI is mapped and the area to which the DMRS 905 used for demodulating the DCI is mapped. At least one DMRS 905 (three DMRSs in the illustrated in FIG. 9) may be transmitted in one REG 903. The number of CCEs required to transmit the DL control channel may be 1, 2, 4, 8, or 16 according to the AL, and the different number of CCEs may be used to implement link adaptation of the DL control channel. For example, if AL=L, one DL control channel may be transmitted through L CCEs. The UE is required to detect a signal within the CORESET while the UE is not aware of the existence of the DL control channel, and a search space indicating a set of CCEs may be defined for a blind decoding. The search space is a set of DL control channel candidates including CCEs for which the UE should attempt decoding at the given AL, and the UE may have a plurality of search spaces since there are several ALs at which a group of CCEs is configured by 1, 2, 4, 8, or 16 CCEs. The search space set may be defined as a set of search spaces at all of the configured ALs.

<Search Space>

Search spaces for a PDCCH may be classified into a CSS and a USS. UEs in a predetermined group or all UEs may search for a CSS to receive dynamic scheduling for system information or cell common control information such as a paging message. For example, scheduling allocation information of a PDSCH for transmitting an SIB including service provider information of a cell may be detected through a search for a CSS. In the case of the CSS, UEs in a predetermined group or all UEs may be defined as a set of pre-appointed CCEs to receive a PDCCH. Scheduling allocation information for a UE-specific PDSCH or PUSCH may be detected through a search for a USS. The USS may be UE-specifically defined by a UE identity and a function of various system parameters.

In the 5G wireless communication system, parameters for the PDCCH search space may be configured in the UE, by the BS, through higher layer signaling (e.g., SIB, MIB, or RRC signaling). The BS may configure, in the UE, the number of PDCCH candidates at each AL L, a monitoring period of the search space, a monitoring occasion in units of symbols within the slot for the search space, a search space type (a CSS or a USS), a combination of a DCI format and an RNTI to be monitored in the corresponding search space, a CORESET index for monitoring the search space, etc. The higher layer signaling information element for configuring parameters for the PDCCH search space may include the following configuration information.

SearchSpace Information Element

```
SearchSpace ::=                          SEQUENCE {
    searchSpaceId                            SearchSpaceId,
    controlResourceSetId                     ControlResourceSetId
OPTIONAL,                -- Cond SetupOnly
    monitoringSlotPeriodicityAndOffset       CHOICE {
    ...
    }
OPTIONAL,                -- Cond Setup
    duration                                 INTEGER (2..2559)
OPTIONAL,                -- Need R
    monitoringSymbolsWithinSlot              BIT STRING (SIZE (14))
OPTIONAL,                -- Cond Setup
    nrofCandidates                           SEQUENCE {
        aggregationLevel1                    ENUMERATED {n0, n1, n2, n3, n4,
n5, n6, n8},
        aggregationLevel2                    ENUMERATED {n0, n1, n2, n3, n4,
n5, n6, n8},
        aggregationLevel4                    ENUMERATED {n0, n1, n2, n3, n4,
n5, n6, n8},
        aggregationLevel8                    ENUMERATED {n0, n1, n2, n3, n4,
n5, n6, n8},
        aggregationLevel16                   ENUMERATED {n0, n1, n2, n3, n4,
n5, n6, n8}
    }
OPTIONAL,                -- Cond Setup
    searchSpaceType                          CHOICE {
        common                                   SEQUENCE {
        ...
        },
        ue-Specific                              SEQUENCE {
        ...
        }
    }
OPTIONAL                 -- Cond Setup2
}
```

Above, "searchSpaceId" denotes a search space identifier, "controlResourceSetId" denotes a CORESET identifier, "monitoringSlotPeriodicityAndOffset" denotes a monitoring slot level period, "duration" denotes a length of a time interval for monitoring, "monitoringSymbolsWithinSlot" denotes symbols for PDCCH monitoring within the slot, "nrofCandidates" denotes the number of PDCCH candidates for each aggregation level, "searchSpaceType" denotes a search space type, "common" includes parameters for the CSS, and "ue-Specific" includes parameters for the USS.

The BS may configure one or a plurality of search space sets in the UE according to the configuration information. According to an embodiment, the BS may configure search space set 1 and search space set 2 in the UE, and the configuration may be performed such that DCI format A scrambled by an X-RNTI in search space set 1 is monitored in the CSS and DCI format B scrambled by a Y-RNTI in search space set 2 is monitored in the USS.

According to the configuration information, one or a plurality of search space sets may exist in the CSS or the USS. For example, search space set #1 and search space set #2 may be configured as CSSs, and search space set #3 and search space set #4 may be configured as USSs.

In the CSS, the following combinations of DCI formats and RNTIs may be monitored. However, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the USS, the following combinations of DCI formats and RNTIs may be monitored. However, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

Cell RNTI (C-RNTI): used for UE-specific PDSCH scheduling

Temporary cell RNTI(TC-RNTI): used for UE-specific PDSCH scheduling

Configured scheduling RNTI (CS-RNTI): used for semi-statically configured UE-specific PDSCH scheduling Random access RNTI (RA-RNTI): used for PDSCH scheduling at random access stage Paging RNTI (P-RNTI): used for PDSCH scheduling through which paging is transmitted System Information RNTI (SI-RNTI): used for PDSCH scheduling through which SI is transmitted Interruption RNTI (INT-RNTI): used for indicating whether puncturing is performed for PDSCH TPC for PUSCH RNTI (PC-PUSCH-RNTI): used for indicating PUSCH power control command TPC for PUCCH RNTI (PC-PUCCH-RNTI): used for indicating PUCCH power control command TPC for SRS RNTI (TPC-SRS-RNTI): used for indicating sounding RS (SRS) power control command The above-described DCI formats may follow the definitions in Table 5 below.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G communication system, such as NR, a physical channel and a physical signal are separated, as described below. For example, a UL/DL physical channel refers to a set of REs for transmitting information transmitted through a higher layer, and representatively corresponds to a PDCCH, a PUCCH, a PDSCH, a PUSCH, etc. A UL/DL physical signal refers to a signal used in a physical layer without transmission of information transmitted through a higher layer, and representatively corresponds to a DMRS, a CSI-RS, an SRS, etc.

Herein, the term "signal" may be used without separation between the physical channel and the physical signal. For example, "the BS transmits a DL signal" may indicate that the BS transmits at least one of a DL physical channel and a DL physical signal, such as a PDCCH, a PDSCH, a DMRS, a CSI-RS, etc. In other words, a signal in the disclosure may generally refer to both the channel and the signal, and may be separated according to the context and the occasion as necessary.

TABLE 6

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

Above, a spatial RX parameter may refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relation may be configured in the UE through the TCI-state, which is an RRC signaling parameter, and QCL-Info as described below.

Referring to the configuration information, the BS may configure one or more TCI states in the UE and inform the UE of a maximum of two QCL relations (e.g., qcl-Type 1 and qcl-Type 2) for an RS referring to an ID of the TCI state, i.e., a target RS. Here, informing of a maximum of two QCL relations is only an example, and the BS may inform the UE of two or more QCL relations for the target RS. Each piece of QCL information (QCL-Info) included in the TCI state includes a serving cell index and a BWP index of an RS indicated by the corresponding QCL information, a type and an ID of the RS, and the following QCL type.

TCI-State Information Element

```
TCI-State ::=           SEQUENCE{
    tci-StateId             TCI-StateId,
    qcl-Type1               QCL-Info,
    qcl-Type2               QCL-Info           OPTIONAL, -- Need R
    ...
}
QCL-Info ::=   SEQUENCE {
    cell                    ServCellIndex              OPTIONAL, -- Need R
    bwp-Id                  BWP-Id   OPTIONAL, -- Cond CSI-RS-Indicated
    referenceSignal         CHOICE {
        csi-rs                  NZP-CSI-RS-ResourceId,
        ssb                         SSB-Index
    },
    qcl-Type                        ENUMERATED {typeA, typeB, typeC, typeD},
    ...
}
```

<TCI State>

The TCI state is used to notify of a QCL relation between a PDCCH (or a PDCCH DMRS) and another RS or a channel. Antenna port A (reference RS #A) of an RS and antenna port B (target RS #B) of a target RS, which are QCLed, indicates that some or all of channel-related parameters estimated in antenna port A by the UE are allowed to be applied to channel measurement from antenna port B. QCL-related parameters may include at least one of: 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter, and it may be required to correlate different parameters according to circumstances. In NR, for example, four types of QCL relations, as shown in Table 6, may be supported.

Above, "tci-StateId" denotes a TCI state ID, "qcl-Type1" includes QCL information of a first target RS referring to the TCI state ID, and "qcl-Type2" includes QCL information of a second target RS referring to the TCI state ID. For each piece of the QCL information, "cell" denotes a serving cell index of the UE in which the RS indicated by the QCL information is configured, "bwp-Id" denotes a BWP index of the RS indicated by the QCL information, and "csi-rs" or "ssb" denotes a CSI RS ID or a SS/sequence block (SSB) ID indicated by the QCL information.

The BS may communicate with the UE using one or a plurality of beams. To this end, the BS may transfer information on N different beams to the UE through N different TCI states. For example, when N=3, the BS makes a qcl-Type parameter (e.g., qcl-Type2) included in three TCI states associated with a CSI-RS or an SSB corresponding to different beams and configured as QCL type D, and thus, may inform the UE that antenna ports referring to the different TCI states are associated with different spatial Rx parameters, i.e., different beams. Table 7 provides an example of a combination of TCI states that can be applied to a PDCCH DMRS antenna port. In Table 7, a fourth row corresponds to a combination assumed by the UE before the RRC configuration, and cannot be configured in the UE after the RRC configuration.

TABLE 7

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

The BS supports hierarchical signaling to dynamically allocate TCI states for PDCCH beams to the UE. Specifically, the BS may configure N TCI states (TCI #0, TCI #1, . . . , TCI #M−1) in the UE through RRC signaling, and configure the part thereof as a TCI state for a CORESET. Thereafter, the BS may indicate, to the UE, and activate one of the TCI states for the CORESET through MAC CE signaling (e.g., a MAC CE activation command for providing the TCI state of the CORESET). The UE receiving MAC CE signaling may apply a TCI state indicated by the MAC CE signaling, starting at a first slot after $3 \cdot N_{slot}^{subframe,\mu}$ slots from a slot (e.g., slot k) for transmitting HARQ-ACK information for the PDSCH providing the MAC CE signaling and receive the PDCCH on the basis of beam information including the TCI state. $N_{slot}^{subframe,\mu}$ is the number of slots included in each subframe for SCS μ.

A MAC CE for indicating the TCI state of the PDCCH may be configured by 2 bytes (16 bits), and may include a 5-bit serving cell ID field, a 4-bit CORESET ID field, and a 7-bit TCI state ID field. The serving cell ID field may indicate an ID of a serving cell to which the MAC CE is applied, and the CORESET ID field may indicate an ID of a CORSET indicated by the TCI state of the MAC CE or to which the TCI state of the MAC CE is applied. The TCI state ID field may indicate a TCI state applied to a CORESET identified through a CORESET ID field. If the CORSET ID is 0, the TCI state ID field may indicate one of 64 TCI states from a first TCI state among the TCI states configured through "tci-States-ToAddModList" and "tci-States-ToReleaseList" in "PDSCH-Config", which is higher layer signaling for the activated BWP. If the CORESET ID is configured as a value which is not 0, the TCI state ID field may indicate one of the TCI states configured through "tci-StatesPDCCH-ToAddList" and "tci-StatesPDCCH-ToReleaseList", which are higher layer signaling for the CORESET indicated by the CORESET ID field.

As described above, the UE receiving the indication and/or activation of the TCI state for the CORESET through MAC CE signaling may consider that the same QCL information is applied to one or more search spaces to which the CORESET is connected before another TCI state is indicated through other MAC CE signaling.

<TCI State for Radio Link Monitoring (RLM)>

If RLM-RS-related higher configuration information is not configured in the UE or the UE does not receive the same, but the UE inserts one or a plurality of CSI-RSs into the configured or received TCI states for PDCCH reception, the UE may operate as follows.

If the TCI state activated for PDCCH reception includes only one RS, the UE performs an RLM operation using the RS.

The UE does not need to perform RLM using an aperiodic RS or a semi-persistent RS.

If $L_{max}=4$, the UE selects $N_{RLM}$ RSs in the order of a short PDCCH monitoring period from among search spaces associated with the CORESET in which the PDCCH is transmitted among RSs of the TCI state activated and provided for PDCCH reception. When search spaces for one or more CORESETs have the same PDCCH monitoring period, the UE may determine selection sequences of the CORESETs in the order of a higher CORESET index.

The UE receiving a configuration of a plurality of DL BWPs for the serving cell may perform RLM using the following RS. The RS is an RS corresponding to an RS index configured or provided through "RadioLinkMonitoringRS", which is higher layer signaling for the activated DL BWP or an RS of the TCI-state configured and activated in the CORESET for PDCCH reception in the activated DL BWP, if the RS is not configured or provided through "RadioLinkMonitoringRS", which is higher layer signaling for the activated DL BWP.

<TCI State for PDCCH Assignment>

The UE receiving 0 as a C-RNTI and a search space ID for a type 0/0A/2 PDCCH CSS set may determine a PDCCH monitoring occasion of the type 0/0A/2 PDCCH CSS set as described below, and monitor PDCCH candidates at a PDCCH monitoring occasion associated with the SS/PBCH block. The SS/PBCH block may be determined according to at least one of the following factors.

An SS/PBCH block having the QCL relation with a CSI-RS included in a TCI state indicated or activated by a MAC CE activation indicator in an activated BWP including a CORESET index 0, or An SS/PBCH block used for the most recently performed contention-based random access procedure The UE that does not receive TCI state information indicating QCL information of a DMRS antenna port of a PDCCH transmitted in a CORESET may assume that all of a DMRS antenna port of a PDCCH transmitted in a CORESET configured by configuration information transmitted through an MIB, a DMRS antenna port of a PDSCH scheduled through the PDCCH, and an SS/PBCH block for transmitting the MIB are QCLed for characteristics of an average gain, QCL-TypeA, and QCL-TypeD.

For the CORESET having an index 0, the UE may assume that a DMRS antenna port of a PDCCH received in the CORESET is QCLed with a DL RS or an SS/PBCH block as described below. In other words, when a TCI state is indicated or activated by a MAC CE activation command for the CORESET, the UE may assume that one or a plurality of DL RSs configured through the TCI state and the DMRS antenna port of the PDCCH are QCLed with each other. If a MAC CE activation command for indicating or activating the TCI state for the CORESET is not received after the most recent random access procedure among random access procedures which are not a non-contention random access procedure triggered by a PDCCH order, the UE may assume that the DMRS antenna port is QCLed with an SS/PBCH block identified by the UE in the most recent random access procedure.

For another CORESET, except for the CORESET having the index 0, if the UE does not receive configuration information of the TCI state through CORESET configuration information, or if the UE receives an initial configuration of a plurality of TCI states, but does not receive a MAC CE activation command for indicating or activating one TCI state for the CORESET, the UE may assume that the DMRS antenna port of the PDCCH received in the CORESET and an SS/PBCH block identified in an initial access procedure are QCLed.

For another CORESET, except for the CORESET having the index 0, if the UE receives configuration information of the TCI state through the CORESET configuration information in the part of a synchronization procedure reconfiguration process (reconfiguration with sync procedure) but does not receive the MAC CE activation command for indicating or activating one TCI state for the CORESET SET, the UE may assume that the DMRS antenna port of the PDCCH received in the CORESET and an SS/PBCH block or a CSI-RS identified in a random access procedure initiated by the synchronization procedure reconfiguration process are QCLed.

For another CORESET, except for the CORESET having the index 0, the UE receiving one TCI state for the CORESET or receiving the MAC CE activation command for indicating or activating one TCI state for the CORESET may assume that the DMRS antenna port of the PDCCH received in the CORESET is QCLed with one or a plurality of RSs configured through the TCI state.

For the CORESET having the index 0, the UE may receive QCL-TypeD attributes of the CSI-RS configured through the TCI state indicated or activated through the MAC CE activation command from the SS/PBCH.

The UE receiving MAC CE signaling may apply a TCI state indicated by the MAC CE signaling, starting at a first slot after $3 \cdot N_{slot}^{subframe,\mu}$ slots from a slot (e.g., slot k) for transmitting HARQ-ACK information for the PDSCH providing the MAC CE signaling and receive the PDCCH on the basis of beam information including the TCI state. $N_{slot}^{subframe,\mu}$ is the number of slots included in each subframe for SCS

<SFI>

In the 5G communication system, a DL signal transmission interval and a UL signal transmission interval may be dynamically changed. To this end, the BS may indicate whether each of the OFDM symbols included in one slot is a DL symbol, a UL symbol, or a flexible symbol, to the UE, through an SFI. The flexible symbol may be a symbol that is neither consistently a DL symbol nor a UL symbol, but can be changed to a DL or UL symbol by UE-specific control information or scheduling information. The flexible symbol may include a gap guard for a process of switching from the DL to the UL.

The UE receiving the SFI may perform an operation of receiving a DL signal from the BS in a symbol indicated as a DL symbol and perform an operation of transmitting an UL signal to the BS in a symbol indicated as an UL symbol. For the symbol indicated as the flexible symbol, the UE may perform at least a PDCCH monitoring operation, and may perform an operation for receiving a DL signal from the BS (e.g., when DCI format 1_0 or 1_1 is received) or perform an operation for transmitting an UL signal to the BS (e.g., when DCI format 0_0 or 0_1 is received) in the flexible symbol through another indicator, e.g., DCI.

Figure 10:
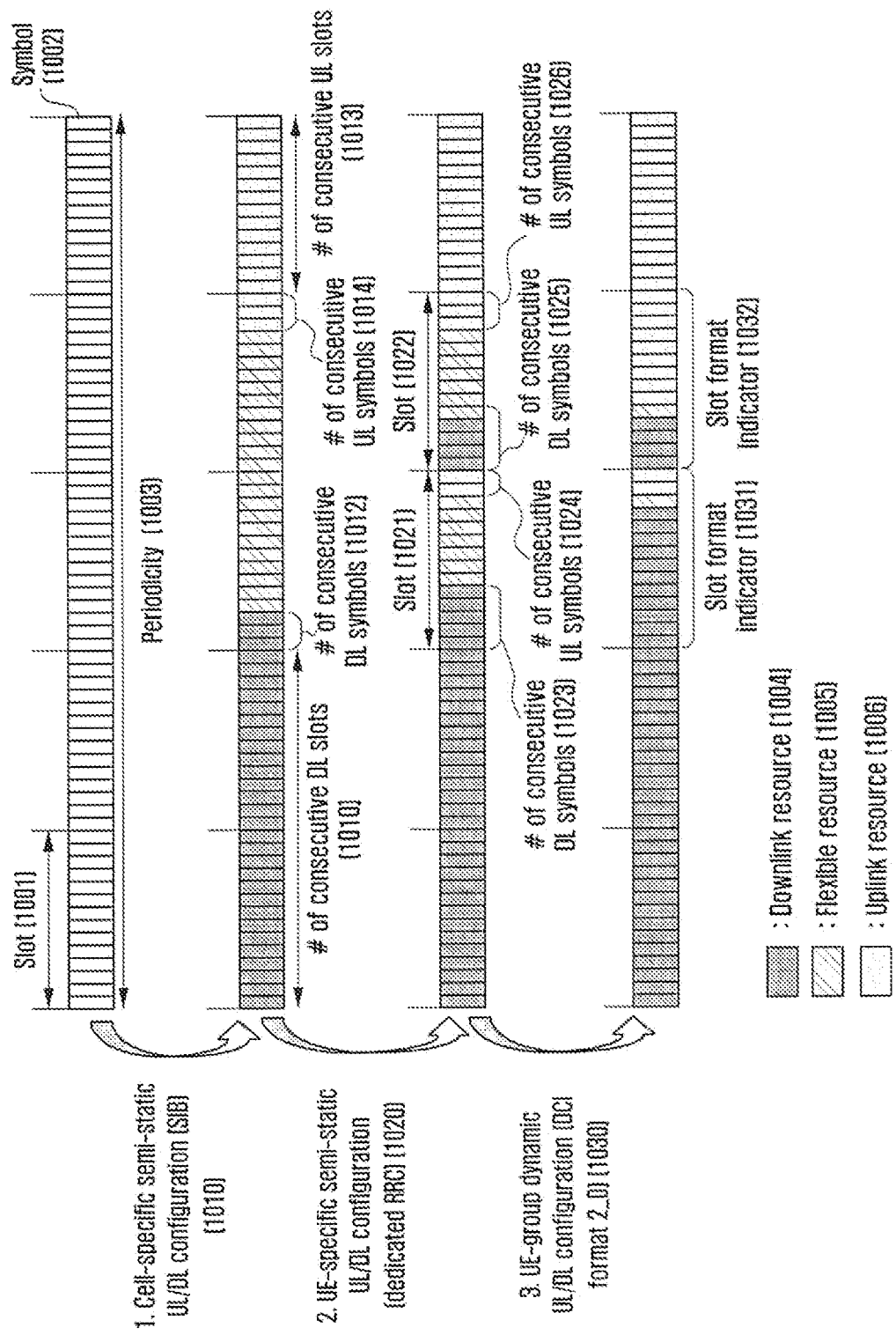
FIG. 10 illustrates a configuration of a UL-DL in a 5G communication system.

FIG. 10 illustrates a UL-DL configuration in a 5G system. Specifically, FIG. 10 illustrates three stages of a UL-DL configuration of a symbol/slot.

Referring to FIG. 10, in a first stage, cell-specific configuration information 1010 for semi-statically configuring the UL-DL, e.g., SI, such as an SIB configures the UL-DL of the symbol/slot. Specifically, the cell-specific configuration information 1010 within SI may include information indicating UL-DL pattern information and reference SCS. The UL-DL pattern information may indicate a transmission periodicity 1003 of each pattern, the number of consecutive DL slots at the beginning of each pattern (number of consecutive full DL slots from the beginning of each DL-UL pattern) 1011, the number of consecutive DL symbols from the beginning of the next slot 1012 (number of consecutive DL symbols in the beginning of the slot following the last full DL slot), the number of consecutive UL slots from the end of each pattern 1013 (number consecutive full UL slots at the end of each DL-UL pattern), and the number of symbols of the previous slot 1014 (number of consecutive UL symbols in the end of the slot preceding the first full UL slot). The UE may determine that the slot/symbol, which is not indicated as the UL or the DL, is the flexible slot/symbol.

In a second stage, UE-specific configuration information 1020 transmitted through UE-dedicated higher layer signaling (i.e., RRC signaling) indicates symbols to be configured as the DL or the UL within the flexible slot or slots 1021 and 1022 including the flexible symbol. For example, the UE-specific UL-DL configuration information 1020 may include a slot index indicating the slot 1021 or 1022 including the flexible symbol, the number of consecutive DL symbols from the beginning of each slot 1023 or 1025 (number of consecutive DL symbols in the beginning of the slot), or the number of consecutive UL symbols from the end of each slot 1024 or 1026 (number of consecutive UL symbols in the end of the slot) or include information indicating the entire DL or information indicating the entire UL for each slot. The symbol/slot configured as the UL or the DL through the cell-specific configuration information 1010 in the first stage cannot be changed to the DL or the UL through UE-specific higher layer signaling 1020.

In order to dynamically change the DL signal transmission interval and the UL signal transmission interval, DCI of the DL control channel includes a SFI 1030 indicating whether each symbol within each slot among a plurality of slots starting from a slot in which the DCI is detected is a DL symbol, a UL symbol, or a flexible symbol. In the first and second stages, the SFI cannot indicate the symbol/slot configured as the UL or the DL as the DL or the UL. In the first and second stages, a slot format of each slot 1031 or 1032 including at least one symbol which is not configured as the UL or the DL cannot be indicated by corresponding DCI.

The SFI may indicate an UL-DL configuration for fourteen symbols within one slot as shown in Table 8 below. The SFI may be simultaneously transmitted to a plurality of UEs through a UE group (or cell) common control channel. In other words, the SFI may be transmitted through a PDCCH that is CRC-scrambled by an identifier different from a UE-specific Cell-RNTI (C-RNTI), e.g., an SFI-RNTI. The DCI may include SFIs for one or more slots, i.e., N slots. A value of N may be an integer value larger than 0 or may be a value that the UE receives from the BS through higher layer signaling among a set of predefined available values. The size of the SFI may be configured in the UE by the BS through higher layer signaling.

TABLE 8

| Format | \multicolumn{14}{c}{Symbol number in a slot} |
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | F | F | U | U | u | u | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | F | F | U | D | D | D | F | F | U | U | U |
| 50 | D | D | F | F | U | U | D | D | F | F | U | U | U | U |
| 51 | D | F | F | U | U | U | D | F | F | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | D | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on tdd-UL-DL-ConfigurationCommon, or tdd-UL-DL-ConfigurationDedicated and, if any, on detected DCI formats} |

In Table 8, D denotes a DL symbol, U denotes an UL symbol, and F denotes a flexible symbol. According to Table 8, a total number of slot formats supportable for one slot is 256. In the NR system, a maximum size of information bits that can be used to indicate slot formats is 128 bits, and may be configured in the UE, by the BS, through higher layer signaling, e.g., "dci-PayloadSize".

A cell operating in an unlicensed band may introduce one or more additional slot formats or may configure and indicate additional slot formats, as shown in Table 9, by modifying one or more of the existing slot formats. Table 9 shows an example of additional slot formats in which one slot includes only UL symbols and flexible symbols (F).

TABLE 9

| Format | Symbol number (or index) within one slot | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

DCI used for indicating a slot format may indicate slot format(s) for a plurality of serving cells, and slot format(s) for the serving cell may be separated by a serving cell ID. Further, for each serving cell, a slot format combination of one or more slots may be indicated by the DCI. For example, when the size of one SFI index field within DCI is 3 bits and indicates a slot format for one serving cell, the 3-bit SFI index field may indicate one of a total of 8 slot formats (or slot format combinations), and the BS may indicate the SFI index field through UE common DCI.

At least one SFI index field included in the DCI may include a slot format combination indicator of a plurality of slots. For example, Table 10 below shows 3-bit slot format combination indicators including the slot formats in Tables 8 and 9. {0, 1, 2, 3, 4} among the values of the slot format combination indicators indicate slot formats for one slot. The three remaining values {5, 6, 7} indicate slot formats for four slots, and the UE may apply the indicated slot format to the four slots sequentially from the slot in which DCI including the slot format combination indicators is detected.

TABLE 10

| Slot format combination ID | Slot Formats |
| --- | --- |
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

<Unlicensed Band>

In a system performing communication in an unlicensed band, a communication device (the BS or the UE), in order to transmit a signal through the unlicensed band, may perform a channel access procedure, LBT, or channel sensing for the unlicensed band through which the communication device desires to perform communication before transmitting the signal, and, if it is determined that the unlicensed band is in an idle state according to the channel access procedure, access the unlicensed band and transmit the signal. If it is determined that the unlicensed band is not in the idle state according to the performed channel access procedure, the communication device may not perform signal transmission. In the channel access procedure, the BS or the UE occupies a channel during a deterministic time or a randomly determined time, measures a strength of a signal received through a channel in which the signal is transmitted, and compares the measured signal strength with threshold $X_{Thresh}$ calculated by a function of which a value is determined by at least one parameter among a predefined threshold, a channel bandwidth, a bandwidth of the signal to be transmitted, and/or a strength of transmitted power.

When the strength of the received signal measured through sensing for the unlicensed band channel is smaller than $X_{Thresh}$, the BS and the UE may determine that the channel is in the idle state or that the channel is available (or can be occupied) and may occupy and use the channel. If the sensing result is larger than or equal to $X_{Thresh}$, the BS and the UE may determine that the channel is in a busy state or that the channel is not available (or cannot be occupied) and may not use the channel. The BS and the UE may continuously perform sensing until it is determined that the channel is in the idle state. In other words, the channel access procedure in the unlicensed band may mean a procedure of assessing possibility of transmission in the channel on the basis of sensing. A basic unit of sensing is a sensing slot and may be an interval of $T_{sl}=9$ μs. When power detected in at least 4 μs in the sensing slot duration is smaller than $X_{Thresh}$, the sensing slot duration may be considered as idle or not used. If power detected in at least 4 μs in the sensing slot duration is larger than or equal to $X_{Thresh}$, the sensing slot duration may be considered as busy or used by another device.

The channel access procedure in the unlicensed band may be distinguished according to whether the time point at which the channel access procedure of the communication device is initiated is fixed (frame-based equipment (FBE)) semi-static, variable (load-based equipment), or dynamic. The communication device may be determined as an FBE device or an LBE device depending on whether or not a transmission/reception structure of the communication device has one period, as well as the time point at which the channel access procedure is initiated.

Fixing the time point at which the channel access procedure is initiated may indicate that the channel access procedure of the communication device may be periodically initiated according to a predefined declare or a configured period. In another example, fixing the time point at which the channel access procedure is initiated may mean that the transmission/reception structure of the communication device has one period. The variable time point at which the channel access procedure is initiated may indicate that the time point at which the communication initiates the channel access procedure can be anytime when the communication device desires to transmit a signal through the unlicensed band. In another example, the variable time point at which the channel access procedure is initiated may indicate that the transmission/reception structure of the communication device may be determined as necessary without one period. Hereinafter, a channel access procedure or channel sensing may be used interchangeably in the disclosure, but the channel access procedure or the channel sensing operation of the BS or the UE may be the same.

A DL transmission burst may be a set of DL transmissions performed without a gap larger than 16 μs between DL transmissions of the BS. When the gap between DL transmissions is larger than 16 µs, the DL transmissions may include separate DL transmission bursts.

Similarly, a UL transmission burst may be a set of UL transmissions performed without a gap larger than 16 µs between UL transmissions of the UE. When the gap between UL transmissions is larger than 16 µs, the UL transmissions may include separate UL transmission bursts.

<Channel Access Procedure for Semi-Static Channel Occupancy>

Hereinafter, the channel access procedure in the case in which the time point at which the communication device initiates the channel access procedure is fixedly or semi-statically configured is described.

When it is possible to guarantee the absence of another system sharing and using a channel of the unlicensed band for a long time through regulation and a method by level of regulation in the 5G system performing communication in the unlicensed band, the following semi-static channel access procedure or channel sensing may be performed.

The BS that desires to use the semi-static channel access procedure provides configuration information indicating that a channel access procedure scheme of the BS is a semi-static channel access procedure and/or configuration information on the semi-static channel access, to the UE, through higher layer signaling (e.g., SIB1 and/or RRC signaling), so that the UE may know whether the channel access procedure scheme of the BS is the semi-static channel access scheme.

An example of the configuration information on the semi-static channel access may be a period ($T_x$) in which the BS may initiate channel occupancy. For example, a value of the period may be 1 ms, 2 ms, 2.5 ms, 4 ms, 5 ms, or 10 ms. When the semi-static channel access procedure is used, the BS may initiate periodic channel occupancy every $T_x$ in two consecutive frames, i.e., every $x \cdot T_x$ starting from a frame having an even-numbered index and may occupy the channel during a maximum of $T_y=0.95T_x$. Here, $$x \in \left\{0, 1, \ldots, \frac{20}{T_x} - 1\right\}.$$

Figure 11:
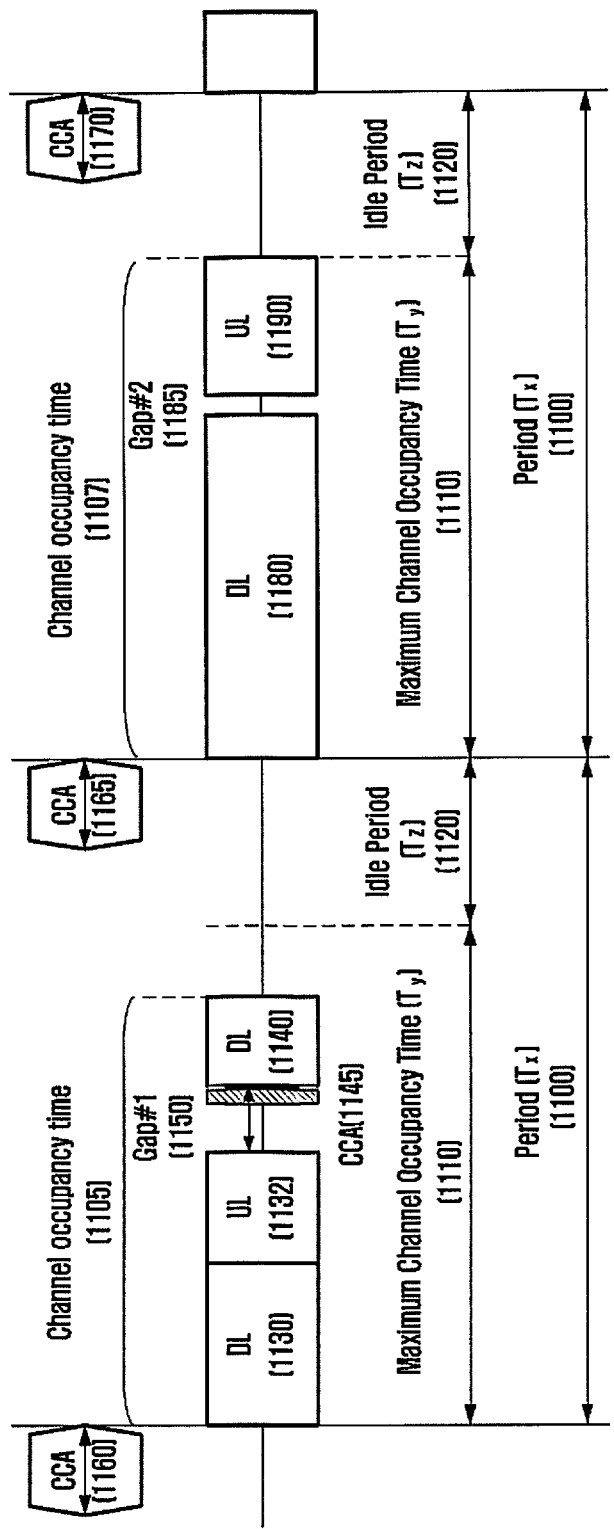
FIG. 11 illustrates a channel access procedure for semi-static channel occupancy in a wireless communication system according to an embodiment.

FIG. 11 illustrates a channel access procedure for semi-static channel occupancy in a wireless communication system according to an embodiment.

FIG. 11 illustrates a periodic channel occupancy period $T_x$ 1100, a channel occupancy time (COT) 1105 and 1107, a maximum COT $T_y$ 1110, an idle period $T_z$ 1120, and clear channel assessment (CCA) duration 1160, 1165, and 1170 for the BS and the UE performing the semi-static channel access procedure.

The BS and the UE using the semi-static channel access procedure may sense the channel in the CCA duration 1160 or 1165 right before the channel is used or occupied (e.g., DL transmission 1130 or DL transmission 1180) in order to assess whether the channel is available (or channel is occupied). The sensing should be performed in at least one sensing slot duration, and an example of the sensing slot duration ($T_{sl}$) is 9 µs.

A sensing method may compare the magnitude or strength of received power detected or measured in the sensing slot duration with a predefined, configured, or calculated threshold $X_{Thresh}$. For example, when the sensing performance result of the BS and the UE performing the sensing in the CCA duration 1160 is less than $X_{Thresh}$, the BS and the UE may determine that the channel is in the idle state or the channel is available (or can be occupied), occupy the channel, and use the channel until the maximum COT 1110. If the sensing performance result is larger than or equal to $X_{Thresh}$, the BS and the UE may determine that the channel is in the busy state or the channel is not available (or cannot be occupied) and may not use the channel until the time 1180 at which the next channel occupancy can be initiated or when channel sensing is performed in the next CCA duration 1165.

When the BS performs the semi-static channel access procedure and initiate channel occupancy, the BS and the UE may communicate as described below.

Right after the sensing indicating that the sensing slot duration is in the idle state, the BS should immediately perform DL transmission at a start time point of the COT. If the sensing indicating that the sensing slot duration is in the busy state is performed, the BS should perform no transmission during the current COT.

When a gap 1150 between DL transmission 1140 to be performed within the COT 1105 and previous DL transmission 1130 and UL transmission 1132 is larger than 16 µs, the BS may sense at least one sensing slot duration 1145 and may or may not perform the DL transmission 1140 according to the sensing result.

When the gap 1150 between DL transmission 1140 to be performed within the COT 1105 and the previously performed UL transmission 1132 of the UE is a maximum of 16 µs (or equal to or smaller than 16 µs), the BS may perform the DL transmission 1140 without channel sensing (without the sensing slot duration 1145).

When the UE performs UL transmission 1190 within the COT 1107 of the BS and a gap 1185 between the UL transmission 1190 and DL transmission 1180 is a maximum of 16 µs (or equal to or smaller than 16 µs), the UE may perform the UL transmission 1190 without channel sensing.

When the UE performs the UL transmission within the COT 1107 of the BS and the gap 1185 between the UL transmission 1190 and the DL transmission 1180 is larger than 16 µs, the UE may perform channel sensing in at least one sensing slot duration within a duration of 25 µs right before the UL transmission 1190 and may or may not perform the UL transmission 1190 according to the sensing result.

The BS and the UE should perform no transmission in a set of consecutive symbols in at least duration of $T_z=\max(0.05T_x, 100 \text{ µs})$ before the next COT starts.

<Channel Access Procedure for Dynamic Channel Occupancy>

Hereinafter, a channel access procedure for when a time point at which a channel access procedure of a communication device initiates is variable or dynamic is described.

In the 5G system performing communication in an unlicensed band, when a semi-static channel access procedure is not used or a dynamic channel access procedure is performed, the BS may perform the following type of channel access procedure or channel sensing.

First Type DL Channel Access Procedure

According to a first type DL channel access procedure, the BS may perform channel sensing for a predetermined time or a time corresponding to the number of sensing slots corresponding thereto, before DL transmission, and may perform the DL transmission when the channel is in the idle state.

In the first type DL channel access procedure, parameters for the first type DL channel access procedure may be determined according to a quality of service (QoS) class identifier (QCI) or a 5G QoS identifier (5QI) of a signal to be transmitted through a channel in the unlicensed band.

Table 11 below shows an example of the relation between a channel access priority class and a QCI or 5QI. For example, QCIs 1, 2, and 4 are QCI values for services such as conversational voice, conversational video (live streaming), and non-conversational video (buffered streaming), respectively.

If a signal for a service that does not match the QCI or 5QI in Table 11 is transmitted in the unlicensed band, the transmission device may select the QCI that is the closest to the service and the QCI or 5QI in Table 11 and select a channel access priority class therefor. Further, if signals to be transmitted through the channel in the unlicensed band have a plurality of different QCIs or 5QIs, the channel access priority class may be selected based on a QCI or 5QI having the lowest channel access priority class.

TABLE 11

| Channel Access Priority class (p) | QCI or 5QI | $m_p$ | $CW_{min,p}$ | $CW_{max,p}$ | $T_{mcot,p}$ | Allowed $CW_p$ sizes |
|---|---|---|---|---|---|---|
| 1 | 1, 3, 5, 65, 66, 69, 70, 79, 80, 82, 83, 84, 85 | 1 | 3 | 7 | 2 ms | {3, 7} |
| 2 | 2, 7, 71 | 1 | 7 | 15 | 3 ms | {7, 15} |
| 3 | 4, 6, 8, 9, 72, 73, 74, 76 | 3 | 15 | 63 | 8 or 10 ms | {15, 31, 63} |
| 4 | — | 7 | 15 | 1023 | 8 or 10 ms | {15, 31, 63, 127, 255, 511, 1023} |

When the channel access priority class P is determined according to the QCI or the 5QI of a signal to be transmitted through the channel in the unlicensed band, the channel access procedure may be performed using channel access procedure parameters corresponding to the determined channel access priority class. For example, the channel access procedure may be performed using channel access procedure parameters corresponding to the channel access priority class P, such as $m_p$ for determining a length of defer duration $T_d$, a set $CW_p$ of values or sizes of CW, and a minimum value and a maximum value $CW_{min,p}$ and $CW_{max,p}$ of the CW.

After channel occupancy, available maximum channel occupancy duration $T_{mcot,p}$ may also be determined according to the channel access priority class P.

Figure 12:
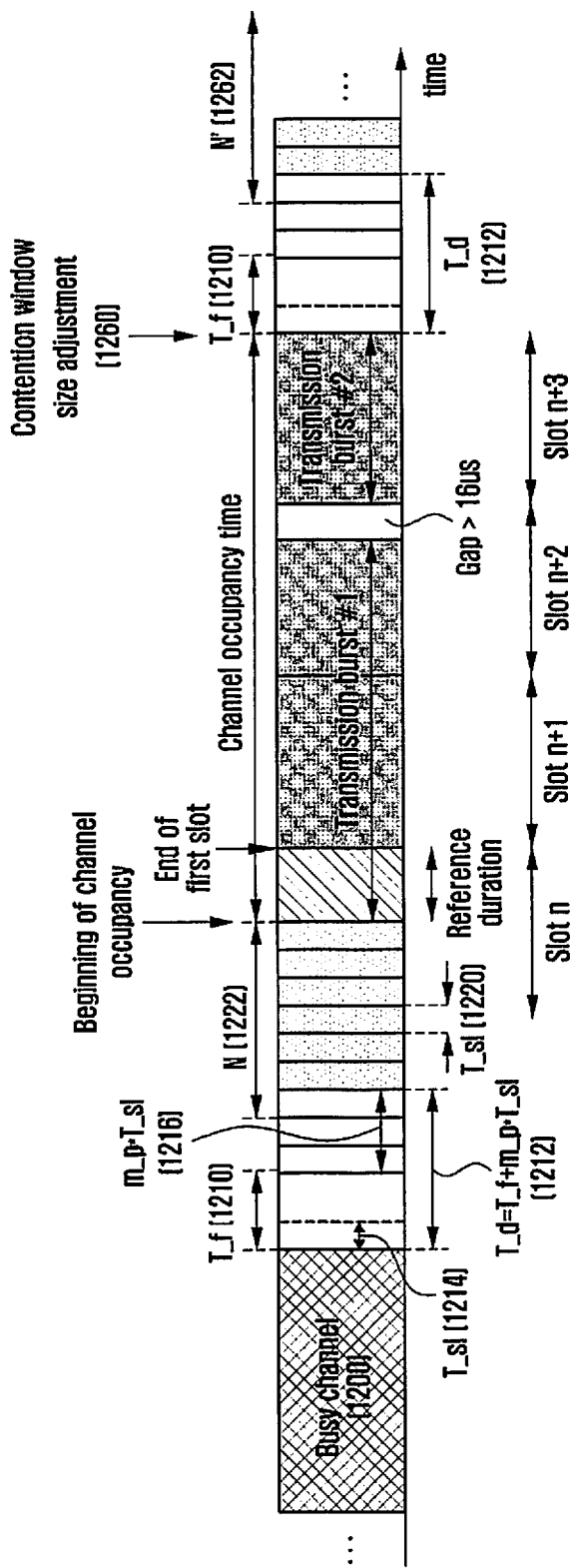
FIG. 12 illustrates a channel access procedure for dynamic channel occupancy in a wireless communication system according to an embodiment.

FIG. 12 illustrates a channel access procedure for dynamic channel occupancy in a wireless communication system according to an embodiment. More specifically, FIG. 12 illustrates an example of the first type DL channel access procedure of the BS as described above.

Referring to FIG. 12, the BS that desires to transmit a DL signal in the unlicensed band may perform a channel access procedure within at least a defer duration of $T_d$ 1212. The defer duration $T_d$ 1212 may sequentially include Tf 1210 and $m_p \times T_{sl}$ 1216. $T_f$ 1210 may be 16 µs and $T_{sl}$ 1214 and 1220 may be lengths of sensing slots. $T_f$ 1210 may include one sensing slot 1214, and the sensing slot 1214 may be located at a start point of $T_f$ 1210. When the BS performs the channel access procedure on the basis of channel access priority class 3 (p=3), the defer duration $T_d$ 1212 for performing the channel access procedure may be determined as $T_f + m_p \times T_{sl}$. Here, $m_p$=3. When $T_f$ 1214, which is the beginning of $T_f$ 1210, is in the idle state, the BS may not perform the channel access procedure in the remaining time $T_f - T_{sl}$ after $T_f$ 1214, which is the beginning of $T_f$ 1210. Even though the BS performs the channel access procedure during the remaining time $T_f - T_{sl}$, the result of the channel access procedure may not be used. In other words, the time $T_f - T_{sl}$ may be a time corresponding to a delay of the channel access procedure regardless of the performance of the channel access procedure.

If it is determined that the unlicensed band is in the idle state within $T_d$ 1212, the BS may start channel occupancy after N sensing slots 1222. N is 0 and an integer value randomly selected using a time point at which the channel access procedure is initiated or a CW ($CW_p$) right before the time point. That is, N=rand(0,$CW_p$). A detailed CW configuration method is described below again.

For example, for the channel access priority class of p=3 in Table 11, a CW and a maximum CW are 15 and 63, respectively, and available CWs are {15, 31, 63}. Accordingly, a value of N may be randomly selected in one duration of 0 to 15, 0 to 31, or 0 to 63 according to the CW. The BS may perform sensing in every sensing slot and perform an update of N=N−1 when the strength of a received signal measured in the sensing slot is smaller than a threshold $X_{Thresh}$. If the strength of the received signal measured in the sensing slot is larger than or equal to the threshold X Thresh, the BS may perform channel sensing in the defer duration $I_d$ while maintaining N without any decrease therein. If it is determined that N=0, the BS may perform DL transmission. The BS may occupy and use the channel during the time $T_{mcot,p}$ according to the channel access procedure class and Table 11.

After the COT, CW size adjustment 1260 may be performed. After the CW size adjustment 1260, the defer duration $T_d$ 1212 for performing the channel access procedure may exist again. The time Tf 1210 may be included in the defer duration $T_d$ 1212. The channel access procedure may be initiated after duration N' 1262.

The first type DL channel access procedure may be divided into the following stages. The BS may perform sensing such that the channel is in the idle state during the sensing slot duration of the defer duration $T_d$ 1212 and perform DL transmission when a value of a counter N is 0. The counter N may be controlled according to channel sensing performed in additional sensing slot duration(s) in the following stages.

Stage 1: N=$N_{init}$ is configured and stage 4 is performed. $N_{init}$ is a number randomly selected from values between 0 and $CW_p$.

Stage 2: if N>0, the BS determines whether to reduce the counter N. If it is determined to reduce the counter, N=N−1 is configured.

Stage 3: the BS senses the channel during the additional sensing slot duration.

When it is determined that the channel is in the idle state, stage 4 is performed. When the channel is not in the idle state, stage 5 is performed.

Stage 4: if N=0, DL transmission is initiated; otherwise, stage 2 is performed.

Stage 5: the channel is sensed until a sensing slot in the busy state is detected within the defer duration $T_d$ or until it is detected that all sensing slots within the defer duration $T_d$ are in the idle state.

Stage 6: when it is detected that all sensing slots within the defer duration $I_d$ are in the idle state, stage 4 is performed. Otherwise, stage 5 is performed.

A procedure for maintaining or adjusting the CW ($CW_p$) is described below. The CW adjustment procedure is applied when the BS at least performs DL transmission including a PDSCH corresponding to the channel access priority class p, and includes the following stages.

Stage 1: $CW_p=CW_{min,p}$ is configured for all channel access priority classes p.

Stage 2:
If a HARQ-ACK feedback exists (is available) after the last update of $CW_P$, stage 3 is performed.

Otherwise, when DL transmission of the BS after the first type channel access procedure does not include retransmission or when the DL transmission is performed within the duration $T_w$ right after reference duration of a DL transmission burst, which is the first transmitted after the first type channel access procedure, after the last update of $CW_P$, stage 5 is performed.

In cases other than the above cases, stage 4 is performed.

Stage 3: a HARQ-ACK feedback for a PDSCH transmitted in the reference duration of the most recent DL transmission burst having an available HARQ-ACK feedback for the PDSCH transmitted in the reference duration is used as follows.

When at least one of the HARQ-ACK feedbacks for the PDSCH transmitted in units of transport blocks (TBs) among the HARQ-ACK feedbacks is ACK or when at least 10% of the HARQ-ACK feedbacks for the PDSCH transmitted in units of CBGs among the HARQ-ACK feedbacks is ACK, stage 1 is performed.

Otherwise, stage 4 is performed.

Stage 4: $CW_p$ is increased to a value next larger than the current value among allowed values of $CW_p$ for all channel access priority classes p.

If $CW_p=CW_{max,p}$ at present, $CW_p$, which is allowed as the next large value, is $CW_{max,p}$.

If $CW_p=CW_{max,p}$ is used successively several times to generate $N_{init}$, $CW_p$ may be initialized to $CW_{min,p}$ for the channel access priority class P. K may be selected by the BS for each channel access priority class P.

Stage 5: $CW_p$ is maintained for all channel access priority classes P, and stage 2 is performed.

The duration $T_w$ is max($T_A$,$T_B$+1 ms). $T_B$ is a UL/DL transmission burst duration from the beginning of the reference duration and has a value in units of ms. When it is not possible to guarantee the absence of another system sharing and using a channel of the unlicensed band for a long time through regulation and a method by level of regulation in the 5G system performing communication in the unlicensed band, $T_A$=5 ms and, otherwise, $T_A$=10 ms.

The reference duration is a duration from the beginning of channel occupancy to the end of a first slot among channel occupancies including PDSCH transmission of the BS and corresponds to a duration including at least one unicast PDSCH transmitted through all of the time-frequency resource domains allocated to the PDSCH, or is a duration from the beginning of channel occupancy to the end of a DL transmission burst and corresponds to a duration that first comes in time among durations including at least one unicast PDSCH transmitted through all of the time-frequency resource domains allocated to the PDSCH. If the channel occupancy of the BS includes the unicast PDSCH, but does not include the unicast PDSCH transmitted through all of the time-frequency resource domains allocated to the PDSCH, a first DL transmission burst duration including the unicast PDSCH may be the reference duration. The channel occupancy may be transmission performed by the BS after the channel access procedure.

Second Type DL Channel Access Procedure A

According to the second type DL channel access procedure A, the BS may sense the channel in at least the duration $T_{short\_dl}$=25 μs right before DL transmission and perform DL transmission when the channel is in the idle state. $T_{short\_dl}$ is the length of 25 μs and sequentially includes $T_f$=16 μs and one sensing slot ($T_{sl}$=9 μs). $T_f$ includes one sensing slot ($T_{sl}$=9 μs), and a start time of the sensing slot may be the same as a start time of $T_f$. That is, $T_f$ may start at the sensing slot $T_{sl}$. When the BS performs DL transmission that does not include a DL data channel transmitted to a specific UE, the second type DL channel access procedure A may be performed.

Second Type DL Channel Access Procedure B

According to the second type DL channel access procedure B, the BS may sense the channel in at least the duration $T_f$=16 μs right before DL transmission and perform DL transmission when the channel is in the idle state. Tf includes one sensing slot ($T_{sl}$=9 μs), and the sensing slot may be located at the last 9 μs of $T_f$. That is, $T_f$ ends by the sensing slot $T_{sl}$. The second type DL channel access procedure B may be applied when a gap between the start of the DL transmission that the BS desires to perform and the end of the UL transmission of the UE is equal to or smaller than 16 μs.

Second Type DL Channel Access Procedure C

The second type DL channel access procedure C may be applied when a gap between the start of the DL transmission of the BS and the end of the UL transmission of the UE is equal to or smaller than 16 μs, and the BS may perform the DL transmission without a separate procedure or channel sensing. A maximum duration of the DL transmission performed after the second type DL channel access procedure C may be 584 μs.

Unlike the first DL channel access procedure, the second type DL channel access procedures A, B, and C feature a deterministic channel sensing duration or time point at which the BS performs the DL transmission. The channel access procedures may be additionally divided as follows on the basis of such a characteristic.

Type 1: is a type in which DL transmission is performed after a channel access procedure for a variable time and corresponds to the first type DL channel access procedure.

Type 2: is a type in which DL transmission is performed after a channel access procedure for a fixed time and corresponds to the second type DL channel access procedures A and B.

Type 3: is a type in which DL transmission is performed without any channel access procedure and corresponds to the second type DL channel access procedure C.

<Energy Detection Threshold Control Procedure>

The BS performing a channel access procedure or channel sensing may configure an energy detection threshold or sensing threshold $X_{Thresh}$ as described below. $X_{Thresh}$ should be configured to be smaller than or equal to $X_{Thresh\_max}$, indicating a maximum energy detection threshold or sensing threshold, and a unit thereof is dBm.

When it is possible to guarantee the absence of another system sharing and using a channel of the unlicensed band for a long time through regulation and a method by level of regulation in the 5G system performing communication in the unlicensed band, $X_{Thresh\_max} = \min\{T_{max}+10 \text{ dB}, X_r\}$. $X_r$ is a maximum energy detection threshold required by regulation in each region and has a unit of dBm. If the maximum energy detection threshold required by regulation is not configured or defined, $X_r = T_{max}+10$ dB.

In cases other than the above cases, i.e., when the absence of another system sharing and using a channel of the unlicensed band for a long time cannot be guaranteed through regulation and a method by level of regulation in the 5G system performing communication in the unlicensed band, the maximum energy detection threshold may be determined using Equation (1).

$$X_{Thresh\_max} = \max\left\{\min\left\{\begin{array}{c} -72 + 10\log10(BWMHz/20 \text{ MHz})\text{dBm}, \\ T_{max}, \\ T_{max} - T_A + (P_H + 10\log10(BWMHz/20 \text{ MHz}) - P_{TX} \end{array}\right\}\right\} \quad (1)$$

In Equation (1), $T_A$ is 10 dBm in transmission including a PDSCH, and is 5 dB in discovery signal and channel transmission. $P_H$ is 23 dBm, and $P_{TX}$ denotes a maximum output power of the BS and has a unit of dBm. The BS may calculate a threshold using a maximum transmission power transmitted through one channel regardless of DL transmission through one channel or a plurality of channels. Here, $T_{max} = 10 \log 10(3.16228 \cdot 10^{-8}(\text{mW/MHz}) \cdot \text{BW MHz(MHz)})$, and a BW is a bandwidth for one channel and has a unit of MHz.

In accordance with an embodiment, a method of determining the energy detection threshold $X_{Thresh}$ is described below.

The BS may configure the maximum energy detection threshold of the UE through higher layer signaling, e.g., "maxEnergyDetectionThreshold". The UE receiving "maxEnergyDetectionThreshold" or a configuration thereof, from the BS, may configure $X_{Thresh\_max}$ as a value configured by the parameter. The UE that does not receive "maxEnergyDetectionThreshold" or a configuration thereof, from the BS, may configure $X_{Thresh\_max}$ as described below. If the UE does not receive an energy detection threshold offset or a configuration thereof from the BS, the UE may configure $X_{Thresh\_max}$ as $X'_{Thresh\_max}$. If the UE receives an energy detection threshold offset or a configuration thereof from the BS, the UE may configure $X'_{Thresh\_max}$ as a value obtained by adjusting $X_{Thresh\_max}$ by the energy detection threshold offset. $X'_{Thresh\_max}$ may be determined as described below.

When it is possible to guarantee the absence of another system sharing and using a channel of the unlicensed band for a long time through regulation and a method by level of regulation in the 5G system performing communication in the unlicensed band, the BS may provide, e.g., "absenceOfAnyOtherTechnology" through higher layer signaling. The UE receiving "absenceOfAnyOtherTechnology" or a configuration thereof, from the BS, through higher layer signaling, may configure $X'_{Thresh\_max} = \min\{T_{max}+10 \text{ dB}, X_r\}$. $X_r$ is a maximum energy detection threshold required by regulation in each region and has a unit of dBm. If the maximum energy detection threshold required by regulation is not configured or defined, $X_r = T_{max}+10$ dB. The UE that does not receive "absenceOfAnyOtherTechnology" or a configuration thereof from the BS through higher layer signaling may determine $X'_{Thresh\_max}$ using Equation (1). $T_A=0$ dBm, $P_H=23$ dBm, and $P_{TX}$ is $P_{CMAX\_H,c}$.

<Directional Channel Access Procedure>

If the BS and/or UE performing communication in the unlicensed band desire to perform communication using a plurality of beams, the BS or the UE may perform a channel access procedure for a beam (or direction) in which a signal is to be transmitted. For example, in FIG. 1, the BS may perform the channel access procedure for at least one of the beams 112 or 113 in a specific direction. The channel access procedure may be referred to as a directional channel access procedure or directional LBT.

More specifically, the directional channel access procedure may sense a beam (or reception beam) including at least a beam (transmission beam or reception beam) to be transmitted and assess whether transmission using the transmission beam in a channel can be performed based on the sensing. When a basic unit of sensing is a sensing slot $T_{sl}$ in the duration $X\mu s$ and power detected at least for $Y\mu s$ ($Y<X$) in the sensing slot duration in which sensing is performed in the transmission beam or in a direction of the transmission beam is smaller than $X_{Thresh}$, the sensing slot duration of the direction of the transmission beam may be considered as idle or not used. If power detected during at least $Y\mu s$ in the sensing slot duration is larger than or equal to $X_{Thresh}$, the sensing slot duration of the transmission beam direction may be considered as busy or used by another device. Accordingly, the BS or the UE may transmit a signal in a specific beam or a specific direction in which channel occupancy is successful and may not transmit a signal in a specific beam or a specific direction in which channel occupancy is failed.

Although embodiments have been described above in which the directional channel access procedures are performed on the basis of the beam, the direction channel access procedure may be performed using another parameter as well as the beam.

For example, in the directional channel access procedure, the BS or the UE may perform channel sensing for a spatial domain transmission filter (or spatial Tx filter) configured to transmit a signal or a spatial domain reception filter (or spatial Rx filter) configured based on the transmission filter and assess whether transmission using the transmission beam in the channel can be performed based on the channel sensing.

In another example, in the directional channel access procedure, the BS may perform channel sensing for a spatial domain transmission filter used for transmitting an SSB or a reception filter configured based on the transmission filter and assess whether transmission using the transmission beam in the channel can be performed based on the channel sensing.

In another example, in the direction channel access procedure, the BS or the UE may perform channel sensing according to a TCI-state configured in or indicated by a signal to be transmitted and assess whether transmission using the transmission beam in the channel can be performed based on the channel sensing. For example, the BS and the UE may perform channel sensing for a spatial domain transmission filter configured to transmit an RS configured in or indicated by the TCI state of the signal to be transmitted or a reception filter configured based on the filter.

Hereinafter, for convenience of description, it is described that the BS or the UE performs sensing based on a TCI-state configured in or indicated by a signal to be transmitted in the directional channel access procedure. However, the various embodiments proposed in the disclosure may also be applied to when the direction channel access procedure is performed according to the above-described various examples, as well as when sensing is performed on the basis of the TCI-state.

<Configured Grant Transmission>

A UL/DL signal or channel transmission and reception procedure of the UE may be divided into two procedures as described below. The UE may receive DCI transmitted through a DL control channel (e.g., a PDCCH) from the BS and UL/DL transmission and reception (e.g., PDCCH reception or PUSCH transmission) according to information on the received DCI. For convenience of description, a scheme for performing UL/DL transmission and reception through the above procedure is referred to herein as a first UL/DL transmission and reception scheme or a first transmission and reception scheme.

In another UL/DL transmission and reception method, the UE may transmit and receive a UL/DL signal or a channel according to transmission and reception configuration information configured through a higher signal or the like, without separate DCI reception from the BS, and the method may be referred to as a semi-persistent scheduling (SPS), grant-free (nonapproval), or configured grant scheme.

Herein, a scheme in which the UE performs UL/DL transmission and reception without DCI reception is referred to as a second UL/DL transmission and reception scheme or a second transmission and reception scheme. The second UL/DL transmission and reception of the UE may be initiated after reception of DCI indicating activation of the second UL/DL transmission and reception configured through the higher signal from the BS. The UE may perform the second UL/DL transmission and reception according to information of DCI indicating activation of the second UL/DL transmission and reception and UL/DL transmission and reception configuration information configured through a higher signal. If the UE receives DCI indicating release of the second UL/DL transmission and reception and/or a higher signal corresponding thereto, from the BS, the UE may not perform the configured second UL/DL transmission and reception anymore.

A scheme for performing the second UL/DL transmission and reception after the DCI indicating activation of the second UL/DL transmission and reception is received may be classified as the second UL/DL transmission and reception scheme of type 2. The UE may determine that the second UL/DL transmission and reception scheme is activated right after receiving only the higher signal related to the second UL/DL transmission and reception, without separate DCI reception for activation or release of the second UL/DL transmission and reception. Similarly, the BS may release the second UL/DL transmission and reception configured in the UE through reconfiguration of the higher signal related to the second UL/DL transmission and reception, in which case the UE may not perform the configured second UL/DL transmission and reception. A scheme for activating the second UL/DL transmission and reception without reception of DCI for activating the second UL/DL transmission and reception or only through a higher signal may be classified as the second UL/DL transmission and reception scheme of type 2.

The second transmission and reception scheme separated for the DL and the UL is described below in more detail.

In the second transmission and reception scheme for the DL, the BS periodically transmits a DL data channel to the UE based on information configured through higher signaling, without DCI transmission. The second transmission and reception scheme for the DL is mainly used when voice over Internet protocol (VoIP) or periodically generated traffic is transmitted, and the overhead may be minimized since a DL data channel can be transmitted, without DCI transmission.

The UE may receive at least one piece of the configuration information for DL reception of the second transmission and reception scheme from the BS through a higher signal.

- Periodicity: indicates a period of the second transmission and reception scheme
- nrofHARQ-Processes: indicates the number of HARQ processes configured for the second transmission and reception scheme
- n1PUCCH-AN: indicates HARQ resource configuration information for transmitting a reception result of a PDSCH received through the second transmission and reception scheme to the BS
- mcs-Table: indicates MCS table configuration information applied to transmission of the second transmission and reception scheme Similarly, the UE may receive configuration information for UL transmission of the second transmission and reception scheme from the BS through a higher signal.

- frequencyHopping: indicates a fields informing of intra-slot hopping or inter-slot hopping. If this field does not exist, frequency hopping is deactivated.
- cg-DMRS-Configuration: DMRS configuration information
- mcs-Table: indicates a field informing whether a 256 QAM MCS table is used or a new 64 QAM MCS table is used for PUSCH transmission without transform precoding. If this field does not exist, the 64 QAM MCS table is used.
- mcs-TableTransformPrecoder: indicates a field informing of an MCS table used by the UE in transform precoding-based PUSCH transmission. If this field does not exist, the 64 QAM MCS table is used.
- uci-OnPUSCH: applies a beta-offset through at least one of dynamic or semi-static schemes
- resourceAllocation: configures whether a resource allocation type is 1 or 2
- rbg-Size: determines one of two configurable RBG sizes
- powerControlLoopToUse: determines whether to apply closed loop power control
- p0-PUSCH-Alpha: applies values of Po and PUSCH alpha
- transformPrecoder: configures whether to apply transformer precoding. If this field does not exist, msg3 configuration information is used.
- nrofHARQ-Processes: indicates the number of configured HARQ processes
- repK: indicates the number of repetitive transmissions
- repK-RV: indicates an RV pattern applied to each repetitive transmission in repetitive transmission. If the number of repetitive transmissions is 1, this field is deactivated.
- periodicity: indicates a transmission period and exists from a minimum of two symbols to a maximum of slot units from 640 to 5120 according to SCS
- configuredGrantTimer: indicates a timer for guaranteeing retransmission and is configured in units of a plurality of periodicities In type 1 of the second transmission and reception scheme, the UE may additionally receive the following configuration information from the BS through a higher signal (e.g., rrc-ConfiguredUplinkGrant). In type 2 of the second transmission and reception scheme, the UE may receive at least one piece of the following configuration information through DCI.

- timeDomainOffset: indicates a value indicating a first slot in which UL transmission of the second transmission and reception scheme is initiated and corresponds to information in units of slots based on system frame number (SFN) 0
- timeDomainAllocation: indicates a field informing of an UL transmission time resource area of the second transmission and reception scheme and corresponds to startSymbolAndLength or SLIV
- frequencyDomainAllocation: indicates a field informing of an UL transmission frequency resource area of the second transmission and reception scheme
- antennaPort: indicates antenna port configuration information applied to UL transmission of the second transmission and reception scheme
- dmrs-SeqInitialization: indicates a field configured when a transform precoder is deactivated
- precodingAndNumberOfLayers
- srs-ResourceIndicator: indicates a field informing of SRS resource configuration information
- mcsAndTBS: indicates an MCS and a TBS applied to UL transmission of the second transmission/reception scheme
- frequencyHoppingOffset: indicates a value of frequency-HoppingOffset
- pathlossReferenceIndex Herein, the configuration information for transmission of the second transmission and reception scheme can be configured for each Pcell or each Scell and also configured for each BWP. Further, one or more transmissions of the second transmission/reception scheme may be configured for each BWP of each specific cell.

A method by which the UE determines UL transmission resources of the second transmission and reception scheme (hereinafter, referred to as UL transmission resources) is described below.

The UE may receive a configuration of period information (P) for second UL transmission resources and an offset value from the BS through a higher signal. Each of the period or the offset value may be a unit of at least one of an absolute time (e.g., N ms), a slot, or a symbol. In general, the offset value may be smaller than or equal to the second UL transmission resource period, and units of the period and the offset value may be different from or independent from each other. Further, the offset value may be predefined or may be an offset value based on a specific time (e.g., SFN 0) configured through a higher signal.

In the second UL transmission of type 2, the UE may receive the offset information through DCI for activating the second UL transmission of type 2. The offset value may be an offset value based on the DCI reception slot.

Figure 13:
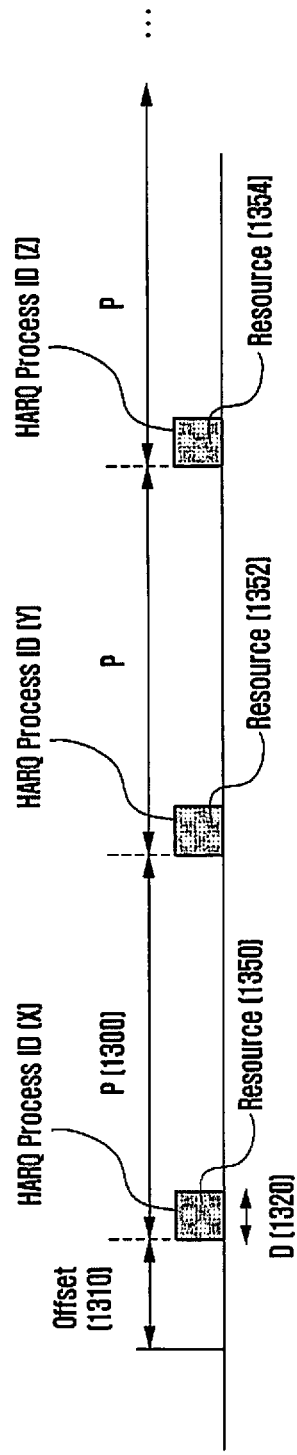
FIG. 13 illustrates a UL/DL transmission scheme in a wireless communication system according to an embodiment.

FIG. 13 illustrates a second UL/DL transmission scheme in a wireless communication system, according to an embodiment.

Referring to FIG. 13, the UE may receive a configuration of period information P 1300 for the second UL transmission resources and an offset value 1310 from the BS through a higher signal. The offset value 1310 is predefined or is a value based on a specific time (e.g., SFN 0) configured through a higher signal, a slot or a symbol corresponding thereto, a slot receiving DCI for activating second UL transmission, a first (or last) symbol of a PDCCH for receiving DCI, or a first symbol (or a last symbol) of a CORESET in which a PDCCH for transmitting DCI for activating second UL transmission is transmitted.

The UE may determine information on the period 1300 configured through the higher signal and Nth UL transmission resources 1350, 1352, 1354, . . . through the offset 1310, which is expressed below in Equation (2). Equation (2) may be used for determining second UL transmission resources of type 1.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + symbolstart + N \times periodicity) \bmod (1024 \times numberOfSlotsPerFrame \times numberOfSymbolsPerSlot), \text{ for all } N >= 0 \quad (2)$$

Equation (3) may be used for determining second UL transmission resources of type 2.

$$[(SFN \times numberOfSlotsPerFrame \times numberOfSymbolsPerSlot) + (\text{slot number in the frame} \times numberOfSymbolsPerSlot) + \text{symbol number in the slot}] = [(SFNstart\ time \times numberOfSlotsPerFrame \times numberOfSymbolsPerSlot + slotstart\ time \times numberOfSymbolsPerSlot + symbolstart\ time) + N \times periodicity] \bmod (1024 \times numberOfSlotsPerFrame \times numberOfSymbolsPerSlot), \text{ for all } N >= 0. \quad (3)$$

In Equations (2) and (3), numberOfSlotsPerFrame is the number of slots included during radio frames defined or configured in a carrier or a cell in which second UL transmission is configured or during a time of 10 ms, and an SFN_start time and a slot_start time are slots receiving DCI indicating initiation or activation of second UL transmission. The offset value may be a value configured through a higher signal (in Equation (2)) or a value received through time domain resource allocation information included in DCI initiating or activating second UL transmission (in Equation (3)).

The UE may receive, through a higher signal, a configuration of one or more HARQ process IDs for UL transmission performed through the configured second UL transmission scheme, and the HARQ process ID may be calculated for the configured resources on using Equation (4).

$$\text{HARQ Process ID} = [\text{floor}(CURRENT\_symbol/periodicity)] \bmod nrofHARQ\text{-}Processes \quad (4)$$

In Equation (4), CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot are the number of consecutive slots included in a frame and the number of consecutive symbols included in a slot, respectively. The nrofHARQ-Processes is the number of HARQ processes that the UE receives a configuration for UL transmission through the second UL transmission scheme, from the BS, through the higher signal, and generally, has a value from 1 to 16. The CURRENT_symbol is an index of a first symbol for initial transmission in repK repetitive transmissions.

The UE may receive configuredGrantTimer through the higher signal and, when a TB is initially transmitted through the second UL transmission scheme, may start configuredGrantTimer for the HARQ process of the TB. When configuredGrantTimer expires, the UE may transmit a new TB using the HARQ process corresponding to the second UL transmission resources.

The UE may be configured to repeatedly transmit one TB a maximum of repK times through the second UL transmission scheme. Here, repK is a value configured through or indicated by the higher signal and/or DCI, and the UE in which repK is configured, or the UE in which repK is configured to a value larger than 1 may repeatedly transmit the same TB by repK. The UE may receive a configuration of a maximum value of repK through the higher signal and receive repK', which is a value repeatedly transmitted from DCI for activating the second UL transmission scheme, in which case repK' is a value that is smaller than or equal to repK. repK may be the number of transmissions including first transmission or initial transmission of the TB transmitted through the second UL transmission scheme, and may have one of the values including 1 (e.g., repK=1, 2, 4, 8). The values of repK described herein are examples, and the disclosure is not limited thereto. The second UL transmission resources repeatedly transmitted repK times may be repeatedly transmitted repK-1 times in consecutive symbols or consecutive slots based on the second UL transmission resources for initial transmission determined using Equations (2) and (3) above.

<DL Feedback Information (DFI)>

The BS may provide the reception result of the TB that the UE transmits through the UL data channel, e.g., the received TB or HARQ-ACK information, to the UE, using at least one DCI format, e.g., DCI format 0_1 of the 5G system. The DCI may include at least the reception result of the TB that the UE transmits through the second UL transmission method. The DCI may include the reception result of all of the TBs that the UE transmits through the first UL transmission method and the second UL transmission method. Although the disclosure describes DCI format 0_1 for convenience of description, DCI format 0_1 is only an example and other DCI formats may be used.

DCI format 0_1 can be used as non-fallback DCI for scheduling one or a plurality of PUSCHs to the UE or used to indicate configured grant DFI (CG-DFI). A CRC of DCI format 0_1 may be scrambled by at least one RNTI among a C-RNTI, a CS-RNTI, a MCS-C-RNTI, and a semi-persistent (SP)-CSI-RNTI.

A scenario in which DCI format 0_1 is used to indicate a CG-DFI is described below.

When DCI format 0_1 is for a cell operating in the unlicensed band, DCI format 0_1, in which the CRC is scrambled by the CS-RNTI, may include a DFI flag field. The UE receiving the DCI may determine that the DCI is for activating the second UL transmission and reception scheme or the second UL transmission resources (or DCI for scheduling the PUSCH) when a value of the DFI flag field is 0, and determine that the DCI is indicating the CG-DFI when the value of the field is 1.

If DCI format 0_1 is used to indicate the CG-DFI, DCI format 0_1 may be configured as described below.

Control information format identifier (identifier for DCI formats): indicates an identifier for identifying a DCI format of a 1-bit field. For example, when a value of a one-bit identifier through which the UE receives DCI is 0, the DCI may have a UL DCI format (e.g., DCI format 0_1). When the value of the identifier is 1, the DCI may have a DL DCI format (e.g., DCI format 1_0).

Carrier indicator: is a 0-bit or 3-bit field and indicates a serving cell index of a PUSCH cell scheduled by DCI.

DFI flag: is a 0-bit or 1-bit field and informs the UE of whether the received DCI is DCI for activating second UL transmission resources or the CG-DFI.

HARQ-ACK-bitmap: includes a 16-bit bitmap, and each bit is mapped to one HARQ process index The bits from the MSB to the LSB in the bitmap may be sequentially mapped to the indexes in an ascending order from the smallest HARQ process index.

TPC command for scheduled PUSCH: indicates a PUSCH transmission power control field and controls an increase or a decrease in PUSCH transmission power of the UE.

In order to match the DCI size with another DCI format, all of the remaining bits are configured as 0.

Accordingly, when the value of the DFI flag field of DCI format 0_1 received by the UE configured to monitor DCI format 0_1, in which the CRC including the DFI flag field is scrambled by the CS-RNTI, is 1, the UE may determine that the DCI format is for providing HARQ-ACK information, for a TB transmitted through an UL data channel and receive the reception result of the BS through a HARQ-ACK bitmap included in the DCI format.

The HARQ-ACK bitmap may include HARQ-ACK information for the TB that the BS receives from the UE through the UL data channel for all HARQ processes for a serving cell to which the BS transmits DCI format 0_1 or all UL HARQ processes configured in the serving cell. When DCI format 0_1 includes a carrier indicator, the HARQ-ACK bitmap may include HARQ-ACK information for the TB that the BS receives from the UE through the UL data channel for all HARQ processes for a serving cell indicated by the carrier indicator or all UL HARQ processes configured in the serving cell.

For a TB transmitted through the UL data channel of the second UL transmission scheme, when the UE receives a first symbol of the PDCCH transmitting a DCI format indicating a CG-DFI after X symbols from the last symbol of the UL data channel, the UE determines that HARQ-ACK information for a HARQ process number (or index) corresponding to the TB transmitted through the UL data channel is valid. Here, X is a value configured by the BS through a higher signal or a value which can be defined in advance between the BS and the UE.

For the TB transmitted through the UL data channel of the second UL transmission scheme, when the UE receives the CG-DFI providing HARQ-ACK information for an HARQ process number corresponding to the TB, if the first symbol of the PDCCH transmitting DCI format 0_1 providing the CG-DFI is a time point after at least X symbols from the last symbol of the UL data channel or one UL data channel among repeatedly transmitted UL data channels, the UE determines that HARQ-ACK information corresponding to the HARQ process number of the TB received through the CG-DFI is valid.

For the TB initially transmitted through the UL data channel of the second UL transmission scheme, when the UE receives the CG-DFI providing HARQ-ACK information for the TB, if the HARQ-ACK information is an ACK, the UE assumes that the BS correctly received the TB (or succeeded in decoding). If the HARQ-ACK information is a NACK, the UE assumes that the BS did not correctly receive the TB (or did not succeed in decoding).

Hereinafter, the TB transmitted through the UL data channel of the first UL transmission scheme will be described based on an assumption that the UL data channel is transmitted in a plurality of slots. When the UE receives the CG-DFI providing HARQ-ACK information for an HARQ process number corresponding to the TB:

If the HARQ-ACK information is an ACK, the UE determines that the HARQ-ACK information corresponding to the HARQ process number of the TB received through the CG-DFI is valid in the case of a time point after at least X symbols from the last symbol of an UL data channel transmitted in a first slot among the UL data channels transmitted in a plurality of slots.

If the HARQ-ACK information is a NACK, the UE determines that the HARQ-ACK information corresponding to the HARQ process number of the TB received through the CG-DFI is valid in the case of a time point after at least X symbols from the last symbol of an UL data channel transmitted in the last slot among the UL data channels transmitted in a plurality of slots.

As described above, X is a value configured by the BS through a higher signal or a value which can be predefined between the BS and the UE.

<CBG-Based Transmission>

The UE may be configured to separate data transmitted through a DL data channel or a UL data channel through a higher signal, i.e., separate a TB or a codeword into one or more CBs or CBGs and transmit and receive the same.

PDSCH-CodeBlockGroupTransmission Information
Element (IE)

---

```
PDSCH-ServingCellConfig ::= SEQUENCE {
codeBlockGroupTransmission SetupRelease { PDSCH-CodeBlockGroupTransmission }
...
}
PDSCH-CodeBlockGroupTransmission ::= SEQUENCE {
maxCodeBlockGroupsPerTransportBlock ENUMERATED {n2, n4, n6, n8},
codeBlockGroupFlushIndicator BOOLEAN,
...
}
```

---

PUSCH-CodeBlockGroupTransmission IE

---

```
PUSCH-ServingCellConfig ::= SEQUENCE {
    codeBlockGroupTransmission   SetupRelease   { PUSCH-
    CodeBlockGroupTransmission}
    ...
}
PUSCH-CodeBlockGroupTransmission ::= SEQUENCE {
maxCodeBlockGroupsPerTransportBlock ENUMERATED {n2, n4, n6, n8},
...
}
```

---

Figure 14:
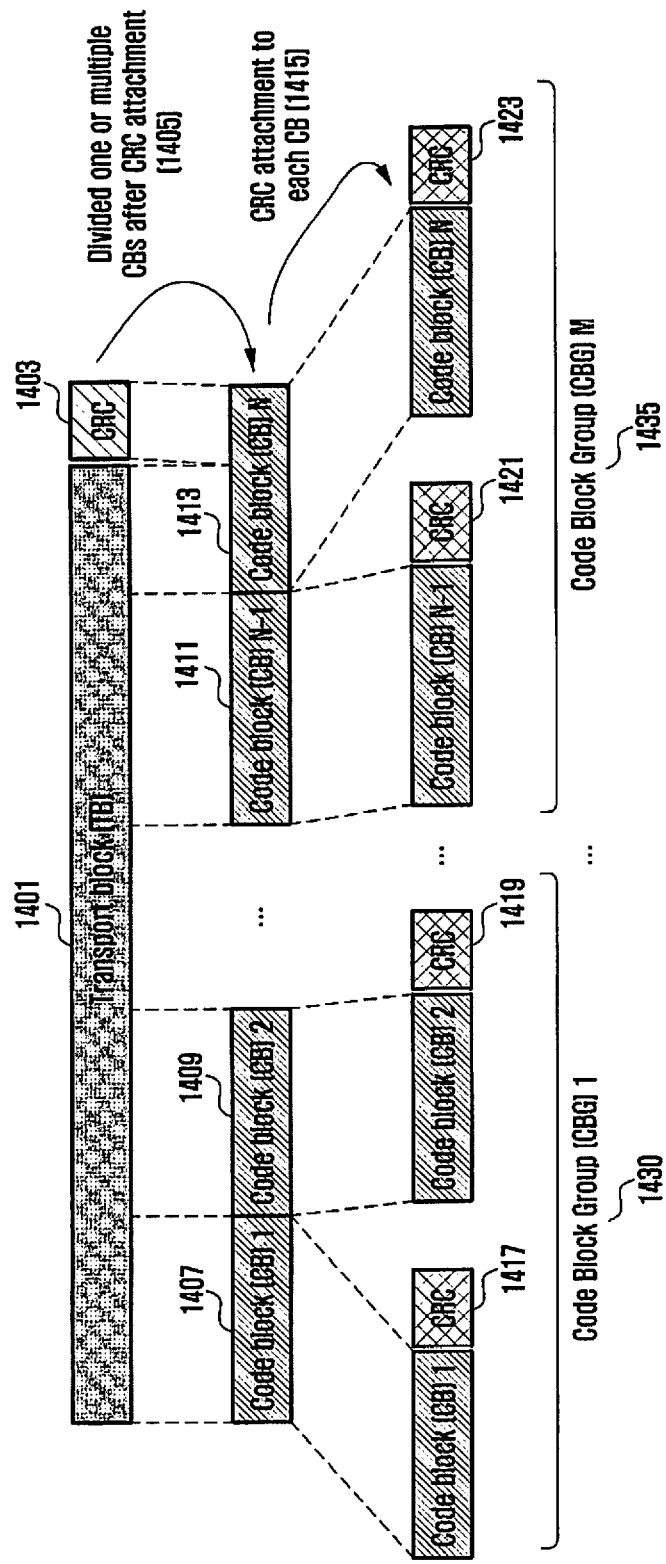
FIG. 14 illustrates code blocks (CBs) and code block groups (CBGs) in a wireless communication system according to an embodiment.

FIG. 14 illustrates CBs and CBGs in a wireless communication system according to an embodiment.

Referring to FIG. 14, for data or a TB 1401 to be transmitted through the DL or the UL, the UE or the BS receiving the TB 1401 may add a CRC 1403 to the last or first part of the TB 1401 and determine whether the TB 1401 is correctly received through the CRC 1403. The CRC 1403 may have 16 bits, 24 bits, the fixed number of bits, or the variable number of bits according to an amount and size of information, a channel state, etc., and may be used to determine whether channel coding is successful. The TB 1401 and a block to which the CRC 1403 is added may be divided into a plurality of CBs 1407, 1409, 1411, and 1414 as indicated by reference numeral 1405.

The TB 1401 may be divided into a maximum size of a predefined CB or a maximum size of a CB configured by the BS through a higher signal. Accordingly, at least one of the first CB 1407 or the last CB 1413 among the CBs included in the TB may be smaller than another CB, in which case 0, a random value, or 1 may be inserted into the first CB 1407 or the last CB 1413 and thus the first CB or the last CB may have the same length as other CBs. CRCs 1417, 1419, 1421, and 1423 may be added to the one or more divided CBs as indicated by reference numeral 1415. The CRC may have 16 bits, 24 bits, the prefixed number of bits, or the variable number of bits according to an amount and size of information, a channel state, etc., and may be used to determine whether channel coding is successful.

The CRC 1403 added to the TB 1401 and the CRCs 1417, 1419, 1421, and 1423 added to the CBs may be omitted according to a type of a channel code to be applied to the CB. For example, when an LDPC code, rather than a turbo code, is applied to the CB, all or some of the CRCs 1417, 1419, 1421, and 1423 to be inserted into the CBs may be omitted. By omitting some of the CRCs, the CRC length may be reduced. However, even when the LDPC code is applied to the CB, the CRCs 1417, 1419, 1421, and 1423 may be added to the CBs. Further, the CRC may be added or omitted when a polar code is used.

One or more CBs may be a CBG. The BS may configure the UE to group one TB to be M CBGs through a higher signal (e.g., maxCodeBlockGroupsPerTransportBlock) In FIG. 14, if the UE receives a configuration of M as a maximum number of CBGs for one TB through a higher signal from the BS, the UE may group again the TB divided into the N CBs to be M CBGs 1430 and 1435. The number of CBs included in one CBG may vary depending on the size of the TB. That is, because the number of CBs vary depending on the size of the TB, the number of CBs included in the CBG may also vary. For example, when the TB is divided into M CBs, one CBG may include one CB. When the TB is divided into 2M CBs, one CBG may include two CBs. That is, the number of CBs included in one CBG may vary depending on the size of the TB or the number of CBs included in the TB.

The UE configured to determine that a codeword or a TB transmitted and received through a DL data channel is divided into one or more CBGs (e.g., M CBGs, where M is a positive integer larger than or equal to 1) and then transmitted, may transmit the DL reception result of each of the configured or divided CBGs (M CBGs) to the BS through the UL control channel or the UL data channel. In this case, CBGTI indicating which CBG is transmitted may be included in DCI for scheduling the DL data channel, and the CBGTI field may include a bitstream including a maximum number (M) of CBGs for each configured TB.

Through the field, the UE may determine a CBG actually transmitted through the DL data channel. For example, for M=4, the UE may receive DCI for scheduling retransmission of the DL data and, when a value of the CBGTI field of the DCI is, e.g., 0011, determine that (data corresponding to) third and fourth CBGs among the CBGs included in the TB are transmitted through the DL data channel. In the case of DCI for scheduling initial transmission of the DL data, all values of the CBGTI fields may be configured as 1, and the UE may receive all CBGs included in the TB through the DL data channel.

The UE configured to determine that a codeword or a TB transmitted and received through a UL data channel is divided into one or more CBGs (e.g., M CBGs, where M is a positive integer larger than or equal to 1) and then transmitted, may transmit the UL reception result of the BS for each of the divided CBGs (M CBGs) through the following method.

The BS may transmit the reception result to the UE through DCI (UL grant) transmitted to configure or schedule UL data transmission (e.g., when an NDI included in DCI is toggled (NDI toggling), the DCI may be analyzed to schedule new data, and when the NDI is not toggled, the DCI may be analyzed to schedule retransmission of data), and may transmit the UL reception result of the BS for the divided CBGs (M CBGs) through separate control information or a separate channel. The BS may transmit CBGTI indicating which CBG should be transmitted by the UE, to the UE, through DCI for scheduling UL data channel transmission, like the case of the UL data channel. That is, the CBGTI field may include a bitstream including a maximum number (M) of CBGs for each of the configured TBs, and the UE may determine, through the field, a CBG that the BS makes a request for actually transmitting through the UL data channel. For example, for M=4, the UE may receive DCI for scheduling retransmission of the UL data and, when a value of the CBGTI field of the DCI is, e.g., 0011, transmit (data corresponding to) third and fourth CBGs among the CBGs included in the TB through the UL data channel. In the case of DCI for scheduling initial transmission of the UL data, all values of the CBGTI field may be configured as 1, in which case the UE may transmit all CBGs included in the TB and UL data corresponding thereto through the UL data channel.

In accordance with an embodiment of the disclosure, a method is provided for determining DL feedback information in an NR-U system. Particularly, for UL transmission in which CBG-based transmission is configured, a method of differently determining DL feedback information according to an RNTI which scrambles the CRC of the PDCCH transmitting DCI for scheduling the UL transmission is provided. For example, DL feedback information for a PUSCH scheduled through DCI scrambled by a CS-RNTI is determined as TB-level HARQ-ACK, and DL feedback information for a PUSCH scheduled through DCI scrambled by a C-RNTI is determined according to a condition indicating or determining whether a CW size is adjusted.

Hereinafter, an embodiment is described, which is directed to the UE receiving a configuration of transmission of an UL data channel in units of CBGs for a serving cell from the BS through a higher signal (e.g., codeBlockGroup-Transmission of PUSCH-ServingCellConfig), but is not limited thereto. Although the disclosure focuses on a UL data channel for convenience of description, the embodiments may also be applied to a DL data channel. Further, unless there is a separate notice, HARQ-ACK information is the reception result of the BS for a TB of HARQ process i transmitted by the UE through an UL data channel and, particularly, to the reception result which the UE receives from the BS through a CG-DFI. For example, when a value of the DFI flag field of DCI format 0_1 received by the UE is 1, the UE may determine that the DCI is providing the reception result of the BS for the TB transmitted by the UE through the UL data channel, i.e., DCI used as the CG-DFI. The UE may receive the reception result of the BS for UL data (or TB) corresponding to a UL HARQ process number (or index), e.g., HARQ process i through an HARQ-ACK-bitmap field of the DCI. The HARQ-ACK-bitmap field may include the reception result for HARQ process numbers predefined or configured through a higher signal, e.g., 16 HARQ process numbers. The reception result of the BS for UL data (or TB) corresponding to each HARQ process number in the HARQ-ACK-bitmap may be configured by 1 bit.

Through a higher signal, the UE may receive configuration information on UL data channel transmission through one of the following methods.

The UE may receive a configuration of transmission of the TB transmitted through all UL data channels in units of CBGs or receive relevant configuration information without distinction of the UL transmission scheme. The UE that has not received the configuration of the configuration information or has not received the configuration information may perform transmission in units of TBs for all UL transmission schemes.

In another example, the UE may receive a configuration of transmission of the TB transmitted through the UL data channel in units of CBGs or receive relevant configuration information for each UL transmission scheme. The UE may perform transmission in units of TBs for the UL transmission scheme in which the configuration information is not configured or provided.

For the UE receiving the configuration of the transmission of the TB transmitted according to at least one UL transmission scheme in units of N CBGs or receiving the relevant configuration information according to one of the examples, the BS needs a method of converting or generating the reception result in units of N-bit CBGs to 1 bit. In other words, when the UE transmits all or some of the UL TB in units of N CBGs, the BS should generate or determine the reception result for the received N CBGs as 1-bit HARQ-ACK information in order to provide the reception result for the TB to the UE through a CG-DFI. Further, the UE should receive the 1-bit HARQ-ACK information through the CG-DFI and correctly determine the reception result of the BS for the N CBGs through the received information.

Hereinafter, embodiments of the disclosure are described based on an assumption that the UE is configured to transmit the TB transmitted through all UL data channels in units of CBGs without distinction of the UL transmission scheme. For example, the UE receiving a higher signal (e.g., PUSCH-CodeBlockGroupTransmission) may transmit the TB transmitted through all UL data channels in units of CBGs without distinction of the UL transmission scheme. The embodiments may also be applied to when transmission in units of CBGs is configured for each UL transmission scheme.

The UE receiving the higher signal (e.g., PUSCH-CodeBlockGroupTransmission) may transmit the TB transmitted through the UL data channel transmitted through the second UL transmission scheme and/or second UL transmission resources in units of CBGs in initial transmission of the corresponding TB. It is assumed that a HARQ process number corresponding to the TB is i and a maximum number of configured CBGs is N. If the UE receives a retransmission timer (e.g., cg-RetransmissionTimer) for the second UL transmission scheme through a higher signal, the UE may start or restart the retransmission timer when performing UL transmission. If the UE does not receive the reception result of the BS for the CBG, the TB, or HARQ process i from the BS until the retransmission timer expires, the UE may retransmit the CBG or the TB through the UL data channel of the second UL transmission scheme and/or the UL data channel transmitted through second UL transmission resources. Although the UE performs transmission in units of CBGs in initial transmission, the UE may perform retransmission in units of TBs in retransmission through the UL data channel of the second UL transmission scheme.

When all reception results for one or more CBGs transmitted through the UL data channel of the second UL transmission scheme are ACKs (or when it is determined that each CBG is correctly received through the CRC of each CBG) and/or when the reception result for the TB transmitted in units of CBGs is an ACK (or when it is determined that the TB is correctly received through the CRC of the TB), the BS receiving the CBGs may configure HARQ-ACK-bitmap information for HARQ process i as a bit value (e.g., 1) indicating an ACK and transmit the same to the UE.

If at least one of the reception results for the CBGs is a NACK (or when it is determined that at least one CBG is not correctly received through the CRC of each CBG) and/or when the reception result for the TB transmitted in units of CBGs is a NACK (or when it is determined that the TB is not correctly received through the CRC of the TB), the BS may configure HARQ-ACK-bitmap information for HARQ process i as a bit value (e.g., 0) indicating a NACK and transmit the same to the UE. That is, the BS may generate or convert N-bit HARQ-ACK information for N CBGs into 1 bit according to the reference and transmit the same to the UE. The UE receiving the 1-bit HARQ-ACK information for HARQ process i may know the reception result of the BS for the CBGs and/or the TB through the reference.

The HARQ-ACK information for HARQ process i may be determined as an ACK when all reception results for the CBGs are ACKs or the reception result for the TB transmitted in units of CBGs is an ACK because the HARQ operation of the UE can be changed according to the HARQ-ACK information. For example, if the retransmission timer (cg-RetransmissionTimer) is running when the UE receives HARQ-ACK information, the UE stops the retransmission timer. If the HARQ-ACK information is an ACK and configuredGrantTimer is running, the UE stops configuredGrantTimer. In other words, since various timer operations of the UE and HARQ operations corresponding thereto are determined according to the HARQ-ACK information, transmitting an ACK only when the HARQ-ACK information for all CBGs and/or the TB is an ACK is preferable for the correct HARQ operation and management when N-bit HARQ-ACK information for N CBGs is generated or converted to 1 bit.

The BS receiving one or more CBGs transmitted through the UL data channel of the first UL transmission scheme from the UE may generate or convert N-bit HARQ-ACK information for N CBGs to 1 bit according to an RNTI for scrambling the CRC of the DCI or UL grant for scheduling UL data channel transmission of the first UL transmission scheme.

In an accordance with an embodiment, when all reception results for CBGs are ACKs and/or the reception result for the TB transmitted in units of CBGs is an ACK, the BS receiving one or more CBGs transmitted by the UE through the UL data channel of the first UL transmission scheme based on DCI that is CRC-scrambled by a CS-RNTI may configure HARQ-ACK-bitmap information for HARQ process i as a bit value (e.g., 1) and transmit the same to the UE. If at least one of the reception results for the CBGs is a NACK and/or when the reception result for the TB transmitted in units of CBGs is a NACK, the BS may configure HARQ-ACK-bitmap information for HARQ process i as a bit value (e.g., 0) indicating a NACK and transmit the same to the UE.

In another example, when at least one of the reception results for CBGs is an ACK, when reception results of at least Z % of (e.g., Z=10%) of the CBs received through the UL data channel are ACKs, and/or when the reception result for the TB transmitted in units of CBGs is an ACK, the BS receiving one or more CBGs transmitted by the UE through the UL data channel of the first UL transmission scheme based on DCI scrambled by the C-RNTI may configure HARQ-ACK-bitmap information for HARQ process i as a bit value (e.g., 1) indicating ACK and transmit the same to the UE. If all reception results for the CBGs are NACKs, when reception results for CBGs smaller than Z % (e.g., Z=10%) of the CBGs received through the UL data channel are ACKs, and/or when the reception result for the TB transmitted in units of CBGs is a NACK, the BS may configure HARQ-ACK-bitmap information for HARQ process i as a bit value (for example, 0) indicating a NACK and transmit the same to the UE.

As described above, the HARQ-ACK information may be determined based on different references according to the RNTI because, when the UE receives the HARQ-ACK information for CBGs and/or the TB transmitted based on DCI scrambled by the CS-RNTI, the timer operation and HARQ operation corresponding thereto are determined according to the received HARQ-ACK information, but the HARQ-ACK information for CBGs and/or the TB transmitted based on DCI scrambled by the C-RNTI is not used for the timer operation of the UE and may be used only for adjusting the UL CW of the UE. Accordingly, the BS receiving one or more CBGs transmitted by the UE through the UL data channel of the first UL transmission scheme based on DCI scrambled by the C-RNTI may generate HARQ-ACK information according to a UL CW adjustment procedure reference (e.g., when 10% of CBGs among the CBGs transmitted within the reference duration are ACKs, the content window is initialized and, otherwise, is increased to the next large value).

The BS may use HARQ-ACK information for CBGs and/or the TB transmitted based on DCI scrambled by the C-RNTI as indicator information indicating a change in the CW of the UE. For example, when 10% of CBGs among the CBGs transmitted within the reference duration are ACKs, the UE may determine or generate corresponding CG-DFI information (HARQ-ACK-bitmap information for HARQ process i) as a bit value (e.g., 0) indicating an ACK and transmit the same to the UE.

When the number of CBs smaller than 10% of the CBGs transmitted within the reference duration are ACKs, the UE may determine or generate corresponding CG-DFI information (HARQ-ACK-bitmap information for HARQ process i) as a bit value (e.g., 1) indicating an ACK and transmit the same to the UE. The UE may consider CG-DFI information for the HARQ process of one or more CBGs and/or the TB transmitted through the UL data channel of the first UL transmission scheme based on DCI scrambled by the C-RNTI as an indicator of whether the CW is changed. For example, when a bit value of the CG-DFI information is 0, the UE may initialize the CW. When the bit value of the CG-DFI information is 1, the UE may increase the CW. The above method may be applied when the UL data channel is transmitted with the reference duration of the UE, but is not limited thereto.

Figure 15:
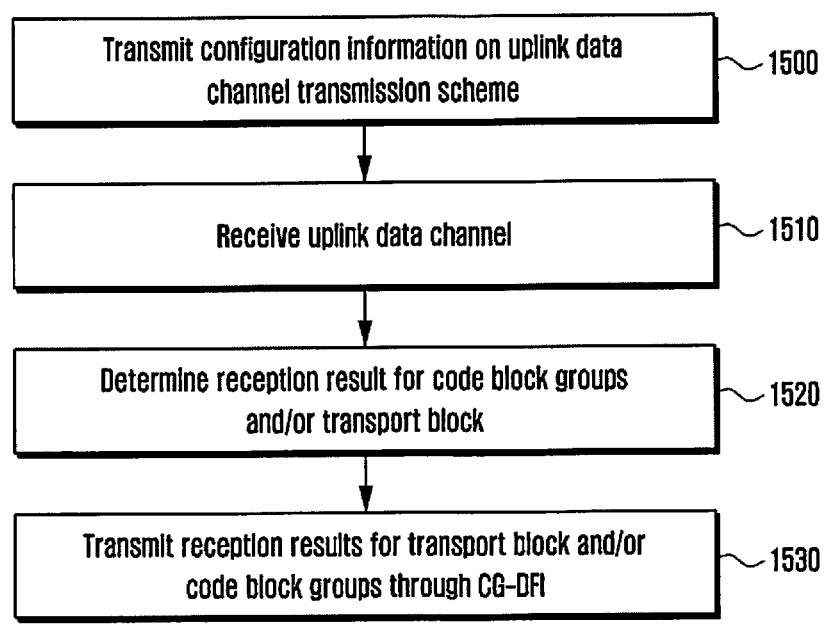
FIG. 15 is a flowchart illustrating an operation of a BS according to an embodiment.

FIG. 15 is a flowchart illustrating an operation of a BS according to an embodiment.

Referring to FIG. 15, in step 1500, the BS transmits a UL data channel transmission scheme and configuration information related thereto to the UE. For example, the BS may transmit a second UL data channel transmission scheme and configuration information related thereto to the UE through a higher signal. When the BS configures the second UL data channel transmission scheme and the configuration information related thereto in the UE, through the higher signal, the BS may transmit DCI for activating UL transmission of the configured second UL data channel transmission scheme to the UE. In step 1500, the BS may transmit configuration information indicating transmission of a TB transmitted by the UE through an UL data channel in units of CBGs to the UE through the higher signal.

In step 1510, the BS receives the UL data channel of HARQ process i transmitted by the UE according to the first UL transmission scheme and/or the second UL transmission scheme.

In step 1520, the BS determine the reception result for the TB or the CBGs received in step 1510.

In step 1530, the BS determines or generates CG-DFI (HARQ-ACK-bitmap information for HARQ process i) and transmits the same to the UE.

When all reception results for the CBGs transmitted through the second UL transmission scheme are ACKs, the BS may generate HARQ-ACK-bitmap information for HARQ process i as an ACK. When at least one of the reception results for the CBGs is a NACK (or when not all the reception results for the CBGs are an ACK), the BS may generate HARQ-ACK-bitmap information for HARQ process i as a NACK. In another example, when reception results for CBGs larger than or equal to 10% of the CBGs transmitted through the second UL transmission scheme are ACKs, the BS may generate HARQ-ACK-bitmap information for HARQ process i as an ACK. When reception results for CBGs larger than or equal to 10% of the CBGs are not ACKs (or when reception results for CBGs larger than or equal to 90% of the CBGs are NACKs), the BS may generate HARQ-ACK-bitmap information for HARQ process i as a NACK.

When all reception results for the CBGs scheduled through DCI scrambled by the CS-RNTI and transmitted from the UE through the first UL transmission scheme are ACKs, the BS may generate HARQ-ACK-bitmap information for HARQ process i as an ACK. When at least one of the reception results for the CBGs is a NACK (or when not all the reception results for the CBGs are ACKs), the BS may generate HARQ-ACK-bitmap information for HARQ process i as a NACK.

When reception results for CBGs larger than or equal to 10% of the CBGs scheduled through DCI scrambled by the CS-RNTI and transmitted through the first UL transmission scheme are ACKs, the BS may generate HARQ-ACK-bitmap information for HARQ process i as an ACK. When reception results for CBGs larger than or equal to 10% of the CBGs are not ACKs (or when reception results for CBGs larger than or equal to 90% of the CBGs are NACKs), the BS may generate HARQ-ACK-bitmap information for HARQ process i as a NACK.

When at least one of the reception results for the CBGs scheduled through DCI scrambled by the C-RNTI and transmitted from the UE through the first UL transmission scheme is an ACK, the BS may generate HARQ-ACK-bitmap information for HARQ process i as an ACK.

When all reception results for the CBGs are NACKs (or when all reception results for the CBGs are not ACKs), the BS may generate HARQ-ACK-bitmap information for HARQ process i as a NACK.

When reception results for CBGs larger than or equal to 10% of the CBGs scheduled through DCI scrambled by the C-RNTI and transmitted through the first UL transmission scheme are ACKs, the BS may generate HARQ-ACK-bitmap information for HARQ process i as an ACK. When reception results for CBGs larger than or equal to 10% of the CBGs are not ACKs (or when reception results for CBGs larger than or equal to 90% of the CBGs are NACKs), the BS may generate HARQ-ACK-bitmap information for HARQ process i as a NACK.

Figure 16:
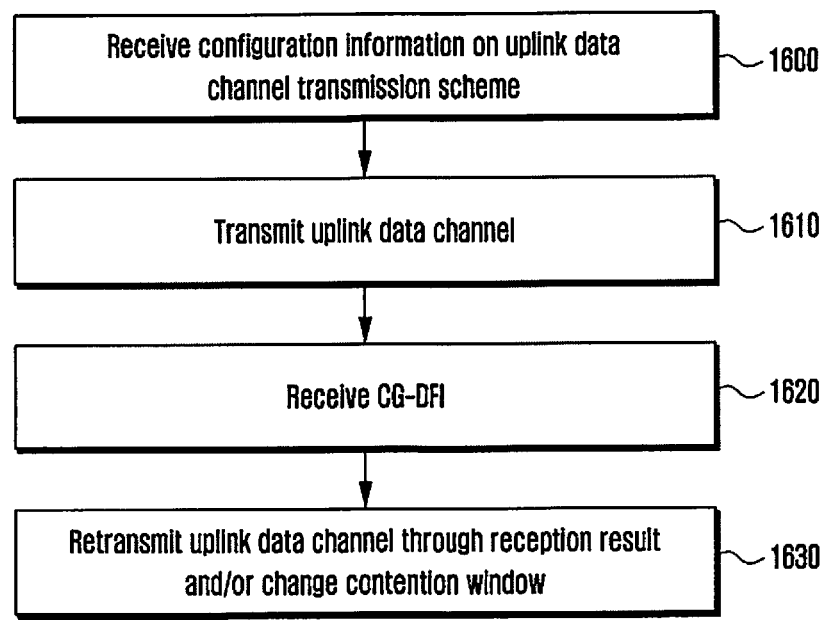
FIG. 16 is a flowchart illustrating an operation of a UE according to an embodiment.

FIG. 16 is a flowchart illustrating an operation of a UE according to an embodiment.

Referring to FIG. 16, in step 1600, the UE receives n UL data channel transmission scheme and configuration information related thereto from the BS. For example, the UE may receive a second UL data channel transmission scheme and relevant configuration information, from the BS, through a higher signal. When the UE receives a configuration of the second UL data channel transmission scheme and the relevant configuration information through a higher signal, the UE may receive DCI transmitted to activate UL transmission of the configured second UL data channel transmission scheme, determine second UL transmission resources using the higher signal and DCI information, and accordingly perform the UL data channel transmission of the second UL transmission scheme. In step 1600, the UE may receive configuration information indicating transmission of a TB transmitted through a UL data channel in units of CBGs from the BS through the higher signal.

In step 1610, the UE transmits the UL data channel of HARQ process i according to the first UL transmission scheme and/or the second UL transmission scheme.

In step 1620, the UE receives the reception result of the BS for the TB and/or CBGs transmitted through the UL data channel at least through a CG-DFI.

In step 1630, the UE (re)transmits the TB and/or the CBGs according to CG-DFI information (HARQ-ACK-bitmap information for HARQ process i) determined by the BS and/or changes a CW.

When the reception result of the BS received through the CG-DFI for the TB and/or the CBGs for HARQ process i transmitted through the second UL transmission scheme is an ACK, the UE may determine that the BS correctly received the TB and/or the CBGs for HARQ process i and stop a retransmission timer if the retransmission timer (cg-RetransmissionTimer) is running. If configuredGrantTimer is running, the UE may stop configuredGrantTimer. When the reception result of the BS received through the CG-DFI for the TB and/or the CBGs for HARQ process i transmitted through the second UL transmission scheme is a NACK, the UE may determine that the BS did not correctly receive the TB and/or the CBGs for HARQ process i and stop the retransmission timer (cg-RetransmissionTimer).

When the reception result of the BS received through the CG-DFI for the TB and/or the CBGs for HARQ process i transmitted by the first UL transmission scheme through DCI scrambled by the CS-RNTI is an ACK, the UE may determine that the BS correctly received the TB and/or the CBGs for HARQ process i and stop a retransmission timer, if the retransmission timer (cg-RetransmissionTimer) is running. If configuredGrantTimer is running, the UE may stop configuredGrantTimer. When the reception result of the BS received through the CG-DFI for the TB and/or the CBGs for HARQ process i transmitted by the first UL transmission scheme through DCI scrambled by the CS-RNTI is a NACK, the UE may determine that the BS did not correctly receive the TB and/or the CBGs for HARQ process i and stop the retransmission timer (cg-RetransmissionTimer).

When the reception result of the BS received through the CG-DFI for the TB and/or the CBGs for HARQ process i transmitted by the first UL transmission scheme through DCI scrambled by the C-RNTI is an ACK or a bit value corresponding to an ACK, or when the bit value is a bit value indicating initialization of a CW, the UE may configure the CW as an initial value. When the reception result of the BS received through the CG-DFI for the TB and/or the CBGs for HARQ process i transmitted by the first UL transmission scheme through DCI scrambled by the C-RNTI is a NACK or a bit value corresponding to a NACK, or when the bit value is a bit value indicating an increase in the CW, the UE may configure the CW as the next large value of the current CW.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, an Intranet, a LAN, a WLAN, and a storage area network (SAN) or a combination thereof. Such a storage device may access the electronic device via an external port. Further, a separate storage device on the communication network may access a portable electronic device.

Herein, the term "computer program product" or "computer-readable medium" is used to refer to all media such as a memory, a hard disk installed in a hard disk drive, a signal, etc. The "computer program product" or the "computer-readable medium" is an element provided for a method of monitoring a DL control channel in a wireless communication system according to the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with any other embodiment to operate a BS and a terminal. Further, the embodiments of the disclosure may be applied to other communication systems, and other variants based on the technical idea of the embodiments may be implemented, For example, the embodiments may be applied to LTE systems, 5G or NR systems, etc.

While the disclosure has been shown and described with reference to certain embodiments and drawings thereof, it will be understood by those skilled in the art that various changes in form and details may be made therein without departing from the spirit and scope of the disclosure as defined by the appended claims and any equivalents thereof.

What is claimed is:

1. A method performed by a terminal in a communication system, the method comprising:
receiving, from a base station (BS), first information configuring a code block group (CBG) based uplink (UL) transmission;
transmitting, to the BS, UL data including one or more CBGs; and
receiving, from the BS, second information indicating a positive-acknowledgement (ACK) or a negative-acknowledgement (NACK) according to a reception result of the BS for the UL data,
wherein, in response to the UL data being based on downlink control information (DCI) scheduling the UL data and a radio network temporary identifier (RNTI) associated with the DCI being cell-RNTI (C-RNTI):
the second information indicates the ACK in response to the reception result of at least one of the one or more CBGs being an ACK, and
the second information indicates the NACK in response to the reception result of all of the one or more CBGs being NACKs,
wherein, in response to the UL data being based on higher layer signaling, the second information indicates the ACK in response to a reception result of all of the one or more CBGs being ACKs, and the second information indicates the NACK in response to a reception result of at least one of the one or more CBGs being a NACK.

2. The method of claim 1, wherein, in response to the UL data being based on the DCI scheduling the UL data and the RNTI associated with the DCI being configured scheduling-RNTI (CS-RNTI):
the second information indicates the ACK in response to the reception result of all of the one or more CBGs being ACKs, and
the second information indicates the NACK in response to the reception result of at least one of the one or more CBGs being a NACK.

3. A method performed by a base station (BS) in a communication system, the method comprising:
transmitting, to a terminal, first information configuring a code block group (CBG) based uplink (UL) transmission;
receiving, from the terminal, UL data including one or more CBGs; and
transmitting, to the terminal, second information indicating a positive-acknowledgement (ACK) or a negative-acknowledgement (NACK) according to a reception result for the UL data,
wherein, in response to the UL data being based on downlink control information (DCI) scheduling the UL data and a radio network temporary identifier (RNTI) associated with the DCI being cell-RNTI (C-RNTI):

the second information indicates the ACK in response to the reception result of at least one of the one or more CBGs being an ACK, and the second information indicates the NACK in response to the reception result of all of the one or more CBGs being NACKs, wherein, in response to the UL data being based on higher layer signaling, the second information indicates the ACK in response to a reception result of all of the one or more CBGs being ACKs, and the second information indicates the NACK in response to a reception result of at least one of the one or more CBGs being a NACK.

4. The method of claim 3, wherein, in response to the UL data being based on the DCI scheduling the UL data and the RNTI associated with the DCI being configured scheduling-RNTI (CS-RNTI):

the second information indicates the ACK in response to the reception result of all of the one or more CBGs being ACKs, and the second information indicates the NACK in response to the reception result of at least one of the one or more CBGs being a NACK.

5. A terminal in a communication system, the terminal comprising:

a transceiver; and a controller configured to:

receive, from a base station (BS), first information configuring a code block group (CBG) based uplink (UL) transmission, transmit, to the BS, UL data including one or more CBGs, and receive, from the BS, second information indicating a positive-acknowledgement (ACK) or a negative-acknowledgement (NACK) according to a reception result of the BS for the UL data, wherein, in response to the UL data being based on downlink control information (DCI) scheduling the UL data and a radio network temporary identifier (RNTI) associated with the DCI being cell-RNTI (C-RNTI):

the second information indicates the ACK in response to the reception result of at least one of the one or more CBGs being an ACK, and the second information indicates the NACK in response to the reception result of all of the one or more CBGs being NACKs, wherein, in response to the UL data being based on higher layer signaling, the second information indicates the ACK in response to a reception result of all of the one or more CBGs being ACKs, and the second information indicates the NACK in response to a reception result of at least one of the one or more CBGs being a NACK.

6. The terminal of claim 5, wherein, in response to the UL data being based on the DCI scheduling the UL data and the RNTI associated with the DCI being configured scheduling-RNTI (CS-RNTI):

the second information indicates the ACK in response to the reception result of all of the one or more CBGs being ACKs, and the second information indicates the NACK in response to the reception result of at least one of the one or more CBGs being a NACK.

7. A base station (BS) in a communication system, the BS comprising:

a transceiver; and a controller configured to:

transmit, to a terminal, first information configuring a code block group (CBG) based uplink (UL) transmission, receive, from the terminal, UL data including one or more CBGs, and transmit, to the terminal, second information indicating a positive-acknowledgement (ACK) or a negative-acknowledgement (NACK) according to a reception result for the UL data, wherein, in response to the UL data being based on downlink control information (DCI) scheduling the UL data and a radio network temporary identifier (RNTI) associated with the DCI being cell-RNTI (C-RNTI):

the second information indicates the ACK in response to the reception result of at least one of the one or more CBGs being an ACK, and the second information indicates the NACK in response to the reception result of all of the one or more CBGs being NACKs, wherein, in response to the UL data being based on higher layer signaling, the second information indicates the ACK in response to a reception result of all of the one or more CBGs being ACKs, and the second information indicates the NACK in response to a reception result of at least one of the one or more CBGs being a NACK.

8. The BS of claim 7, wherein, in response to the UL data being based on the DCI scheduling the UL data and the RNTI associated with the DCI being configured scheduling-RNTI (CS-RNTI):

the second information indicates the ACK in response to the reception result of all of the one or more CBGs being ACKs, and the second information indicates the NACK in response to the reception result of at least one of the one or more CBGs being a NACK.

* * * * *